United States Patent [19]

Kusaka et al.

[11] Patent Number: 5,504,551
[45] Date of Patent: Apr. 2, 1996

[54] AUTOMATIC FOCUSING APPARATUS

[75] Inventors: Yosuke Kusaka; Masaru Muramatsu; Ken Utagawa, all of Yokohama; Shozo Yamano, Tokyo, all of Japan

[73] Assignee: Nikon Corporation, Tokyo, Japan

[21] Appl. No.: 442,872

[22] Filed: May 17, 1995

Related U.S. Application Data

[62] Division of Ser. No. 825,810, Jan. 21, 1992, abandoned, which is a continuation of Ser. No. 727,382, Jul. 5, 1991, abandoned, which is a continuation of Ser. No. 453,203, Dec. 26, 1989, abandoned, which is a continuation of Ser. No. 350,463, May 11, 1989, abandoned.

[30] Foreign Application Priority Data

| May 13, 1988 | [JP] | Japan | 63-116171 |
| Jul. 20, 1988 | [JP] | Japan | 63-179112 |
| Oct. 3, 1988 | [JP] | Japan | 63-250600 |

[51] Int. Cl.$^6$ .................................................. G03B 13/36
[52] U.S. Cl. .................................................. 354/402
[58] Field of Search .................................................. 354/400–409, 354/412, 195.1

[56] References Cited

U.S. PATENT DOCUMENTS

| 4,537,487 | 8/1985 | Taniguchi et al. | 354/286 |
| 4,561,749 | 12/1985 | Utagawa | 354/406 |
| 4,588,278 | 3/1986 | Horigome | 354/409 |
| 4,816,856 | 3/1989 | Hamada et al. | 354/402 |
| 4,829,331 | 5/1989 | Aihara | 354/402 |
| 4,860,045 | 8/1989 | Hamada et al. | 354/402 |

FOREIGN PATENT DOCUMENTS

| 60-37513 | 2/1985 | Japan. |
| 60-214325 | 10/1985 | Japan. |

*Primary Examiner*—David M. Gray
*Attorney, Agent, or Firm*—Shapiro and Shapiro

[57] ABSTRACT

An automatic focusing apparatus repetitively detects a defocus amount of a photographing lens, discriminates whether or not an object is moving, and calculates a pursuit correction amount for a moving object on the basis of present and previous defocus amounts. When a non-moving object is discriminated, a drive amount of the lens is calculated on the basis of the present defocus amount, and when a moving object is discriminated the drive amount is calculated on the basis of a pursuit drive amount as a sum of the present defocus amount and the pursuit correction amount. A pursuit enable/disable determining device determines whether the drive amount is calculated on the basis of the discrimination result or on the basis of the present defocus amount. When a drive direction of the lens is reversed, the pursuit enable/disable determining device causes calculation of the drive amount of the photographing lens on the basis of the present defocus amount for driving the lens in a predetermined number of drive operations after the reversal.

17 Claims, 33 Drawing Sheets

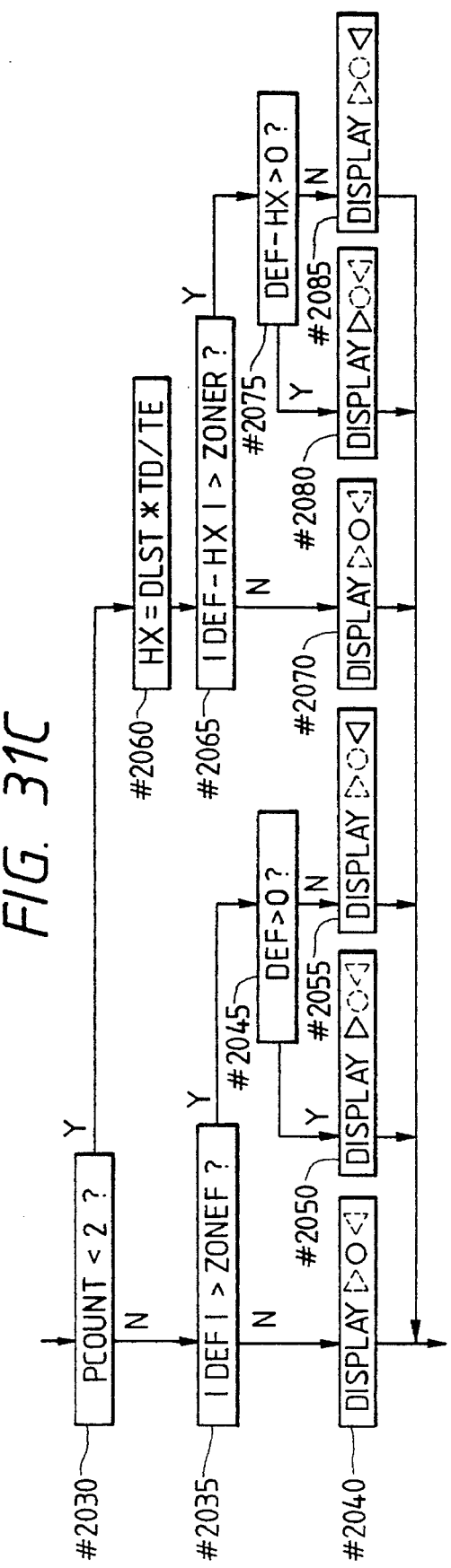
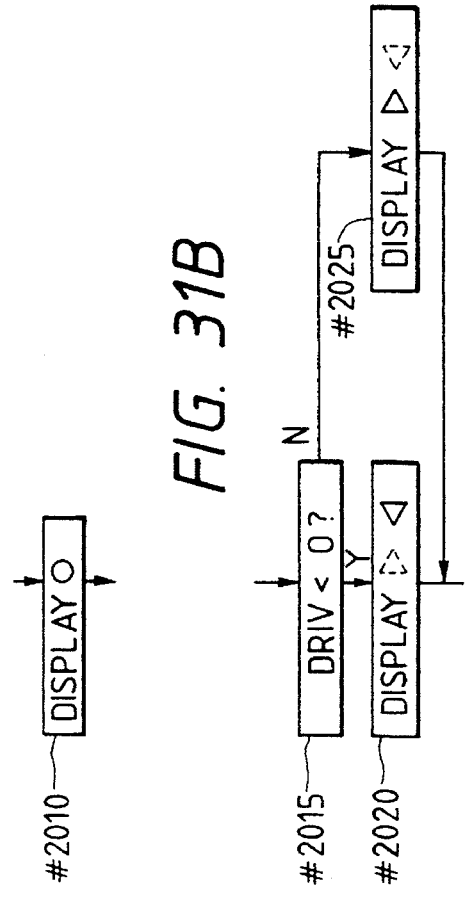

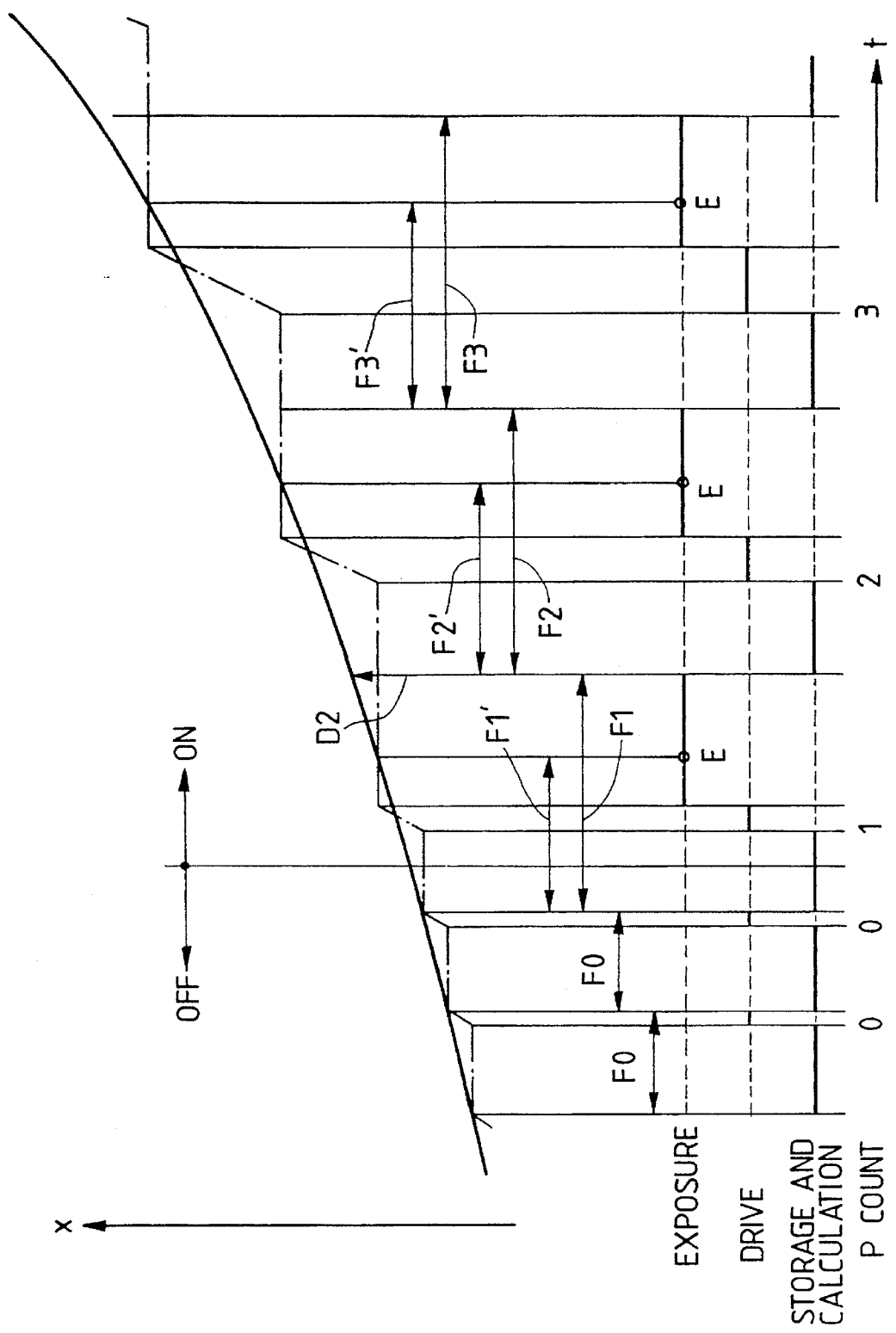

AUTOMATIC FOCUSING APPARATUS

This is a division of application Ser. No. 07/825,810 filed Jan. 21, 1992, which is a continuation of application Ser. No. 07/727,382 filed Jul. 5, 1991, which is a continuation of application Ser. No. 07/453,203 filed Dec. 26, 1989, which is a continuation of application Ser. No. 07/350,463 filed May 11, 1989, all now abandoned.

BACKGROUND OF THE INVENTION

1. Field of the Invention

The present invention relates to an automatic focusing apparatus for a camera or the like.

2. Related Background Art

In a known so-called pursuit or follow-up drive technique, a defocus amount of a photographing lens is repetitively detected, and it is determined on the basis of the present and previous defocus amounts whether or not an object to be photographed is moving. If it is determined that the object is moving, a correction amount for correcting the position of the photographing lens with respect to the moving object is calculated on the basis of the present and previous defocus amounts, and a drive amount of the photographing lens is calculated on the basis of a sum of the defocus amounts and the correction amount, thereby driving the photographing lens with respect to the moving object without being delayed. For example, this technique is disclosed in Japanese Patent Laid-Open (Kokai) No. 60-214325 filed by the present applicant.

In the conventional technique described above, when the drive direction of the photographing lens is reversed, the following problem is posed.

Since an initial drive operation of the photographing lens immediately after reversal includes backlash of a drive system, a difference between an estimated drive amount and an actual drive amount is produced. Thus, although the photographing lens is moved by the estimated drive amount in discrimination of the moving object after the initial drive operation, a defocus amount corresponding to the difference is detected. In the conventional technique, it is erroneously determined that this defocus amount is caused by movement of the object. Thus, the pursuit drive operation for the moving object is performed, and hence, the photographing lens overruns from an actual in-focus position.

In particular, the backlash amount and the defocus amount are amounts on the same order near the in-focus position, and the photographing lens engages in hunting around the in-focus position due to the pursuit drive operation and cannot be easily converged to the in-focus position.

When the drive direction is reversed, backlash data stored in a ROM incorporated in the lens is read out to correct the backlash of the photographing lens, and the above drawback can be alleviated to some extent.

However, the backlash amount varies even in identical types of lenses, and changes over time. Thus, the conventional drawback cannot be completely eliminated.

SUMMARY OF THE INVENTION

An object of the present invention is to overcome the foregoing conventional drawback and to provide an automatic focusing apparatus which can perform an accurate pursuit operation even when a condition such as backlash is variable.

BRIEF DESCRIPTION OF THE DRAWINGS

FIGS. 30A, 30B, and 30C and FIGS. 31A, 31B, and 31C are respectively diagrams and flow charts for explaining an arrangement of a third embodiment of the present invention;

FIG. 39 is a chart showing paths of an image surface and an estimated focusing surface together with storage, calculation, and lens drive cycles and an exposure operation including, e.g., a mirror-up operation.

DETAILED DESCRIPTION OF THE PREFERRED EMBODIMENTS (First Embodiment)

Figure 1:
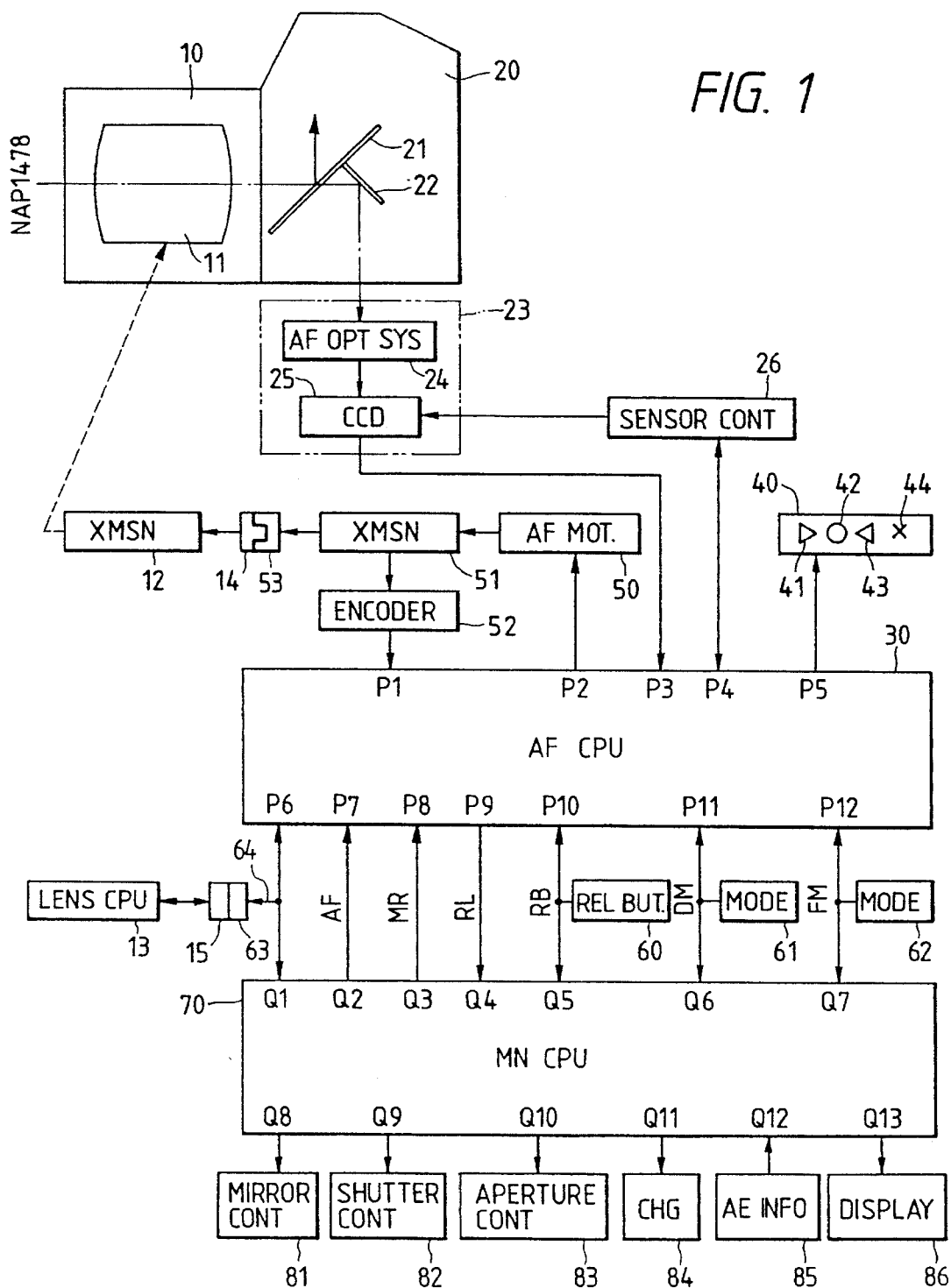
FIG. 1 is a block diagram of a first embodiment of the present invention.

FIG. 1 shows an embodiment in which the present invention is applied to a an interchangeable lens type single-lens reflex camera. An interchangeable lens 10 can be detachably mounted on a camera body 20.

When the lens 20 is mounted, a photographing beam from an object passes through a photographing lens 11 and some components are reflected by a main mirror 21 arranged in the main body 20 to be guided to a finder (not shown).

The remaining components of the photographing beam are transmitted through the main mirror 21 and reflected by a sub mirror 22 to be guided as a focusing beam to an auto-focus module (to be referred to as an AF module hereinafter) 23.

Figure 2:
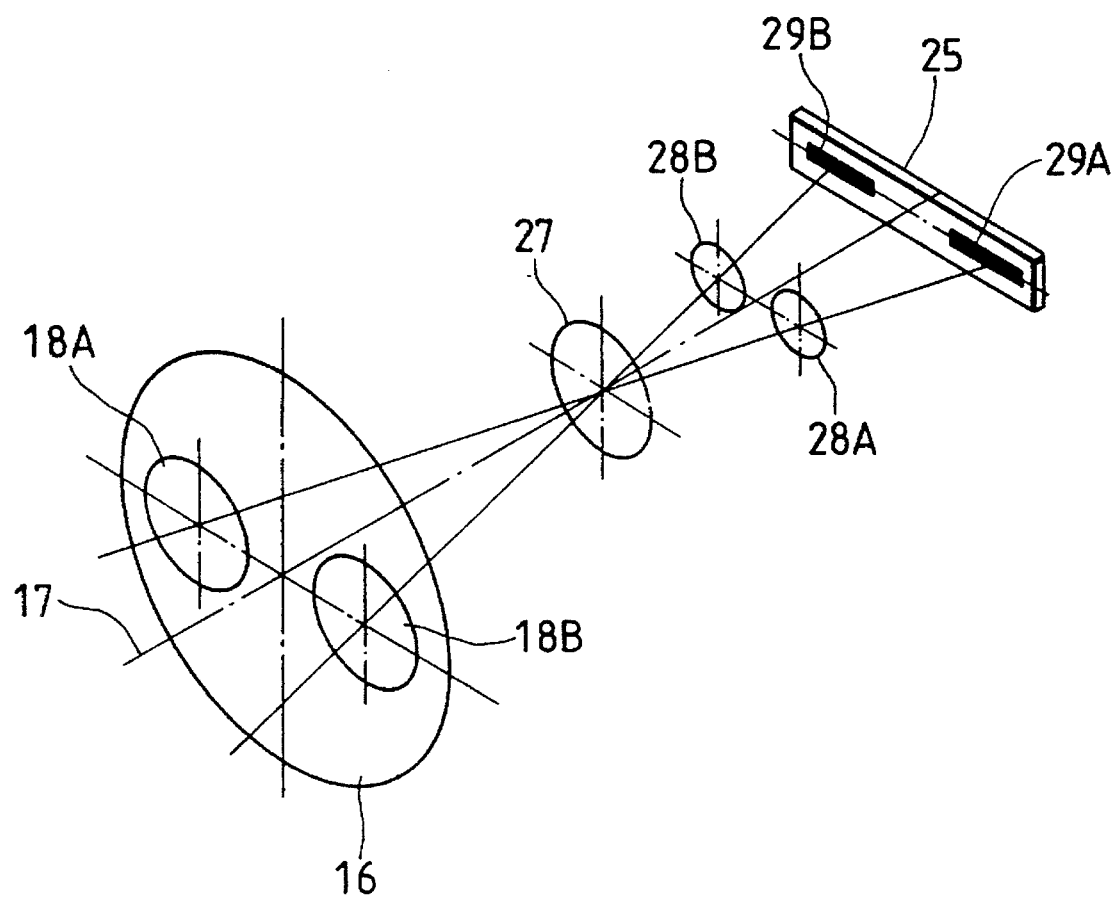
FIG. 2 is a perspective view of an AF module.

FIG. 2 shows an arrangement of the AF module 23.

In FIG. 2, the AF module comprises a focusing (AF) optical system 24 consisting of a field lens 27 and a pair of re-focusing lenses 28A and 28B, and a CCD (Charge-Coupled Device) 25 having a pair of light-receiving portions 29A and 29B.

In the above arrangement, light beam components passing through a pair of regions 18A and 18B symmetrical about an optical axis 17 included in an exit pupil 16 of the photographing lens 11 form a primary image near the field lens 27, and form a pair of secondary images on the pair of light-receiving portions of the CCD 25 by the field lens 27 and the re-focusing lenses 28A and 28B. When the primary image coincides with a film conjugate surface (not shown), relative positions of the pair of secondary images on the CCD 25 in the alignment direction of the light-receiving portions become predetermined values determined by the arrangement of the AF optical system. Each of the pair of light-receiving portions 29A and 29B consists of n light-receiving elements $a_i$ or $b_i$ ($i = 1$ to $n$). The light-receiving elements are arranged so that outputs of the corresponding light-receiving elements ($a_1$ and $b_1$, $a_2$ and $b_2$, ...) are equal to each other when the primary image coincides with the film conjugate surface.

When the primary image is formed on a surface offset from the film conjugate surface, the relative positions of the pair of secondary images on the CCD 25 are changed from the predetermined values when the primary image coincides with the conjugate surface in accordance with an offset direction of the optical axis direction of the primary image (i.e., near-focus or far-focus). For example, in the case of near-focus, the positional relationship between the pair of secondary images is relatively widened, and in the case of far-focus, it is narrowed.

The light-receiving elements $a_i$ and $b_i$ forming the light-receiving portions 29A and 29B comprise charge-storing elements such as photodiodes. The light-receiving elements perform charge storage for a charge storage time according to the illuminance on the CCD 25, thus obtaining outputs of the light-receiving elements at an output level suitable for processing to be described later.

A description will be continued referring again to FIG. 1.

A sensor control means 26 receives charge storage start and end instructions from a port P4 of an AF CPU 30, and supplies to the CCD 25 control signals according to the instructions, thereby controlling start and end of charge storage of the CCD 25. The control means 26 supplies a transfer clock signal to the CCD 25, so that output signals from the light-receiving elements are time-serially transferred to the AF CPU. Upon generation of the output signals from the light-receiving elements, the control means 26 supplies a sync signal to the port P4 of the AF CPU 30. The AF CPU 30 causes an internal A/D converter to start A/D conversion in synchronism with the sync signal. The AF CPU then samples and A/D-converts the outputs from the light-receiving elements at a port P3 every cycle time of the transfer clock so as to obtain (2n) A/D conversion data according to the number of light-receiving elements. The AF CPU then performs a known AF calculation (to be described later) on the basis of the obtained data, thereby calculating a defocus amount between the primary image and the film conjugate surface.

The AF CPU 30 controls a display mode of an AF display means 40 using its port P5 on the basis of the AF calculation result. For example, a triangular indicator 41 is activated in the case of near-focus; a triangular indicator 43 is activated in the case of far-focus; a circular indicator 42 is activated in an in-focus state; and a cross indicator 44 is activated when AF is impossible.

The AF CPU 30 controls a drive direction and amount of an AF motor 50 on the basis of the AF calculation result and moves the photographing lens 11 to an in-focus position.

The AF CPU 30 generates a drive signal for rotating the AF motor 50 in a direction to cause the photographing lens 11 to approach the in-focus position in accordance with the sign (near-focus or far-focus) of the defocus amount. The rotation of the AF motor is transmitted to a coupling 53 of the body arranged in a mount portion between the body 20 and a lens 10 via a body transmission system (or XMSN) 51 consisting of gears or the like incorporated in the body 20.

The rotation transmitted to the coupling 53 of the body is transmitted to a coupling 14 engaged with the coupling 53 and a lens transmission system (or XMSN) 12 consisting of gears or the like incorporated in the lens 10, and the photographing lens 11 is finally moved to the in-focus direction.

The drive amount of the AF motor 50 is fed back to a port P1 of the AF CPU 30 such that a rotational amount of the gears of the body transmission system 51 is converted to a pulse count by an encoder 52 consisting of a photointerrupter or the like.

The AF CPU 30 controls the drive amount of the AF motor 50, i.e., the pulse count fed back from the encoder 52 in accordance with parameters, e.g., speed reducing ratios of the body and lens transmission systems 51 and 12, thereby moving the photographing lens 11 by a predetermined moving amount.

The AF CPU 30 incorporates a pulse counter for counting the number of pulses input at the port P1 and a comparison register for comparing its content with the content of the pulse counter. When the contents of the pulse counter and the comparison register coincide with each other, the AF CPU 30 is internally interrupted. The AF CPU 30 controls the drive amount of the AF motor 50 in the following order. Before starting of driving of the AF motor 50, the AF CPU 30 clears the content of the pulse counter, and sets a predetermined pulse count in the comparison register.

The CPU then starts driving of the AF motor 50.

Upon rotation of the AF motor 50, the encoder 52 generates pulses, and the pulses are counted by the pulse counter.

When the content of the pulse counter coincides with that of the comparison register, the AF CPU is internally interrupted, and stops the AF motor by an interruption processing. In this manner, the AF motor is drive-controlled by the predetermined pulse count. The AF CPU 30 incorporates a timer for counting a time, and also has a timer interruption function of performing an interruption every predetermined period of time.

The AF CPU 30 mainly has a function of controlling the AF operation as described above.

The body 20 includes a main CPU 70 for mainly controlling a camera sequence exposure operation (AE). The main CPU 70 receives information associated with AE such as an object luminance, a film sensitivity, an aperture value, a shutter speed, and the like at its port Q12 from an AE information means 85, and determines the aperture value, the shutter speed, and the like on the basis of the AE information. The main CPU 70 causes a display means 86 to display the determined information such as the aperture value, the shutter speed, and the like via a port Q13, and determines them as an aperture value and a shutter speed in an exposure.

In the exposure, the main CPU 70 controls an up/down operation of the main mirror 21 by a mirror control means 81 from a port Q8.

The CPU 70 controls an aperture control means 83 through a port Q8 to control an aperture mechanism (not shown) in the lens 10.

The CPU 70 controls a shutter control means 82 through a port Q9 to control a shutter mechanism (not shown).

When the exposure is completed, the main CPU 70 controls a wind-up control means 84 via a port Q11 to operate a wind-up charge mechanism (not shown) so as to prepare for the next exposure.

The operation of the main CPU 70 has been briefly described.

The lens 10 incorporates a lens CPU 13. The lens CPU 13 sends AE associated information, e.g., a full aperture value necessary for the main CPU 70 and AF associated information, e.g., a rotational speed of the coupling 14 per unit moving amount of the photographing lens 11 necessary for the AF CPU 30 onto a communication bus 64 of the body through a lens contact 15 and a body contact 63 arranged at the mount portion.

The AF CPU 30 receives the AF associated information from the lens CPU 13 from a port P6 connected to the communication bus 64.

The main CPU 70 receives the AF associated information from the lens CPU 13 at a port Q1 connected to the communication bus 64.

The main CPU 70 and the AF CPU 30 can exchange various types of information from the ports Q1 and P6 through the communication bus 64.

There are direct input/output signal (I/O signal) lines between the main CPU 70 and the AF CPU 30 besides the communication bus 64.

An AF permission signal AF is supplied from a port Q2 of the main CPU 70 to a port P7 of the AF CPU 30. The AF permission signal (AF) permits a drive operation of the AF motor 50 by the AF CPU 30 when it is ON, and inhibits the drive operation of the motor when it is OFF. The AF permission signal (AF) is used for preventing a problem occurring when wind-up charge control of the main CPU 70 and the AF motor drive operation of the AF CPU 30 are simultaneously executed and exceed a power supply capacity of a power supply, e.g., a battery (not shown). More specifically, while the main CPU 70 performs the wind-up charge operation, the AF permission signal is set to be OFF to inhibit the drive operation of the AF motor 50 by the AF CPU 30, thereby preventing the wind-up charge operation and the AF motor drive operation from being simultaneously executed.

A mirror-up signal MR is sent from a port Q3 of the main CPU 70 to a port P8 of the AF CPU 30.

When the mirror-up signal (MR) is ON, it represents that the mirror is being moved upward and a transition state between the mirror up and down operations. When the signal MR is OFF, it represents that the mirror is being moved downward.

The mirror-up signal (MR) is used for adjusting a drive delay start timing after the mirror-up operation upon start of CCD storage. A release permission signal RL is sent from a port P9 of the AF CPU 30 to a port Q4 of the main CPU 70.

The release signal (RL) permits an exposure by the main CPU 70 when it is ON, and inhibits the exposure when it is OFF.

The release permission signal (RL) is used for adjusting a timing between AF pursuit operation control of the AF CPU 30 and exposure control of the main CPU 70 and for inhibiting the exposure of a one-shot AF mode before an in-focus state.

A release button signal RB is used for sending operation state information of a release button 60, an external operation member provided on the body 20, to a port P10 of the AF CPU 30 and a port Q5 of the main CPU 70. The release button signal (RB) represents a full-depression state of the release button when it is ON, and represents a non-full depression state when it is OFF.

The release button signal (RB) is used for starting exposure control of the main CPU 70 and for pursuit operation control of the AF CPU 30.

A frame-speed mode signal DM is used for sending frame-speed mode selection state information of a frame-speed mode selection means 61, an external operation member arranged on the body 20, to a port P11 of the AF CPU 30 and a port Q6 of the main CPU 70.

The frame-speed mode signal (DM) represents three frame-speed modes C1, C2, and S. The mode C1 is a high-speed continuous photographing mode. In this mode, while the release button 60 is fully depressed, when an exposure is completed, the next exposure is immediately performed, and almost no AF operation is performed between adjacent exposures.

The mode C2 is a normal continuous photographing mode. In this mode, at least one AF operation is performed between adjacent exposures while the release button 60 is fully depressed, and a frame speed is lower than that in the frame-speed mode C1.

The mode S is a single photographing mode. In this mode, when the release button 60 is fully depressed, an exposure is performed once.

A focus mode signal FM is used for sending focus mode selection state information of a focus mode selection means 62 as, an external operation member arranged on the body 20, to a port P12 of the AF CPU 30 and a port Q7 of the main CPU 70.

The focus mode signal (FM) represents three focus modes C, O, and M. The mode C is a continuous AF mode. In this mode, the photographing lens 11 continuously undergoes servo to an in-focus position on the basis of the detected defocus amount.

The mode O is a one-shot mode. In this mode, once the photographing lens 11 reaches the in-focus position, the servo of the photographing lens 11 is not performed.

The mode M is a manual mode. In this mode, no servo of the photographing lens 11 is performed, and an AF result is displayed only on the display means 40.

Table 1 summarizes the above-mentioned I/O signals.

The relationship between the operations of the AF CPU 30 and the main CPU 70 and a combination of the frame speed mode and the focus mode will be described below.

When the focus mode is the manual mode (M), since the AF CPU 30 does not drive the AF motor 50, the AF permission signal (AF) is unnecessary for the AF CPU 30. The AF CPU 30 starts storage of the CCD after it detects that the mirror-up signal (MR) of the main CPU 70 is OFF.

The main CPU 70 performs the exposure in accordance with the frame speed mode when the release button is fully depressed regardless of the release permission signal (RL).

When the focus mode is the one-shot AF mode (O), the AF CPU 30 drives the AF motor 50 only when the AF permission signal (AF) is ON, and at the same time, starts storage of the CCD after it detects that the mirror-up signal (MR) is OFF. Once the photographing lens 11 reaches the in-focus position, the CPU 30 fixes display and drive operations.

The main CPU 70 can start the exposure when the release permission signal (RS) of the AF CPU 30 is ON and the release button signal (RB) is ON.

Therefore, when the focus mode is the one-shot AF mode, the frame speed modes C1 and C2 cause essentially the same operations.

When the focus mode is the continuous AF mode (C) and the frame speed mode is the mode C1 or S, the AF CPU 30 drives the AF motor 50 only when the AF permission signal (AF) is ON, and at the same time, starts storage of the CCD after it detects that the mirror-up signal (MR) is OFF.

In this case, even after the photographing lens 11 reaches the in-focus position, the display drive operation is updated.

The main CPU 70 performs the exposure according to the frame speed mode C1 or S when the release button signal indicates a full-depression state regardless of the release permission signal (RL).

Therefore, when the focus mode is the mode C and the frame speed mode is the mode C1, the main CPU 70 does not provide a time margin between adjacent exposures. Therefore, the AF CPU can drive the AF motor 50 within a short period of time from completion of wind-up charge to the start of next wind-up charge.

A combination of the focus mode C and the frame speed mode C2 defines a special mode (pursuit mode) for a pursuit operation best suitable for a moving object (to be described later). The AF CPU 30 can drive the AF motor 50 only when the AF permission signal (AF) is ON, and starts storage of the CCD after it detects that the mirror-up signal (MR) is OFF in the same manner as in the above-mentioned mode selection. When the drive amount of the AF motor 50 is calculated, a pursuit algorithm (to be described later) is used. When a moving object is determined, the AF motor 50 is driven by a drive amount corresponding to a sum of a defocus amount and a pursuit-correction amount. At the same time, the AF display mode is changed.

In the pursuit mode, the AF CPU 30 limits a single drive time of the AF motor 50 upon full-depression of the release button signal (RB) to a predetermined period of time, and makes the release permission signal (RL) ON after the lapse of the predetermined period of time, thus adjusting a timing between the AF operation and the exposure.

In the pursuit mode (focus mode C and frame speed mode C2), the main CPU 70 starts the exposure when the release permission signal (RL) is ON and the release button signal (RB) is ON.

Table 2 summarizes the relationship between the combinations of the frame speed mode and the focus mode and the pursuit operation. From Table 2, the pursuit mode for determining the drive amount of the AF motor 50 for a moving object by adding a pursuit correction amount to a normal defocus amount is selected only when the focus mode C and the frame speed mode C2 are selected.

The operations of the AF CPU 30 and the main CPU 70 will be described in detail below with reference to FIGS. 3 and 4.

Figure 3:
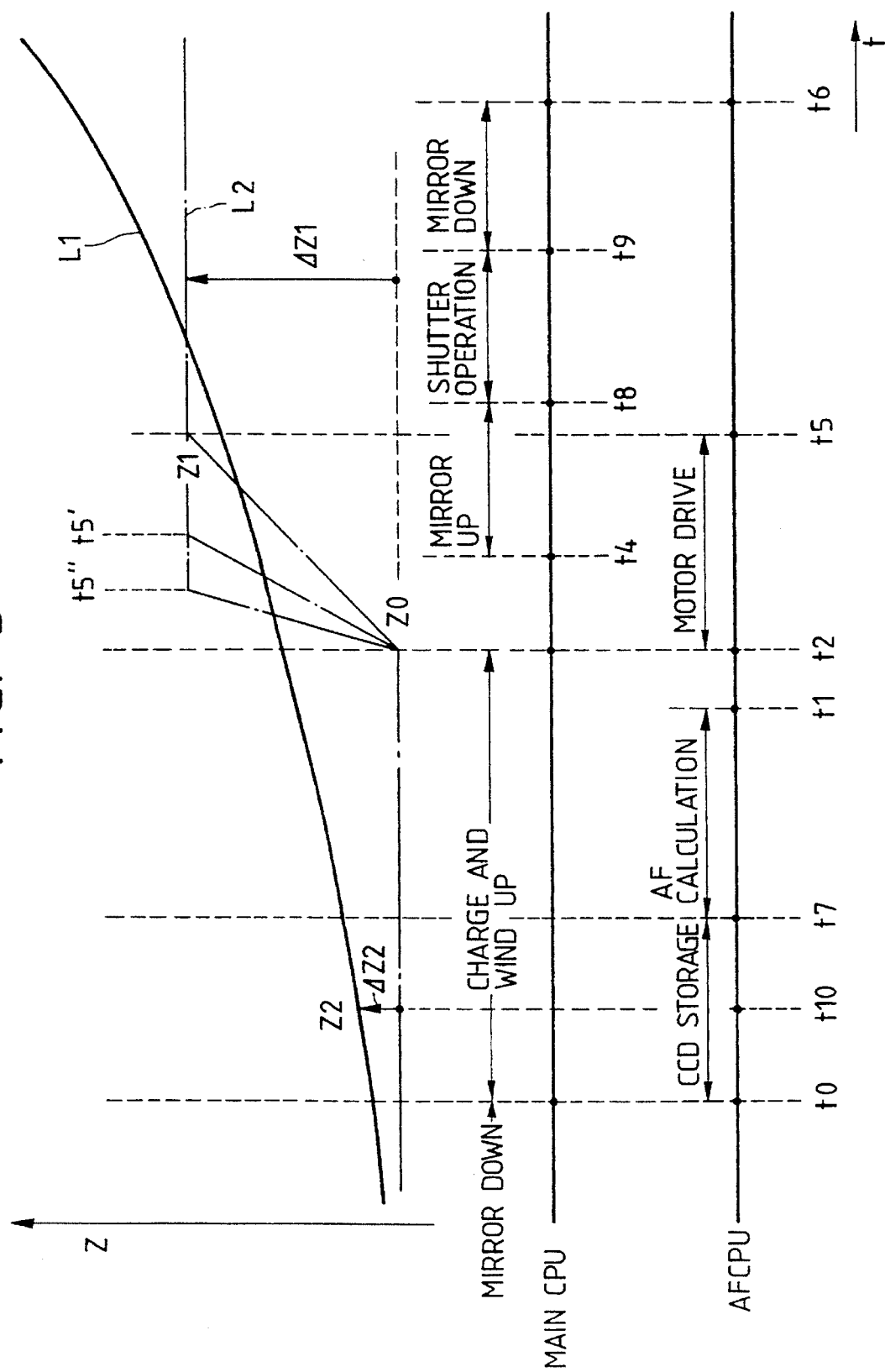
FIGS. 3 and 4 are operation timing charts of the embodiment of the present invention.

FIG. 3 shows the relationship between movements of an object and the photographing lens and the operations of the AF CPU 30 and the main CPU 70 when the release button is fully depressed in the pursuit mode. A lens position Z is plotted along the ordinate, and a time t is plotted along the abscissa. A solid curve L1 is a path of an ideal position of the photographing lens 11 necessary for always forming an object image on a film surface when an object is continuously moved.

An alternate long and short dashed curve L2 is an actual moving path of the photographing lens 11. At time t0 at which the main CPU ends the mirror-down operation, the photographing lens stands still, and its lens position is Z0. The AF CPU starts storage of the CCD from time t0, and ends storage at time t7. The AF CPU starts A/D conversion of the CCD data and AF calculation from time t7. In the pursuit mode, when an object is determined as a moving object in the pursuit algorithm as will be described later, the photographing lens is driven according to an amount as a sum of a stationary object defocus amount calculated by the AF calculation and a pursuit correction amount. In this case, a sum (pursuit defocus amount) of a defocus amount corresponding to a difference ($\Delta Z2 = Z2 - Z0$) between the solid curve L1 and the alternate long and short dashed curve L2 at time t10, an intermediate point between times t0 and t7, and a (previous) pursuit correction amount is calculated at time t1.

The main CPU starts the charge and wind-up operations from time t0, and ends them at time t2. When the charge and wind-up operations are ended at time t2, the AF CPU starts a motor drive operation to move the photographing lens 11 by an amount ($\Delta Z1 = Z1 - Z0$) as a sum of the previous pursuit defocus amount as a new pursuit correction amount and a present defocus amount. The main CPU starts the mirror-up operation from time t4 a predetermined period of time after the motor drive start time t2. The AF CPU forcibly ends the motor drive operation at time t5 a predetermined period of time after the motor drive start time t2.

The main CPU ends the mirror-up operation at time t8 a predetermined period of time after time t4, and starts a shutter operation. At time t9, the main CPU ends the shutter operation, and starts a mirror-down operation. At time t6, the main CPU ends the mirror-down operation.

The main CPU starts the charge and wind-up operations again from time t6, and the AF CPU starts a CCD storage operation for the next exposure.

As described above, in the pursuit mode, a time for AF and motor drive operations is always set between adjacent exposures, and at the same time, the timing of the shutter operation is set near the end timing of the motor drive operation. Therefore, as shown in FIG. 3, the exposure can be performed at a timing at which a deviation between the paths L1 and L2 is small, thus forming a just-in-focus photograph.

For the sake of descriptive convenience, a drive operation by a necessary pursuit defocus amount AZ1 is completed just between a predetermined AF motor drive time interval (t2 to t5). In practice, the drive operation need only be ended at time t5' or t5" before completion of the motor drive time interval (t2 to t5) defined as a given value, and during a remaining time interval, the AF motor is stopped, thus facilitating control.

In any case, a drive operation by the necessary defocus amount $\Delta Z1$ must be ended within the predetermined motor drive time interval (t2 to t5).

The AF motor drive time interval is determined to be an interval in which a drive operation by the defocus amount of 3 to 4 mm can be completed, e.g., about 100 ms.

In this manner, the constant AF motor drive time interval is set, and the mirror-up operation is started at time t4 a predetermined period of time after the motor drive start time t2, thus allowing the accurate pursuit exposure.

More specifically, since a cycle time (t0 to t6) can be rendered constant regardless of the drive amount, the defocus amount obtained by the AF calculation can be repetitively calculated in a period of this cycle time. Therefore, discrimination of the presence/absence of a moving object (to be described later), calculation of the pursuit correction amount, and the like can be easily and accurately performed. A time interval is set such that the mirror-up operation is performed at time t4 a predetermined period of time after motor drive start time t2, the shutter operation is started upon completion of the mirror-up operation, and a drive operation by a necessary drive amount is completed until time t8 at which exposure starts. Therefore, a time interval from the beginning of the motor drive operation to exposure (t2 to t8) can be rendered constant, and an accurate predicted drive operation can be performed so that the curves L1 and L2 cross at an instance of exposure.

When an object is moving and its speed varies, if the time interval between time t2 and time t8 is not constant, a change in lens drive amount corresponding to the movement of the object during a time interval corresponding to the variation must be calculated and corrected by any means, and it is very difficult to control so that the curves L1 and L2 cross or coincide with each other at an instant of exposure.

Therefore, it is important to determine a constant AF motor drive time, and to start the mirror-up operation a predetermined period of time after the beginning of the motor drive operation in terms of improvement of the pursuit operation.

Figure 4:
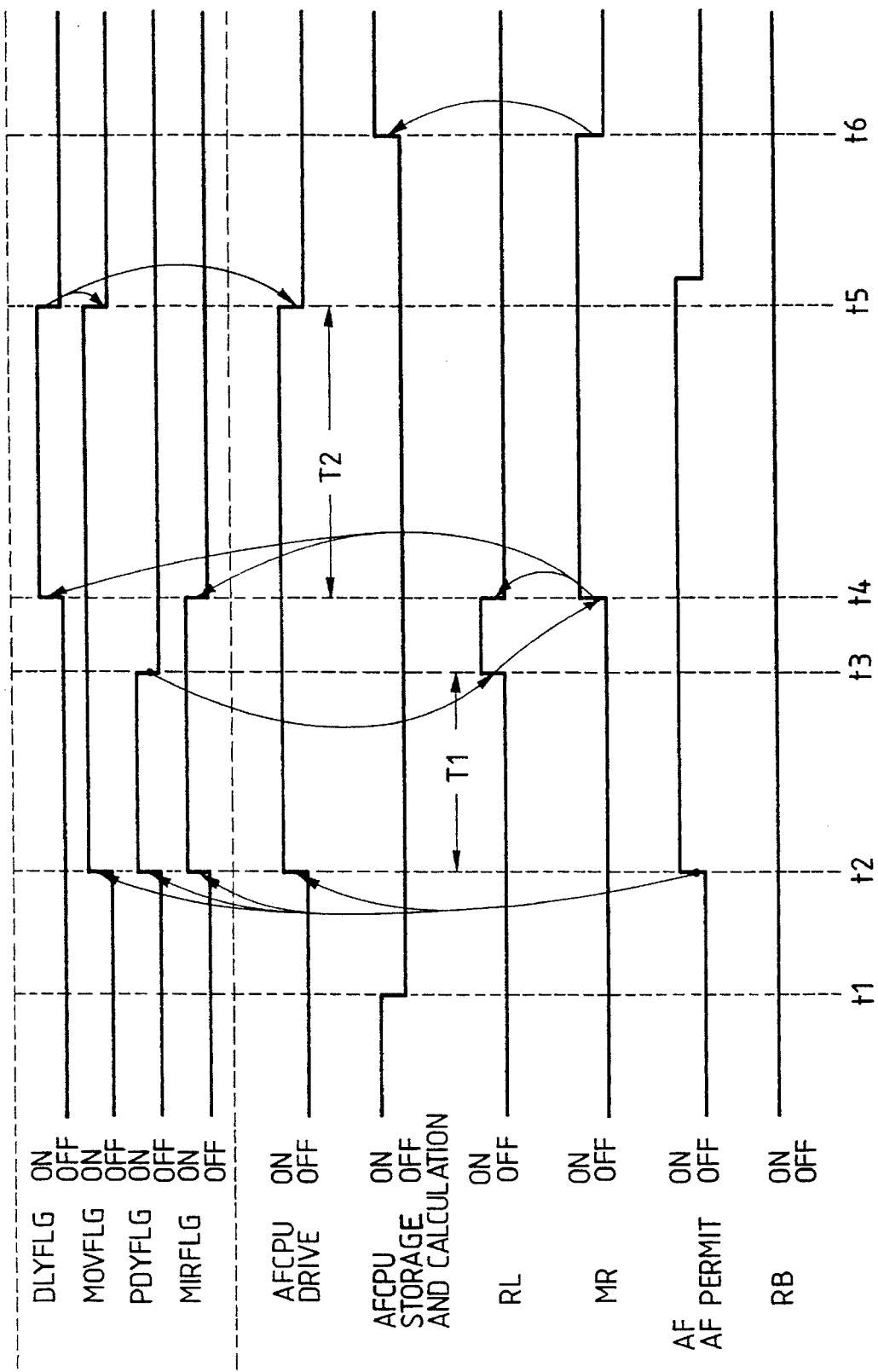

FIG. 4 is an operation flow chart showing the operation in the pursuit mode of the AF CPU in view of the relationship between internal flags and I/O signals.

A delay flag (DLYFLG) is a flag representing a motor delay drive state after the mirror-up operation. The delay flag indicates that the motor is in a motor delay drive state when it is ON, and indicates that the motor is not in the delay drive state when it is OFF.

A drive state flag (MOVFLG) is a flag representing a motor drive state. This flag indicates that the motor is being driven when it is ON, and indicates that the motor is inactive when it is OFF.

A pursuit delay flag (PDYFLG) is a flag representing a motor pursuit delay drive state from the beginning of the motor drive operation until the mirror-up operation is started in the pursuit mode. This flag indicates that the motor is in a pursuit delay drive state when it is ON, and indicates that the motor is not in the pursuit delay drive state when it is OFF.

A mirror flag (MIRFLG) is a flag representing a pre- or post-mirror up state in the pursuit mode. This flag indicates the pre-mirror up state when it is ON, and indicates the post-mirror up state when it is OFF.

In FIG. 4, the frame speed mode C2 and the focus mode C are selected, that is, the pursuit mode is selected, and the release button signal (RB) indicates a full-depression state (ON).

The AF CPU ends (OFF) the CCD storage and AF calculation at time t1, and waits for AF permission from the main CPU.

At time t2, the main CPU completes the wind-up and charge operation, and sets the AF permission signal to be ON (permission). The AF CPU detects the ON AF permission signal, and starts the motor drive operation on the basis of the AF calculation result. At the same time, the AF CPU sets the drive state flag (MOVFLG) to be ON (motor drive state), the pursuit delay flag (PDYFLG) to be ON (pursuit delay state), and the mirror flag (MIRFLG) to be ON (pre-mirror up state).

The AF CPU starts counting of a pursuit delay time interval (T1) from time t2, and ends counting at time t3. The AF CPU resets the pursuit delay flag (PDYFLG) to be OFF (not pursuit delay state), and sets the release permission signal (RL) to be ON (permission) with respect to the main CPU. When the pursuit delay time interval (T1) is set, a predetermined AF motor drive time interval can be assured until the mirror-up operation is started.

The main CPU detects the ON release permission signal (RL), and starts mirror-up operation from time t4 and at the same time, sets the mirror-up signal to be ON (up).

The AF CPU detects the ON mirror-up signal (MR), and sets the release permission signal (RL) to be OFF (inhibition). At the same time, the AF CPU resets the mirror flag (MIRFLG) to be OFF (post-mirror up state), and sets the delay flag (DFYFLG) to be ON (delay state).

The AF CPU counts a delay time interval (T2) from time t4. When the AF CPU completes counting at time t5, it resets the delay flag (DLYFLG) to be OFF (not delay state). When the motor drive operation is not completed before time t5, the AF CPU forcibly ends the motor drive operation, and resets the drive state flag (MOVFLG) to be OFF (stop state).

The AF CPU waits until the mirror-up signal (MR) is set to be OFF (down).

When the main CPU completes a series of the mirror-up operation, the shutter operation, and the mirror-down operation starting from time t4, it sets the mirror-up signal (MR) to be OFF (down) at time t6. The AF CPU detects this signal, and starts the next CCD storage operation.

As described above, in the pursuit mode, the AF and AF motor drive operations are performed once each between adjacent exposures, and a maximum of the AF motor drive time interval corresponding to a pursuit delay time interval (T1) and a drive delay time interval (T2) can be assured. Therefore, the pursuit operation can be satisfactorily performed with respect to an object which moves fast.

The operation of the AF CPU in the pursuit mode along with the lapse of time has been briefly described.

The detailed programs of the AF CPU and the main CPU and their operations in this embodiment will be described below.

The program of the main CPU will now be described with reference to the flow charts of FIGS. 5 and 6.

The main CPU incorporates a timer, and has a timer interruption function. A program is constituted by a main program shown in FIG. 5, and a timer interruption program shown in FIG. 6.

Figure 5:
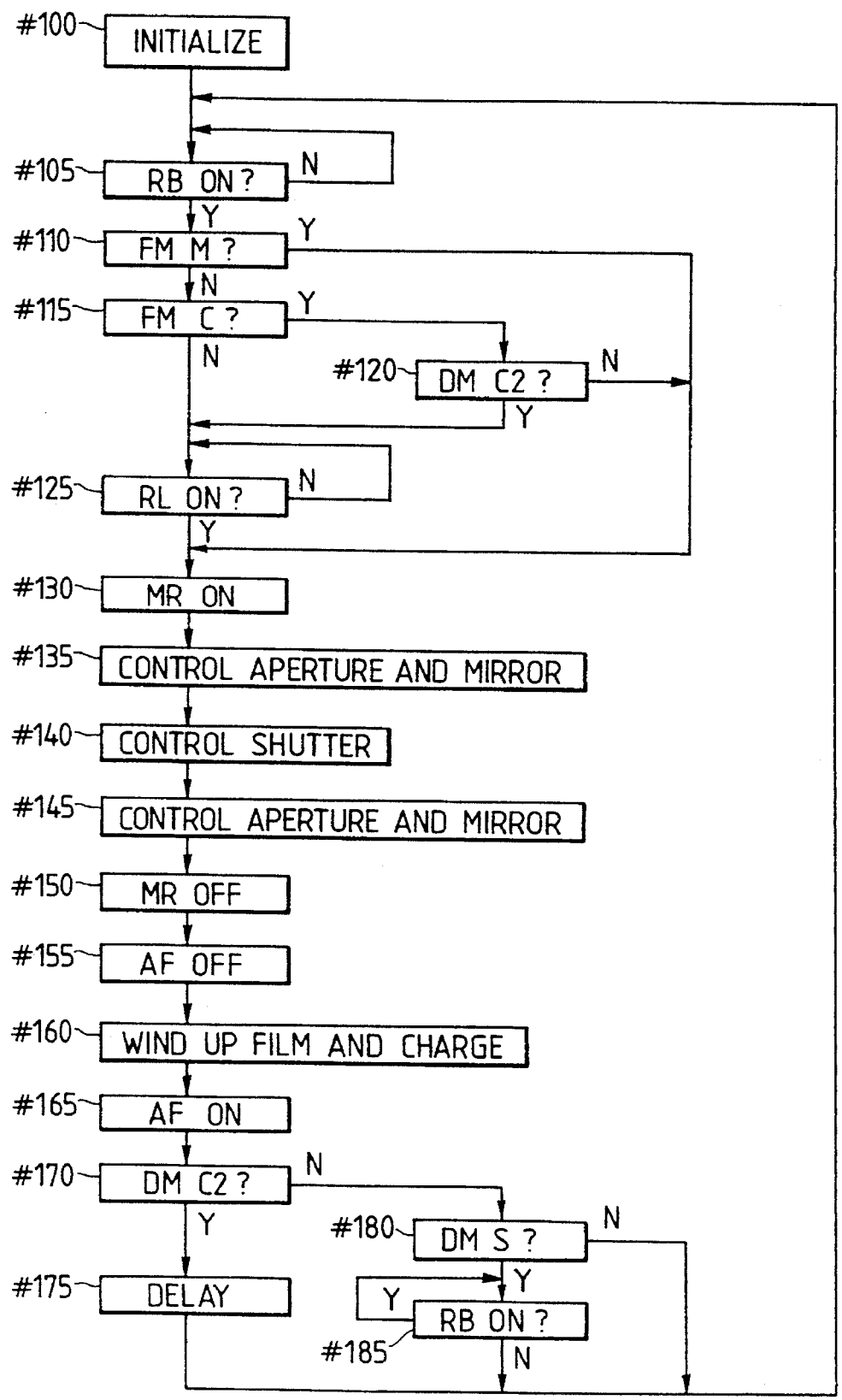
FIGS. 5 and 6 are flow charts of programs of a main CPU.

In FIG. 5, in step #100 of the main program, initialization is performed. More specifically, the I/O signals to the AF CPU, i.e., the mirror-up signal (MR) is set to be OFF (down), and the AF permission signal is set to be ON (permission).

The timer is set to perform timer interruption every predetermined time interval, e.g., 50 ms, and timer interruption is permitted.

In step #105, it is waited until the release button signal (RB) is set to be ON (full-depression).

If YES (Y) in step #105, the flow advances to step #110 to test if the focus mode (FM) is the manual mode (M). If YES in step #110, the flow jumps to exposure processing in step #130 and subsequent steps without waiting for release permission in steps #115 to #125. If NO (N) in step #110, it is tested in step #115 if the focus mode (FM) is the continuous AF mode (C). If NO in step #115, i.e., if the one-shot AF mode is set, the flow advances to step #125. If YES in step #115, it is tested in step #120 if the frame speed mode is the continuous photographing mode (C2). If NO in step #120, the flow jumps to step #130. If YES in step #120, the flow advances to step #125.

In step #125, it is waited until the release permission signal (RL) becomes ON (permission). If YES in step #125, the flow advances to step #130.

In steps #110 to #125 described above, only when the focus mode is the one-shot AF mode or when the focus mode is the continuous AF mode and the frame speed mode is the mode C2, i.e., the pursuit mode is selected, the release permission signal from the AF CPU is waited, and then, the flow advances to exposure processing in step #130 and subsequent steps. When other modes are selected, the exposure processing in step #130 and subsequent steps is executed.

In step #130, the mirror-up signal (MR) is set to be ON (up). In step #135, aperture control is performed on the basis of the AE calculation result performed in timer interruption processing (to be described later) so as to obtain a target aperture value, and at the same time, mirror-up control is performed. In step #140, shutter control is performed on the basis of a shutter speed calculated by an AE calculation. In step #145, mirror-down control is performed, and aperture control is performed to set a full aperture. In step #150, the mirror-up signal (MR) is set to be OFF (down). In step #155, the AF permission signal (AF) is set to be OFF (inhibition). In step #160, wind-up and charge control operations are performed. When the wind-up and charge control. operations are completed, the AF permission signal (AF) is set to be ON (permission).

It is tested in step #170 if the frame speed mode is the normal continuous photographing mode (C2). If YES in step #170, the flow advances to step #175, and after a predetermined delay time, the flow returns to step #105.

If NO in step #170, it is tested in step #180 if the frame speed mode is the single mode (S). If YES in step #180, it is waited until the release button signal (RB) does not indicate a full-depression state (OFF) in step #185. If NO in step #185, the flow returns to step #105.

If NO in step #180, i.e., if the high-speed continuous photographing mode (C1) is set, the flow immediately returns to step #105, and the next exposure sequence is repeated.

Figure 6:
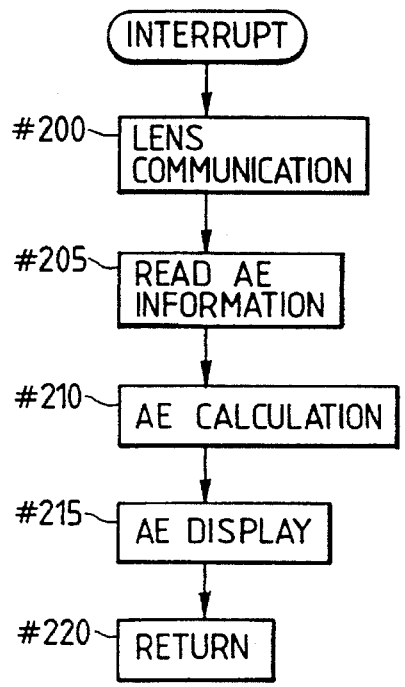

FIG. 6 shows a timer interruption program of the main CPU. During execution of the main program by the main CPU, the timer interruption program is started every predetermined period of time (e.g., 50 ms).

When timer interruption is performed, the main CPU communicates with the lens CPU 13 shown in FIG. 1 through the communication bus 64 in step #200, and fetches AE information of the lens (set aperture value, focal length, and the like).

In step #205, the main CPU acquires AE information of the body (photometric value, film sensitivity, and the like) from the AE information means 85 shown in FIG. 1.

In step #210, an AE calculation is performed on the basis of the lens AE information and the body AE information to determine a target aperture value and shutter speed.

In step #215, the results obtained by the AE calculation are displayed on the display means 86 shown in FIG. 1, and the flow returns to the main program in step #220.

The program operation of the main CPU has been described.

A program of the AF CPU will be described below.

The AF CPU incorporates a memory for storing A/D conversion data of the CCD outputs, the timer, and the pulse counter, and has a timer interruption function and a pulse counter interruption function.

Table 3 summarizes names and meanings of flags used in the program of the AF CPU.

Table 4 summarizes names and contents of data used in the program of the AF CPU.

Figure 27:
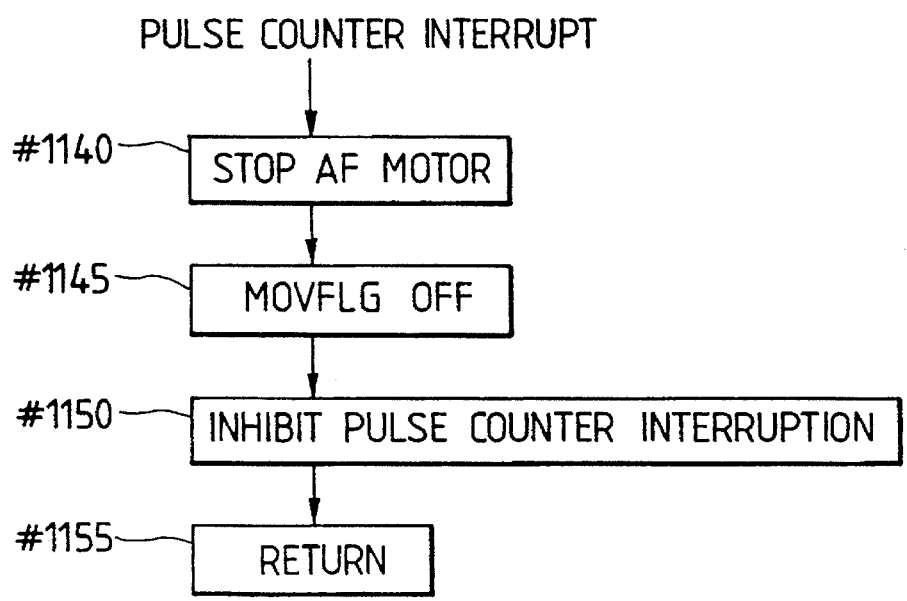
Figure 26A:
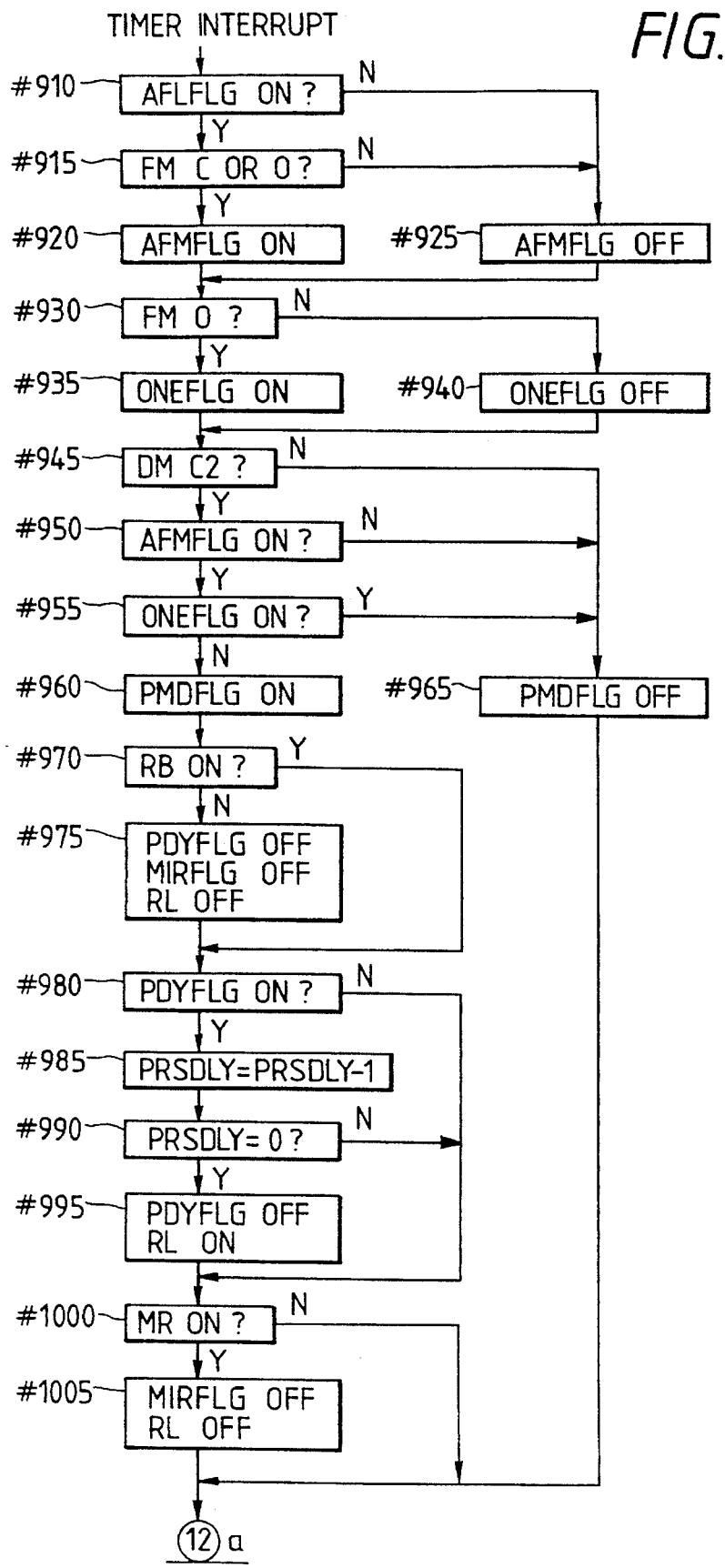
Figure 26B:
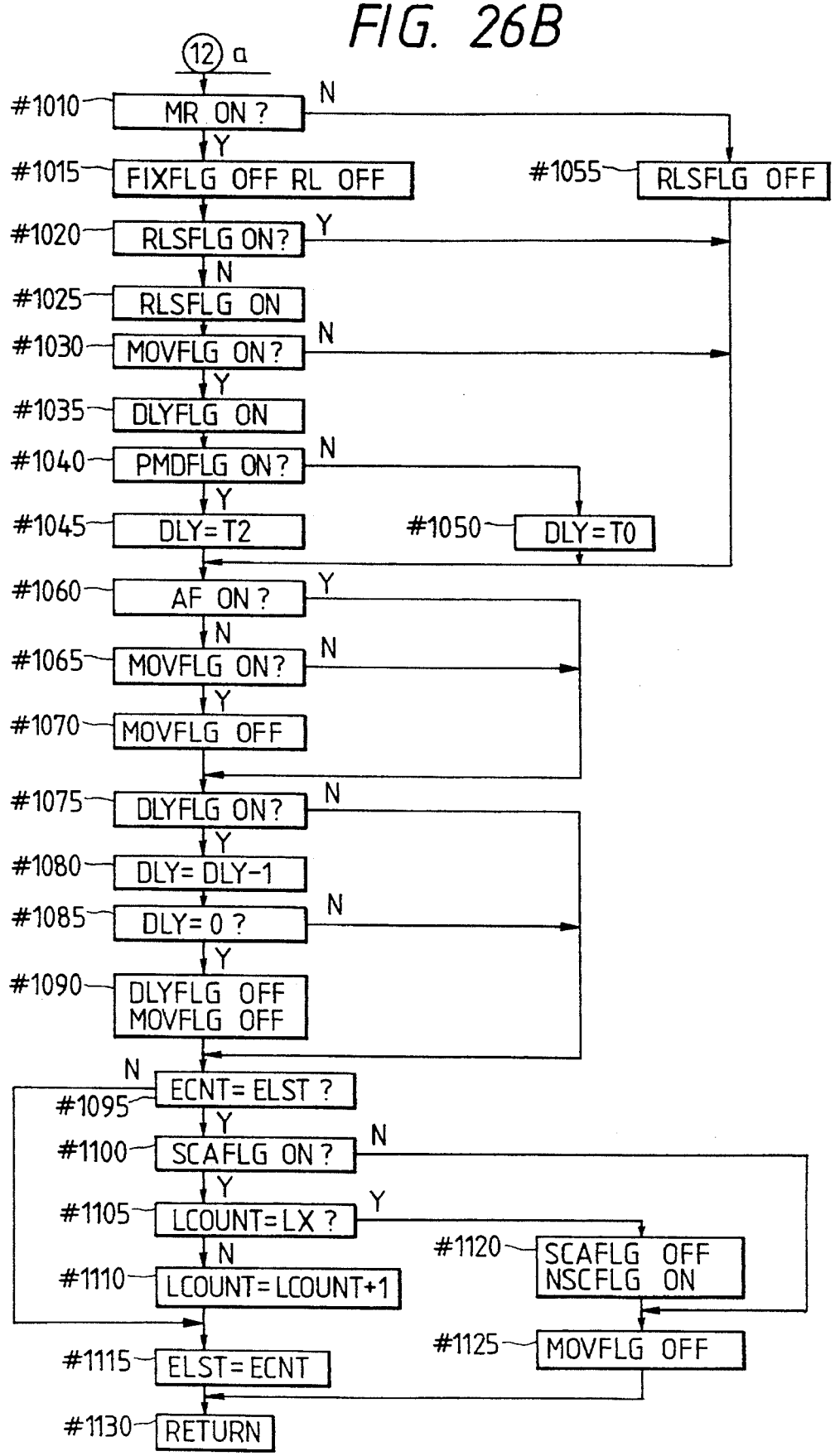

The program of the AF CPU is constituted by a main program and two interruption programs (a timer interruption program and a pulse counter interruption program) shown in FIGS. 26A, 26B, and 27.

Figure 7:
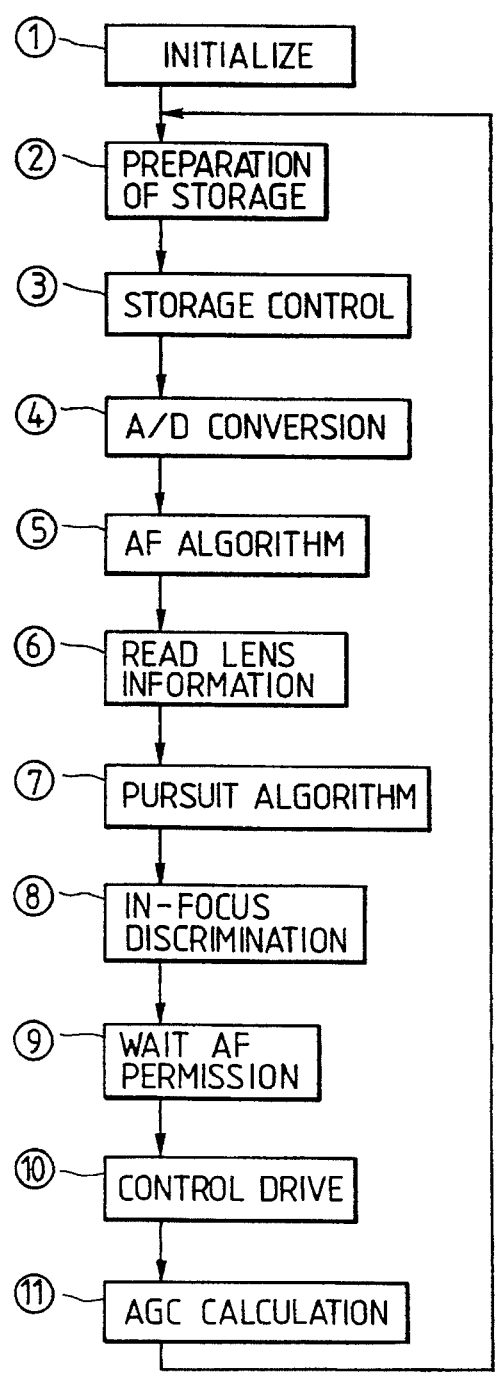
FIGS. 7 to 9, FIGS. 11 to 13, FIGS. 16 to 17B, and FIGS. 22 to 27 are flow charts of programs of an AF CPU.

The main program consists of modules ① to ⑪, as shown in FIG. 7, and has a large loop architecture.

In an initialization module ① of the main program, various flags, data, and signals are initialized.

In a storage preparation module ②, it is checked if the CCD storage operation can be started. When the storage operation can be permitted (the mirror is down and the AF motor stands still), start and end times of the storage operation, and management of a storage time are controlled in a CCD storage control module ③.

In a CCD output A/D conversion module ④, CCD data obtained by A/D-converting CCD outputs are stored in the internal memory.

In an AF algorithm module ⑤, the stored data undergo a predetermined AF calculation to calculate a defocus amount of a stationary object.

In a lens information read module ⑥, the AF CPU communicates with the lens CPU to read lens AF information necessary for the motor drive operation and the like.

In a pursuit algorithm module ⑦, it is checked if an object is a moving object. If an object is determined as a moving object, a pursuit correction amount is added to the defocus amount for the stationary object to determine a motor drive amount (pursuit drive amount) for the moving object.

In an in-focus discrimination/display module ⑧, it is checked if an in-focus state is set (whether or not the defocus amount falls within an in-focus zone). The discrimination result is displayed on the AF display means 40 shown in FIG. 1.

In an AF permission wait module ⑨, it is waited until the AF permission signal (AF) becomes ON (permission) in the pursuit mode.

In a drive control module ⑩, the defocus amount is converted to a pulse count, the pulse count data is set in the comparison register, and the AF motor begins to drive in an in-focus direction.

In an AGC (auto-gain control) calculation module ⑪, a next CCD storage time (INTT) is determined on the basis of the presently obtained CCD data so that next CCD data can have appropriate values. The flow returns to the storage preparation module ②.

The main program of the AF CPU has been briefly described above. The CCD storage operation and the photographing lens drive operation by the AF motor drive operation are time-serially independent sequences.

In a timer interruption module ⑫, detection processing of changes in various I/O signals, set/reset processing of flags according to the detected changes, management of a drive delay time interval, and detection of a lens end are performed.

In a pulse counter interruption module ⑬, AF motor drive stop processing is performed.

The operations of the above modules will be described in detail below.

Figure 8:
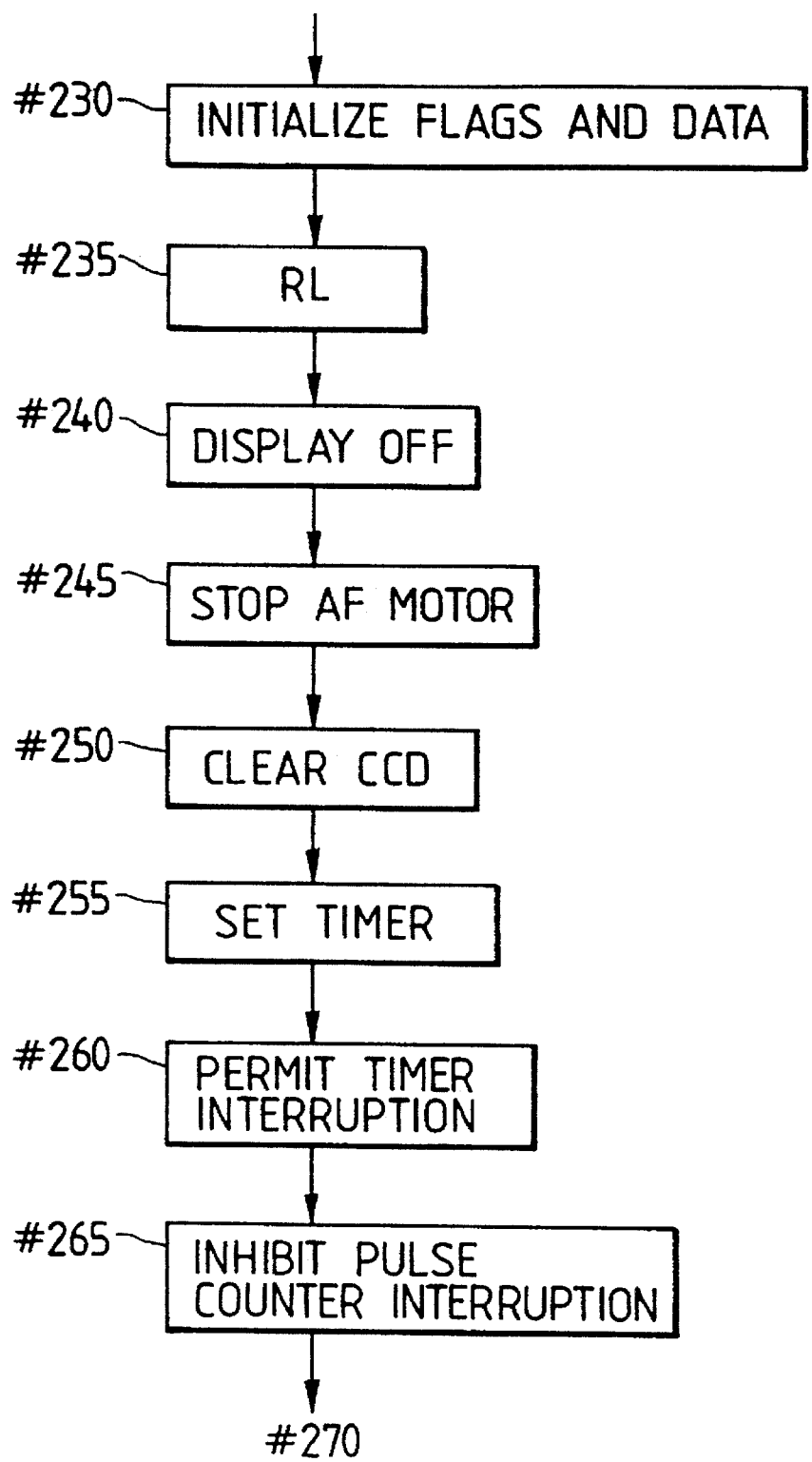

FIG. 8 is a flow chart of the initialization module ①. The AF CPU starts processing from step #230 upon power-ON or resetting. In step #230, various flags and data used in the program of the AF CPU are initialized. Initial values of the flags and data are as shown in Tables 3 and 4. In Table 4, data having a blank column of the initial value does not require initialization.

The initial value of the CCD storage time (INTT) is set to be a predetermined value IZ (e.g., 1 ms).

In step #235, the release permission signal (RL) is set to be OFF (inhibition). This is to inhibit the exposure even if the release button is immediately fully depressed upon power-ON in the one-shot AF mode or the pursuit mode.

In step #240, the indicators 41, 42, 43, and 44 of the AF display means 40 shown in FIG. 1 are turned off. In step #245, the AF motor is initialized (stopped).

In step #250, an instruction for discharging the transfer portions of the light-receiving portions of the CCD and setting the CCD in a storage end state is supplied to the sensor control means 26 shown in FIG. 1, thus initializing the CCD. In step #255, the timer and the like incorporated in the AF CPU are set, so that timer interruption is performed every predetermined period of time (e.g., 1 ms).

In step #260, the timer interruption is permitted.

In step #265, pulse counter interruption for stopping the AF motor drive operation is inhibited, and the flow advances to the storage preparation module ②.

Since the program has the loop architecture as described above, a description of the storage preparation module ② and following modules will be made not as an operation upon power-ON but as an operation after the loop is circulated several times.

Figure 9:
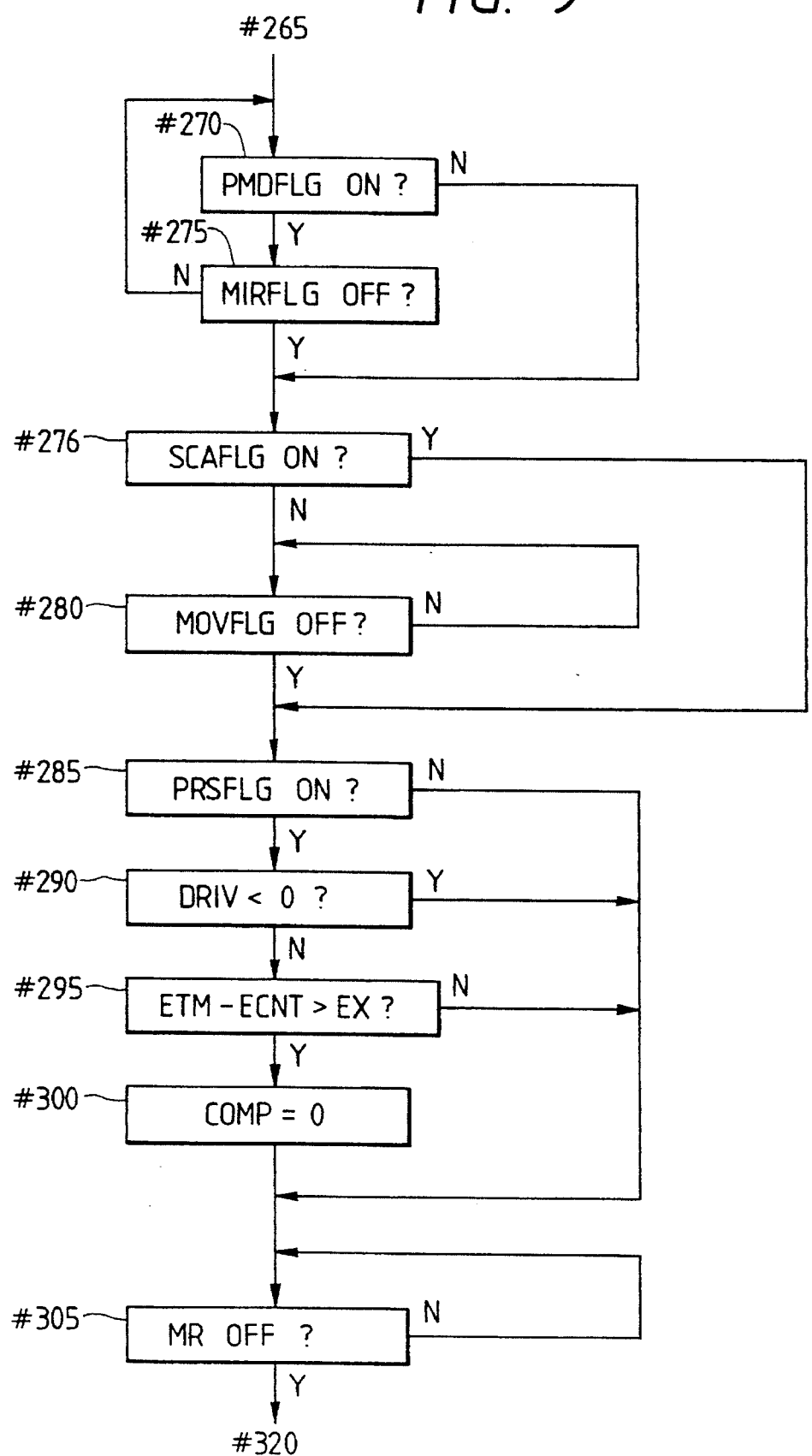

FIG. 9 shows a flow chart of the storage preparation module ②.

It is tested in step #270 if the pursuit mode is set. If NO in step #270, the flow jumps to step #276. If YES in step #270, it is tested in step #275 if the mirror-up operation is completed. If NO in step #275, the flow returns to step #270, and the above processing is repeated. If YES is obtained in step #275, the flow advances to step #276.

The processing operations in steps #270 and #275 are those for performing the AF calculation and the AF motor drive operation once between adjacent exposures when the pursuit mode is selected and the release button is fully depressed, as shown in the operation timing chart of FIG. 4.

While the release button is fully depressed in the pursuit mode, the mirror flag (MIRFLG) is set to be ON at the beginning of the AF motor drive operation, as will be described later, and the next CCD storage operation is started after the mirror flag (MIRFLG) is set to be OFF upon completion of the mirror-up operation.

In a mode other than the pursuit mode, since the AF calculation and the AF motor drive operation are repetitively performed so far as time permits, the flow skips step #275. In the pursuit mode, the AF calculation is performed only once between adjacent exposures for the following reason.

More specifically, in the pursuit operation in the continuous photographing mode, the pursuit correction amount is calculated so that a just-in-focus state is obtained at an instant of exposure, and the lens is drive-controlled to attain this, as has been described above.

In order to achieve the above object with high accuracy, exposure, storage calculation, drive operation, exposure, storage calculation, drive operation, . . . are preferably repeated at predetermined time intervals. When the number of times of the storage calculation performed between exposure and the drive operation varies every cycle, a cycle time is varied, and it is very cumbersome or difficult to accurately discriminate a moving object and to calculate an accurate pursuit correction amount.

It is tested in step #276 if the AF motor is in a scan state (SCAFLG is ON). If YES in step #276, the flow jumps to step #285 without waiting until the AF motor drive operation is stopped in step #280. In only the scan state, the AF motor scan drive operation and the CCD storage operation are allowed to be simultaneously performed.

If NO in step #276, the flow advances to step #280.

In step #280, it is waited until the AF motor drive operation is stopped (MOVFLG is OFF). If NO in step #280, the flow advances to step #285. This processing is performed to time-serially separate the CCD storage operation and the AF motor drive operation, as described above. In step #285, it is tested if the pursuit state is set. If NO in step #285, the flow jumps to step #305. In the pursuit state (PRESFLG is ON), it is discriminated in a pursuit algorithm (to be described later) that an object is a moving object, and the AF motor is driven by a drive amount given by (normal drive amount +pursuit correction amount). If YES in step #285, it is tested in step #290 if the object is coming closer (pursuit drive amount DRIV<0, i.e., the drive direction is a closest focusing direction). If YES in step #290, the flow jumps to step #305.

If NO in step #290, i.e., if the object is going away, it is tested in step #295 if the remaining drive amount (estimated pulse count ETM—present pulse count ECNT) is larger than a predetermined amount EX. If NO in step #295, the flow jumps to step #305.

If YES in step #295, the flow advances to step #300, and the pursuit correction amount is cleared (COMP=0).

Note that the pursuit correction amount is data used in the pursuit algorithm (to be described later).

To summarize the processing in steps #285 to #300, when the pursuit mode is set, the object is going away, and the remaining drive amount when the AF motor is stopped is large, the pursuit correction amount is cleared.

The reason for this will be described below with reference to FIG. 10.

Figure 10:
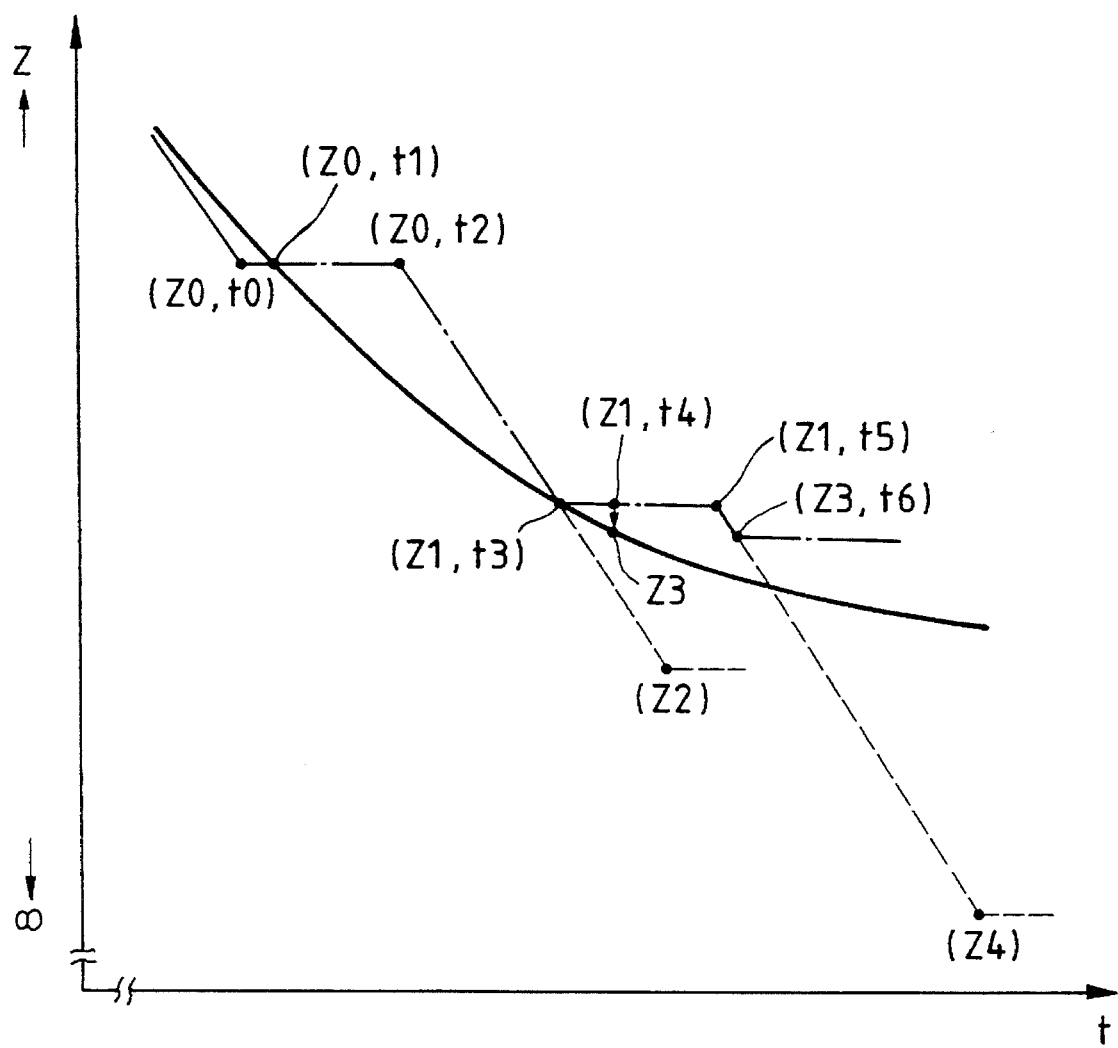
FIG. 10, FIGS. 18A and 18B, and FIGS. 19 to 21B are graphs for explaining programs of the AF CPU.

In FIG. 10, a solid curve represents a path of an ideal lens position of the photographing lens 11 for always forming an object image on a film surface when an object is going away at a constant speed, and an alternate long and short dashed curve represents a path of movement of the photographing lens when the release button is fully depressed in the actual pursuit mode.

A case will be examined below. In this case, at time t0, the photographing lens 11 is stopped at a position Z0, and a CCD storage operation is started. At time t1, an intermediate point of the storage time, the solid curve and the alternate long and short dashed curve cross almost perpendicular to each other, and a defocus amount for a stationary object becomes almost zero. With the pursuit algorithm, the moving object is discriminated, and a drive operation is started from time t2 by a pursuit drive amount (Z2–Z0) added with the pursuit correction amount. When the release button is fully depressed in the pursuit mode, the entire drive time interval of the AF motor is limited to a predetermined period of time (almost T1+T2), as has been described with reference to the operation timing chart in FIG. 4. Therefore, when the pursuit drive amount is large and the photographing lens does not reach a predetermined lens position Z2 until time t2 the predetermined period of time after t2, the drive operation of the AF motor is forcibly stopped at the lens position Z1 at time t3. The CCD storage operation is restarted from time t3. If the solid curve position corresponds to Z3 at time t4, as an intermediate point in the storage time, the defocus amount for a stationary object corresponds to (Z3–Z1). On the other hand, if the object is discriminated as a moving object in the pursuit algorithm again, the pursuit drive amount added with the pursuit correction amount is almost the same as the previous one is (Z4–Z3). When the drive operation is started from time t5 with this drive amount, the lens considerably overruns, as indicated by a broken curve, If it is discriminated at time t5 that the object is not a moving object, the lens is driven from time t5 by a drive amount (Z3–Z1) corresponding to the defocus amount for a stationary object, and reaches a lens position Z3 at time t6, thus being prevented from overrunning from the solid curve.

In the processing in steps #285 to #300 in FIG. 9, when the remaining drive amount becomes large in the pursuit mode (e.g., when the AF motor is forcibly stopped at time t3 in FIG. 10), the pursuit correction amount is cleared. In the pursuit algorithm (to be described later), when the pursuit correction amount is cleared in the pursuit mode, the object is not discriminated as a moving object in that cycle. Therefore, the pursuit mode is reset after time t5, and the photographing lens can be moved along a path indicated by the alternate long and short dashed curve.

In step #290 in FIG. 9, the moving direction of the object is tested, and when the object is coming closer, the pursuit correction amount is not cleared for the following reason. Since the ideal movement of the lens becomes large as the object is coming closer, the problem of overrunning of the photographing lens rarely occurs.

On the other hand, when the object is going away, the ideal movement of the lens becomes small as the object is going away, and the problem of overrunning is posed.

Of course, when the object is coming closer, the same processing as in the case wherein the object is going away can be performed.

The predetermined amount EX in step #295 can be experimentally determined to be a given amount, and can be varied depending on various conditions (lens focal length, AF cycle time=AF time+drive time, and the like).

Referring back to FIG. 9, the storage preparation module ② will be described below again.

In step #305, it is waited until the mirror-up signal (MR) from the main CPU is set to be OFF (down) to prepare for the CCD storage control module ③. If YES in step #305, the flow advances to the CCD storage control module ③.

Figure 11:
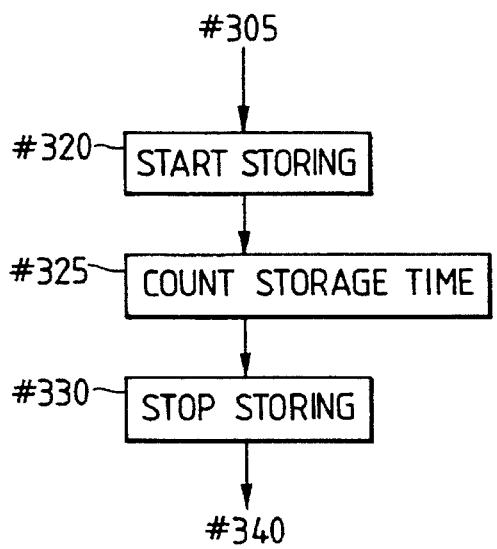

FIG. 11 is a flow chart of the CCD storage control module ③.

Before the flow advances to step #320, whether or not the motor drive operation is stopped is confirmed, and,whether or not the mirror-up signal is set to be OFF (down) and the CCD storage operation is enabled is confirmed in a state other than the motor scan state.

In step #320, the CCD storage start instruction is issued to the sensor control means 26 in FIG. 1 to start the CCD storage operation.

In step #325, the storage time (INTT) determined by the AGC calculation module ⑪ (to be described later) is counted except for the CCD storage operation for the first time.

When the CCD storage operation is performed for the first time, the storage time (INTT=IZ) initially set in the initialization module ⑪ is counted.

The storage time is counted by a timer incorporated in the AF CPU or a software timer.

When the storage time is counted in step #325, the CCD storage end instruction is issued to the sensor control means 26 to end the CCD storage operation, and the flow advances to the CCD output A/D conversion module ④.

Figure 12:
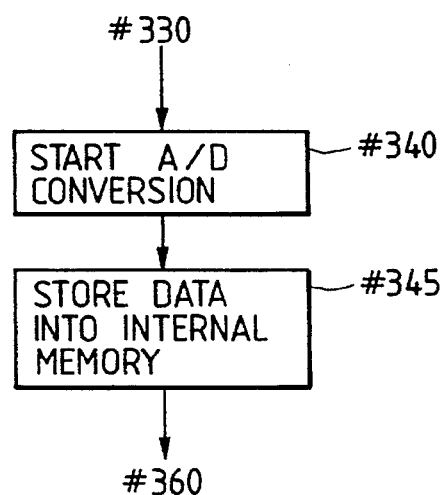

FIG. 12 is a flow chart of the CCD output A/D conversion module ④. In step #340, the AF CPU starts A/D conversion of the CCD outputs sent from the CCD 25 in synchronism with the CCD output sync signal supplied from the sensor control means 26.

In step #345, the CCD outputs are A/D converted a predetermined number of times (2n times) in synchronism with a CCD output transfer clock sent from the sensor control means 26, and CCD data are stored in the internal memory. Pairs of CCD data are A (1) to A (n) and B(1) to B(n), and data A(1) and B(1), data A(2) and B(2) , . . . , data A(n) and B(n) are output data of the corresponding light-receiving elements of the pair of light-receiving portions in FIG. 2. When storage of the CCD data is completed, the flow advances to the AF algorithm module ⑤.

Figure 13:
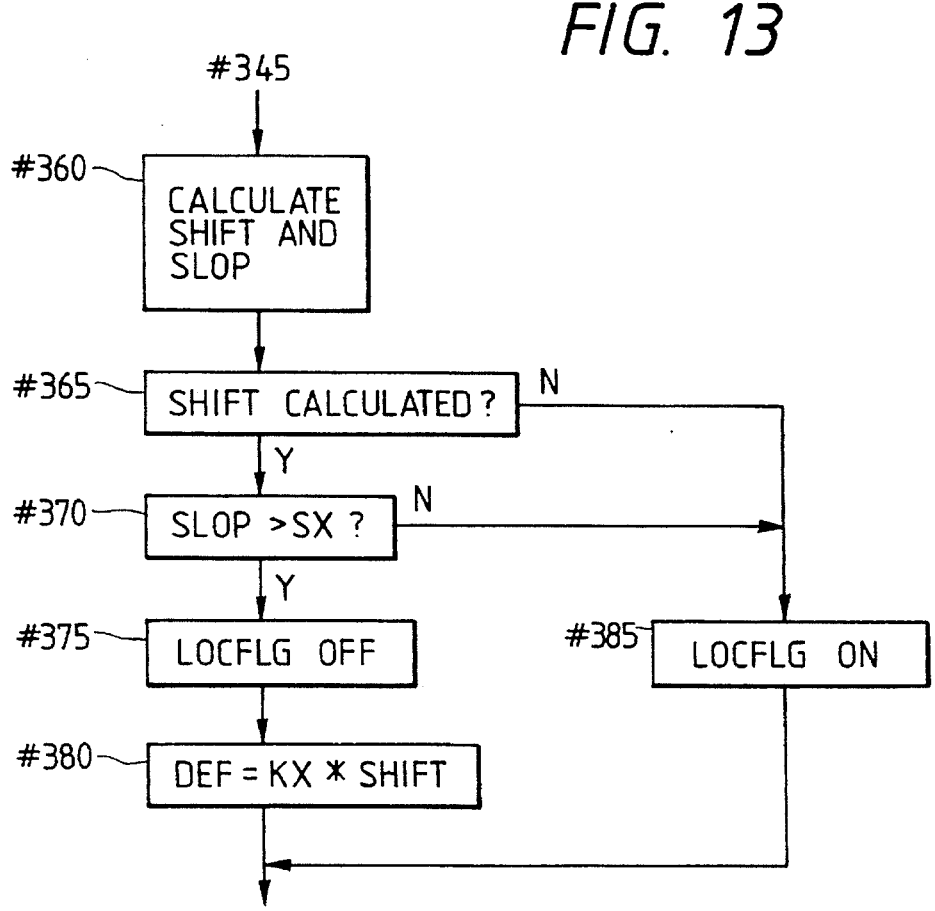

FIG. 13 is a flow chart of the algorithm module ⑤. In step #360, a known correlation calculation disclosed in Japanese Patent Laid-Open (Kokai) No. 60-37513 is performed using the 2n CCD data A(1) to A(n) and B(1) to B(n) stored in the internal memory, thus obtaining a parameter (SLOP) indicating reliability of the calculated lateral shift amount and a relative lateral shift amount (SHIFT) between a pair of object images on the CCD 25 in FIG. 2.

The known correlation calculation will be briefly described below with reference to FIGS. 14 and 15.

A correlation calculation of equation (1) is performed to obtain a correlation amount C(L) between CCD data.

$$C(L) = \sum_i (A(i) - B(i+L)) \quad (1)$$

where L is an integer, and is the relative shift amount while a light-receiving element pitch of a pair of CCD data is used as a unit. The integral calculation in equation (1) is executed within a range wherein the CCD data are present.

Figure 14:
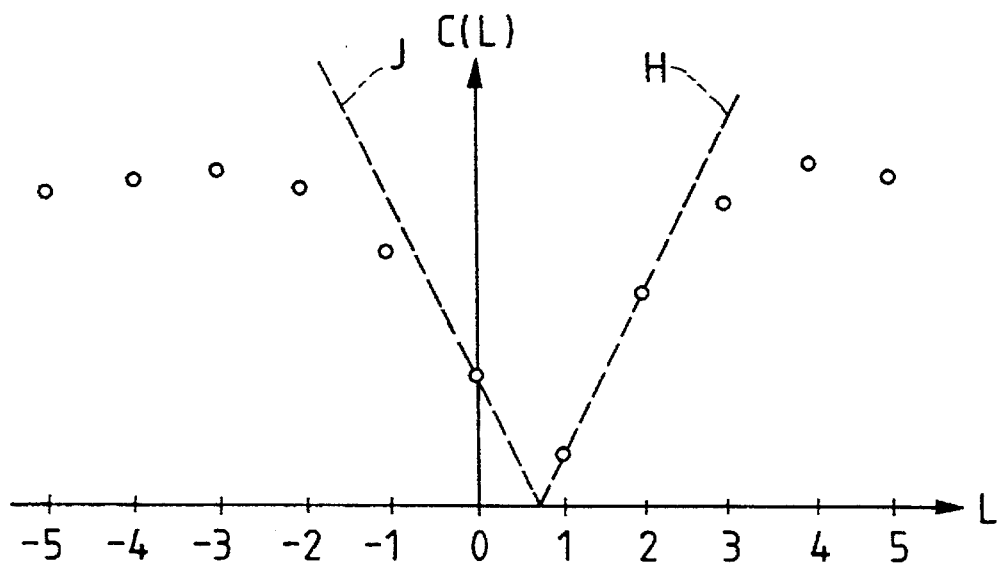
FIGS. 14 and 15 are graphs for explaining focusing calculation.

FIG. 14 shows the calculation result of equation (1) while the relative shift amount L is plotted along the abscissa, and the correlation amount C(L) is plotted along the ordinate. As shown in FIG. 14, the correlation amount C(L) becomes minimum at the shift amount L having high correlation between the pair of CCD data.

However, in practice, since the relative shift amount L is determined on the basis of data discretely obtained from the light-receiving elements constituting the light-receiving portions 29A and 29B, the correlation amount C(L) also becomes discrete data. For this reason, a minimum value $C(L)_{MIN}$ of the correlation amount C(L) is not always obtained from the correlation amount C(L) obtained by the calculation.

Figure 15:
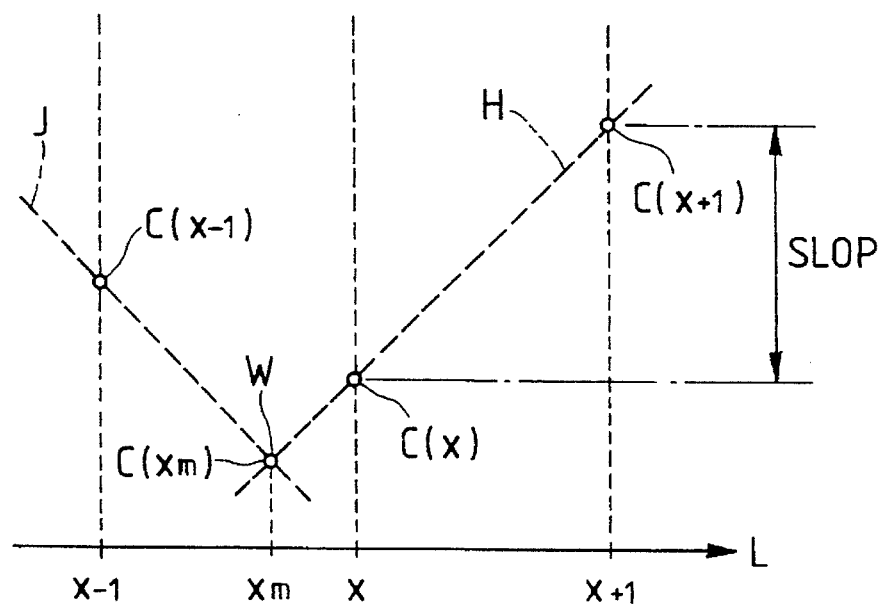

The minimum value $C(L)_{MIN}$ of the correlation amount C(L) is calculated using a three-point interpolation technique shown in FIG. 15.

More specifically, when the minimum value of the discretely obtained correlation amount C(L) is obtained when the relative shift amount L is L=x, the correlation amounts C(L) corresponding to the relative shift amounts (x−1) and (x+1) are C(x−1), C(x), and C(x+1). First, a straight line H connecting the minimum correlation amount C(x) and a larger one of the remaining two correlation amounts C(x−1) and C(x+1) (in FIG. 9, C(x+1)) is drawn, a straight line J passing through the remaining correlation amount C(x−1) and having an opposite gradient to that of the straight line H is then drawn, and an intersection W between these two straight lines H and J is obtained.

The coordinates of the intersection W can be represented by a relative shift amount $x_m$ and its correlation amount $C(x_m)$, and the minimum relative shift amount $x_m$ of a continuous relative shift amount and the minimum correlation amount $C(x_m)$ can be represented by the coordinates.

When the three-point interpolation technique is expressed by an equation, the minimum relative shift amount $x_m$ is given by:

$$x_m = x + \frac{D}{SLOP} \quad (2\text{-}1)$$

The corresponding correlation amount $C(x_m)$ can be given by:

$$C(x_m) = \frac{C(x) - D}{SLOP} \quad (2\text{-}2)$$

In equations (2-1) and (2-2), D is the deviation between data of the relative shift amounts . . . x−1, x, x+1, . . . , and can be expressed by:

$$D = \frac{C(x-1) - C(x+1)}{2} \quad (3)$$

In equations (2-1) and (2-2), SLOP represents a larger one of deviations of the correlation amounts C(x−1), C(x), and C(x+1) corresponding to the relative shift amounts (x−1), x, and (x+1), and can be expressed by:

$$SLOP = MAX(C(x+1) - C(x), C(x-1) - C(x)) \quad (4)$$

In calculation formulas expressed by equations (1) to (4), if the relative shift amount $x_m$ represents a relative shift amount of a pair of CCD data, and a light-receiving element pitch is represented by y, the relative lateral shift amount SHIFT of two object images formed on the CCD 25 can be expressed by:

$$SHIFT = y \times x_m \quad (5)$$

A defocus amount on a focal plane can be given by:

$$DEF = KX \times SHIFT \quad (6)$$

KX is the coefficient determined by conditions of the arrangement of the AF optical system shown in FIG. 2.

As the value of the parameter SLOP obtained by equation (4) is larger, a lower peak value of the correlation amount C(L) shown in FIG. 14 is smaller, i.e, the correlation is high, and hence, reliability of the obtained defocus amount DEF is high.

A description will be continued referring again to FIG. 13.

In step #360, the shift amount (SHIFT) and the reliability (SLOP) are calculated.

In step #365, it is tested if the shift amount (SHIFT) is calculated.

More specifically, in FIG. 14, if no lower peak is found after shift amount L is shifted to a maximum shift amount (5 in FIG. 14), the shift amount (SHIFT) cannot be obtained. If NO in step #365, the flow advances to step #385. If YES in step #365, it is tested in step #370 if the calculated defocus amount (DEF) has reliability (SLOP is equal to or larger than a predetermined value SX). If NO in step #370, the flow advances to step #385.

If YES in step #370, a low-constant flag (LOCFLG) is reset (OFF) in step #375 to indicate that the AF operation can be performed. In step #380, the defocus amount (DEF) is calculated from the shift amount (SHIFT) in accordance with equation (6). The flow then advances to the lens information read module ⑥. If NO in step #365 or #370, the low-contrast flag (LOCFLG) is set (ON) to indicate that the AF operation cannot be performed. The flow then advances to the lens information read module ⑥.

Figure 16:
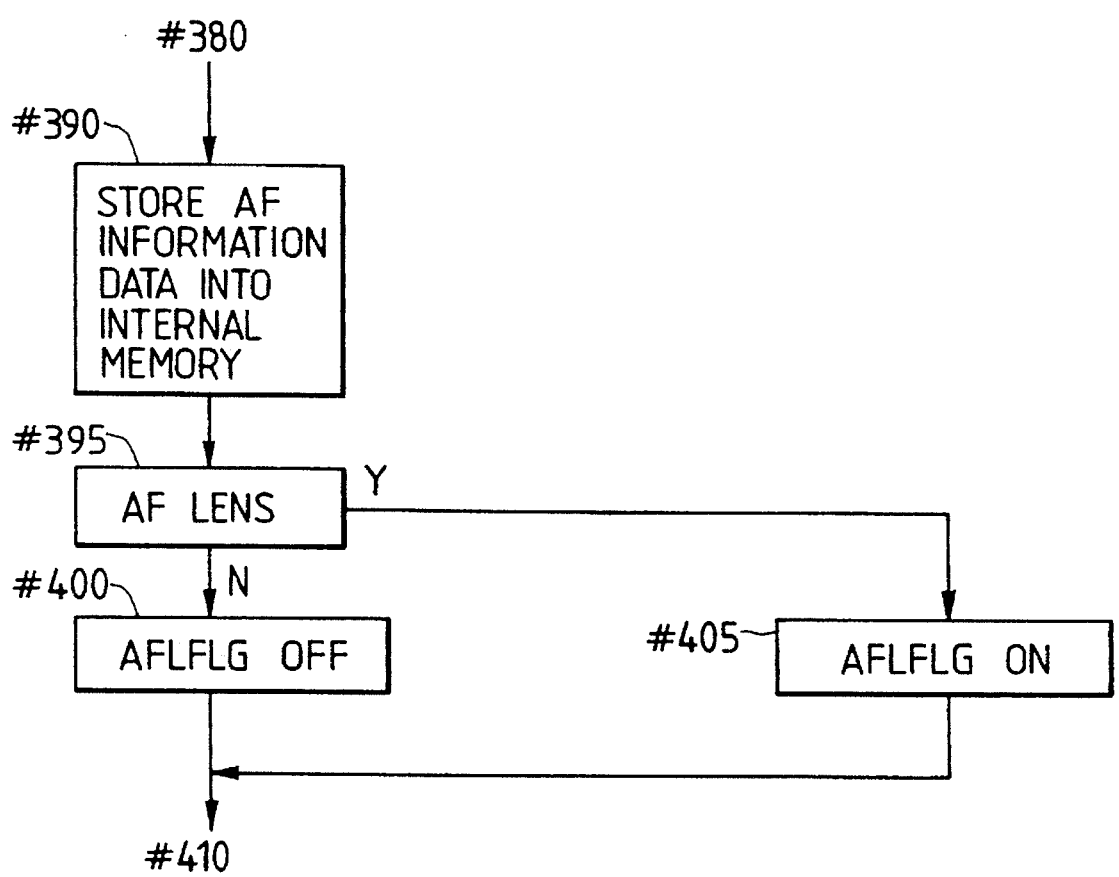

FIG. 16 is a flow chart of the lens information read module ⑥. In step #390, the AF CPU communicates with the lens CPU 13 through the communication bus 64 in FIG. 1, and reads lens AF information necessary for the AF CPU and stored the read data in the internal memory.

For example, data such as a pulse conversion coefficient KL necessary for converting the defocus amount (DEF) into a pulse count, a lens focal length FL, information indicating whether or not the lens is an AF capable lens, and the like are sent from the CPU 13 to the AF CPU. In step #395, it is tested on the basis of the read lens information if the mounted lens is an AF lens (AF capable lens). If YES in step #395, an AF lens flag (AFLFLG) is set (ON), and the flow advances to the pursuit algorithm module ⑦.

If NO in step #395, the AF lens flag (AFLFLG) is reset (OFF), and the flow advances to the pursuit algorithm module ⑦.

Figure 17A:
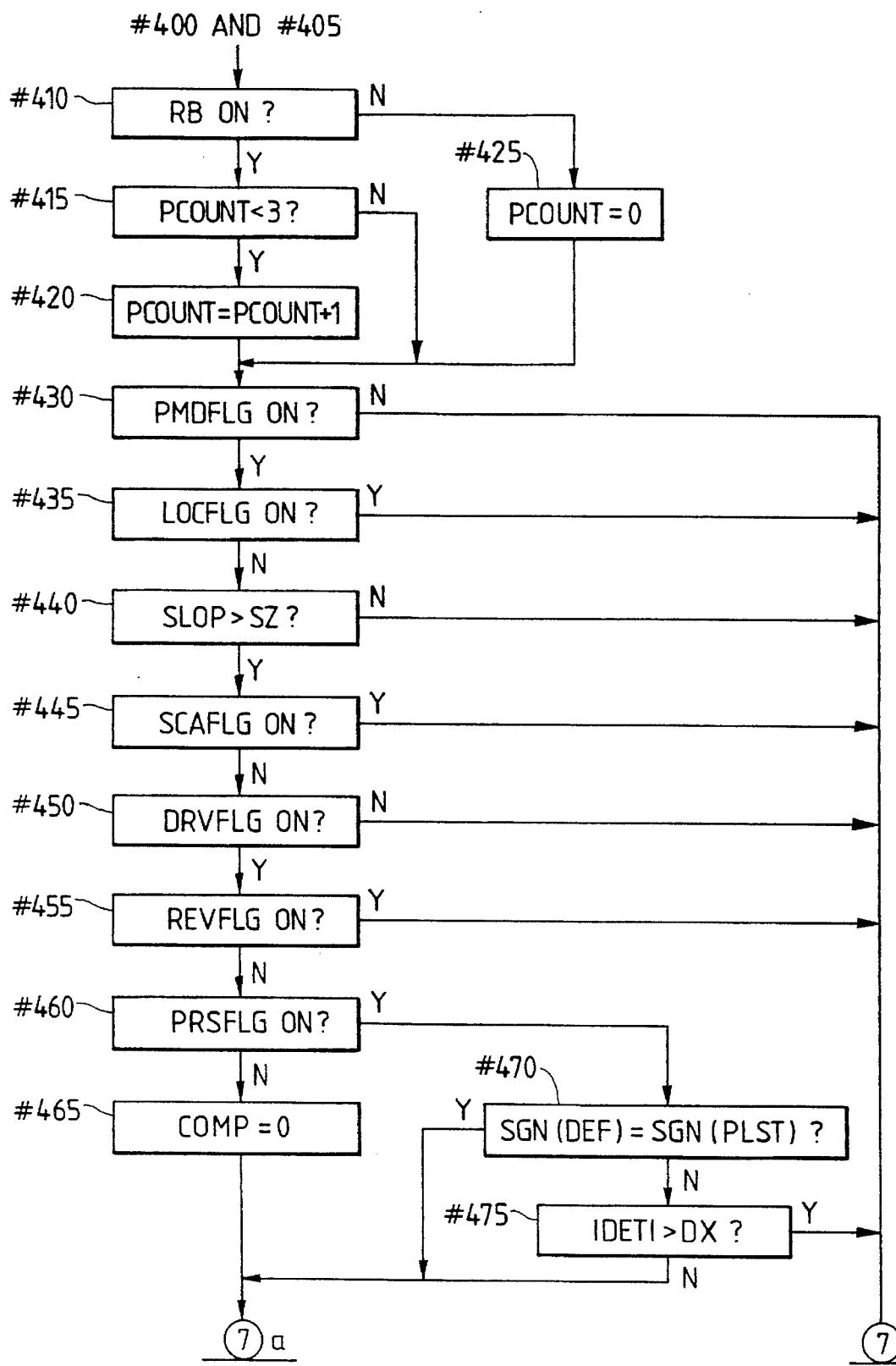
Figure 17B:
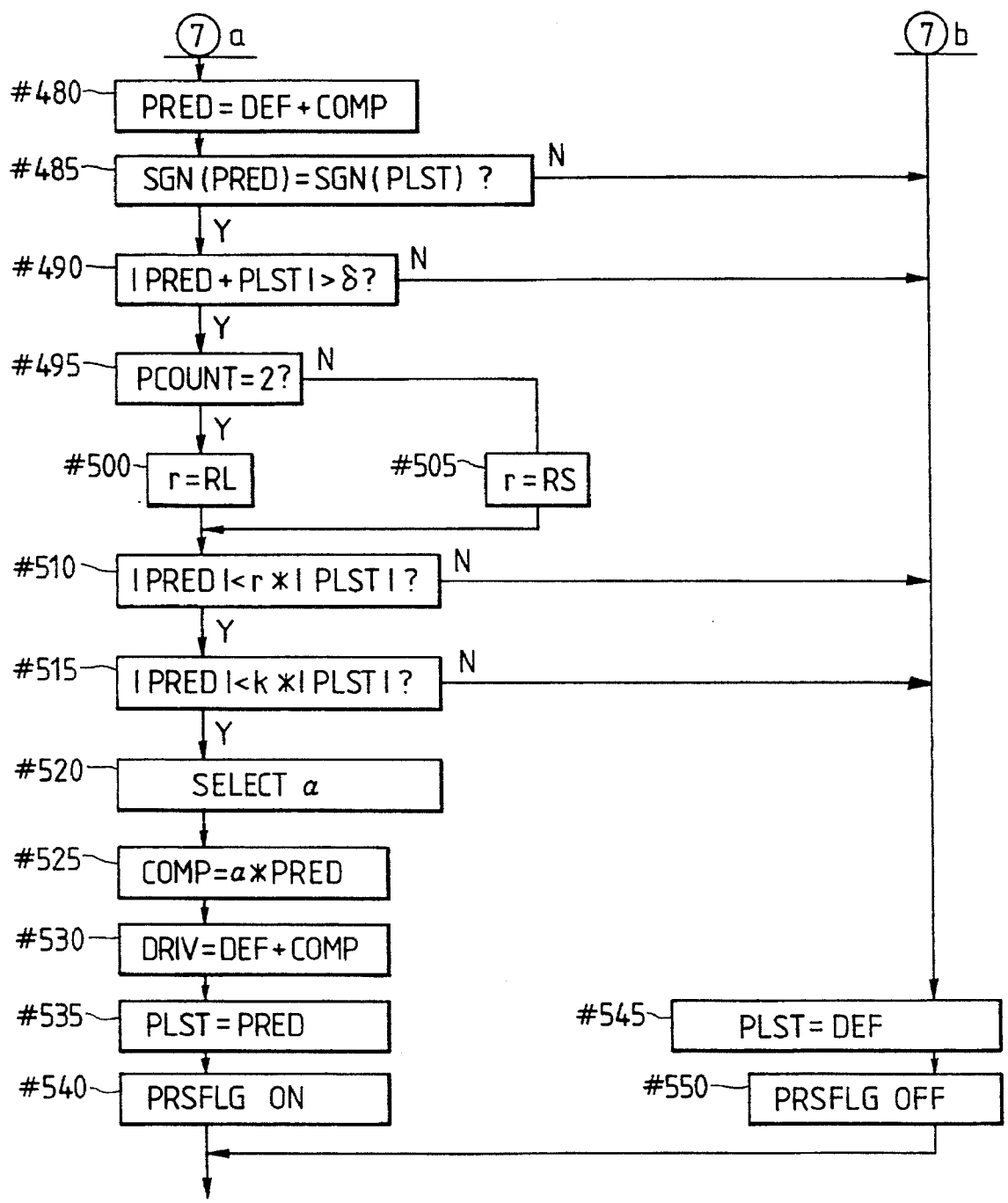

FIGS. 17A and 17B are flow charts of the pursuit algorithm module ⑦.

In steps #410 to #425, the number of shots during full-depression of the release button is counted. In step #410, it is tested if the release button signal (RB) is ON (full-depression). If NO in step #410, a shot counter (PCOUNT) is cleared to 0, and the flow advances to step #430.

If YES in step #410, it is tested in step #415 if a shot count is smaller than 3 (PCOUNT<3). If NO in step #415, i.e., if the shot count is equal to or larger than 3, the shot count is left unchanged, and the flow advances to step #430.

If YES in step #415, the shot count is incremented by one (PCOUNT=PCOUNT+1).

Data of the shot counter (PCOUNT) is used in pursuit discrimination (to be described later) in the pursuit mode. While the release button is fully depressed in the pursuit mode, the CCD storage operation and the AF operation are performed once between adjacent exposures, and hence, the pursuit algorithm module ⑦ is executed once. Therefore, the number of shots is counted in steps #410 to #425. In steps #430 to #515, whether or not a pursuit operation is performed in the pursuit mode is discriminated.

Table 5 summarizes conditions for performing the pursuit operation. In step #430, it is tested if the pursuit mode is presently set (PMDFLG is ON). The pursuit mode flag (PMDFLG) is updated by periodically checking the combination of the focus mode and the frame speed mode in the timer interruption processing (to be described later).

If NO in step #430, the flow advances to step #545 without performing the pursuit operation. If YES in step #430, it is tested in step #435 if the AF operation cannot be performed (LOCFLG is ON).

If YES in step #435, the flow advances to step #545 without executing the pursuit operation.

If NO in step #435, the flow advances to step #440, and it is tested if the calculated defocus amount (DEF) has reliability, i.e., the parameter SLOP representing reliability calculated using equation (4) is equal to or larger than the predetermined value SZ.

Of course, the predetermined value SZ has a larger value than the predetermined value SX used in step #365.

If NO in step #440, the flow advances to step #545 without executing the pursuit operation. Such discrimination is made due to the following reason. When the reliability is low, the defocus amount includes many error components. If the pursuit operation (to be described later) is performed in this state, the photographing lens causes an unstable operation (e.g., hunting) even for a stationary object. Thus, the above discrimination is made to prevent such an unstable operation.

In step #440, the reliability is discriminated on the basis of the value of the parameter SLOP calculated by equation (4). However, the present invention is not limited to this, and any processing may be made as long as reliability can be discriminated. For example, contrast information CONT calculated using equation (7) is compared with a predetermined value to discriminate reliability.

$$CONT = \sum_{i=1}^{n-l} \{A(i) - A(i+l)\} \quad (7)$$

where A(i) is CCD data, and l is a predetermined integer.

If it is determined in step #440 that reliability is found, the flow advances to step #445 to test if the motor scan state is set (SCAFLG is ON). If YES in step #445, the flow advances to step #545 without performing the pursuit operation.

The defocus amount is obtained in the scan state on the basis of CCD data which are stored while the photographing lens is driven, and includes many error components. If the pursuit operation is performed on the basis of this defocus amount, an unstable operation tends to occur.

Step #445 is determined to prevent such a drawback.

If NO in step #445, the flow advances to step #450 to test if an immediately preceding drive operation is performed (DRVFLG is ON). If NO in step #450, the flow jumps to step #545 without performing the pursuit operation. The pursuit operation is an operation for correcting the defocus amount by adding a pursuit correction amount thereto under the assumption that the photographing lens is moved, as will be described later. Therefore, when the pursuit operation is performed from a state wherein the photographing lens stands still, pursuit correction cannot satisfactorily function, resulting in an unstable operation.

Therefore, a normal drive operation (drive operation without pursuit correction) is always performed between the state wherein the photographing lens stands still and the pursuit operation, thus preventing the unstable operation.

If YES in step #450, the flow advances to step #455 to test if the the immediately preceding drive operation is a first drive operation after the drive direction is reversed (REV-FLG is ON).

A drive reversal flag (REVFLG) is a flag which is set when the drive direction is reversed in the drive control module ⑩ (to be described later).

If YES in step #455, the flow jumps to step #545 without performing the pursuit operation.

Figure 18A:
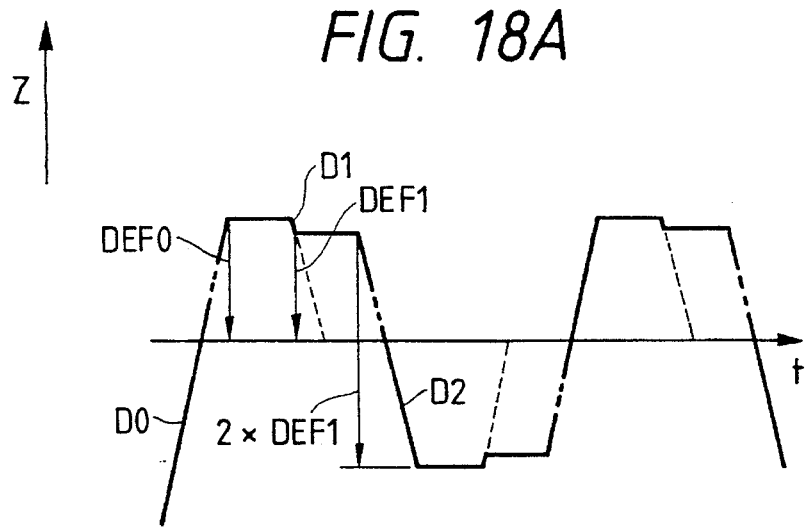

The reason for branching in step #455 will be described below with reference to FIGS. 18A and 18B. FIG. 18A shows the movement of the photographing lens when discrimination in step #455 is omitted. In FIG. 18A, a solid curve indicates the position (in-focus position) of the photographing lens for causing an object image of a stationary object to coincide with the film surface, and an alternate long and two short dashed curve indicates actual movement of the photographing lens. When the photographing lens approaches an in-focus position from a defocused position by a drive operation D0 and overruns the in-focus position due to an error, a defocus position calculated at this position is DEF0. From this position, the photographing lens is driven by a drive operation D1 toward the in-focus position on the basis of the defocus amount DEF0. Since the drive operation D1 is a first drive operation after the drive direction is reversed, the photographing lens is not moved to the in-focus position due to backlash of the body and lens transmission systems 51 and 12, as indicated by a broken curve, and is stopped at a position separated from the in-focus position by the backlash. When a defocus amount calculated at this position is DEF1, the photographing lens cannot reach the in-focus position although the immediately preceding drive operation is performed. Thus, the pursuit operation is started, and the drive amount of the next drive operation D2 is twice the defocus amount DEF1. As a result, the photographing lens passes the in-focus position. Thereafter, the similar operation is repeated, and hunting occurs around the in-focus position.

Figure 18B:
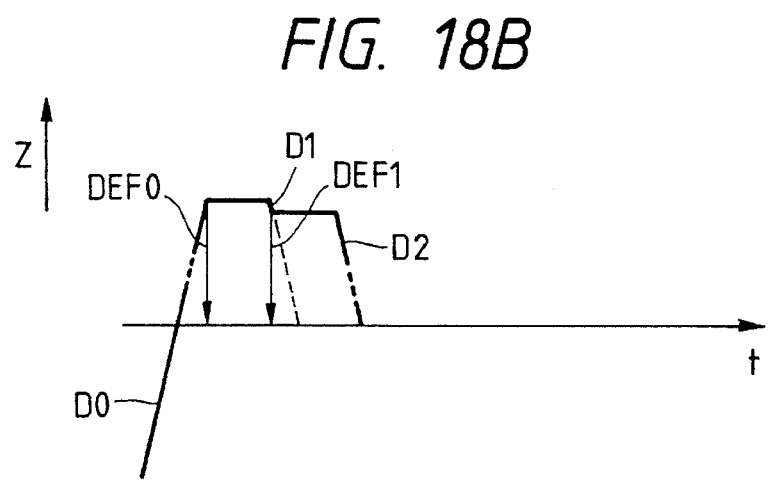

In FIG. 18B, in the second drive operation D2 after the drive direction is reversed, since no pursuit operation is performed, the drive amount corresponds to the defocus amount DEF1, and the photographing lens can reach the in-focus position.

In the above description, when the drive direction of the photographing lens is reversed, the pursuit operation in the two drive operations after reversal is inhibited. However, the present invention is not limited to the two drive operations. The pursuit operation need only be inhibited a predetermined number of times exceeding the two drive operations.

When the photographing lens is moved by a predetermined amount or more in the first drive operation after reversal, the pursuit operation can be permitted in the second drive operation. When an accumulated drive amount after reversal exceeds a predetermined value, the pursuit operation may be permitted.

The pursuit operation may be inhibited for a predetermined period of time after reversal.

As described above, the processing in step #455 is to prevent an unstable operation caused by a backlash when the drive direction is reversed. If NO in step #455, the flow advances to step #460 to test if the pursuit operation is being performed (PRESFLG is ON). A pursuit operation flag is set (ON) when the pursuit operation is performed, i.e., a moving object is determined, and the photographing lens is driven by the pursuit drive amount obtained by adding the pursuit correction amount to the defocus amount for a stationary object.

If NO in step #460, the pursuit correction amount (COMP) is cleared to 0 in step #465, and the flow advances to step #480.

If YES in step #460, the flow advances to step #470 to test if the presently obtained defocus amount (DEF) has the same sign as that of the immediately preceding pursuit defocus amount (PLST). If YES in step #470, the flow advances to step #480; otherwise, the flow advances to step #475 to test if the absolute value (|DEF|) of the defocus amount is larger than the predetermined value DX. If YES in step #475, the flow jumps to step #545 without performing the pursuit operation. If NO in step #475, the flow advances to step #480. The processing in steps #470 to #475 is performed to shorten a response time at the end of the pursuit processing, and will be described in detail below with reference to FIG. 19.

Figure 19:
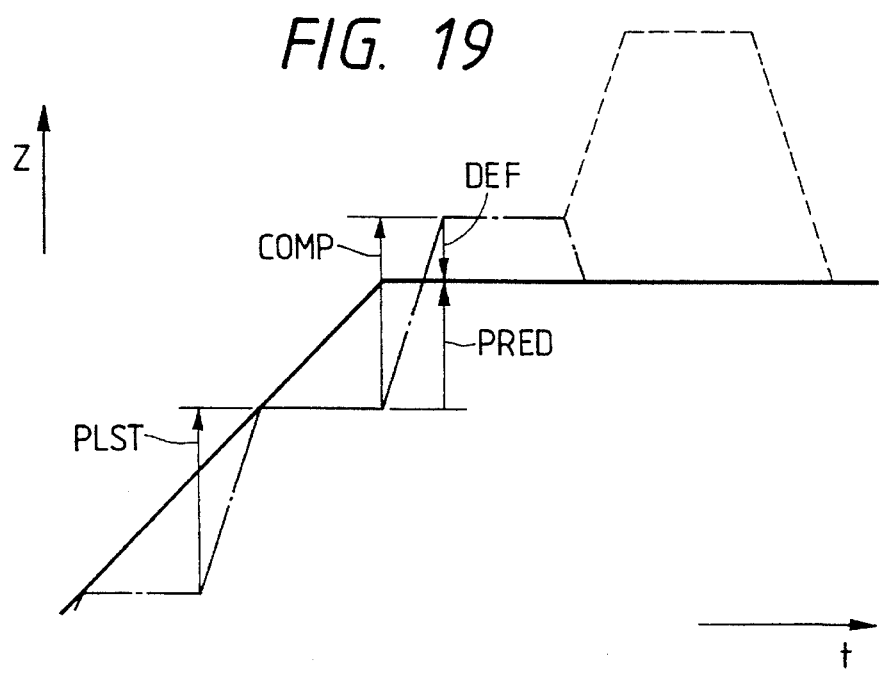

In FIG. 19, a solid curve is an ideal path of the photographing lens position for causing an object image of an object to coincide with the film surface, and an alternate long and short dashed curve is a path of actual movement of the photographing lens.

In the pursuit operation before the release button is depressed, pursuit correction is performed to drive the photographing lens so that the defocus amount (DEF) as the AF result becomes 0 even for a moving object, as will be described later. Therefore, the operation is performed so that the solid curve intersects with the alternate long and short dashed curve at an intermediate point in the CCD storage time. (FIG. 19 is illustrated under the assumption that the drive operation is completed, i.e., the storage operation is performed for a storage time of almost 0.)

When an object is immediately stopped during the pursuit operation, the present defocus amount (DEF) has a sign opposite to that of the immediately preceding pursuit defocus amount (PLST), and its absolute value becomes considerably large.

However, in this case, the present pursuit defocus amount (PRED) is obtained by adding the pursuit correction amount (COMP) to the present defocus amount (DEF), and has the same sign as and is almost equal to the immediately preceding pursuit defocus amount (PLST). In discrimination processing in steps #480 to #515 (to be described later), it is not discriminated that the pursuit operation cannot be performed, and the pursuit operation is started. As indicated by a broken curve in FIG. 19, the photographing lens further overruns from the in-focus position. In steps #470 and #475, the pursuit operation is disabled in this case. As shown in FIG. 19, once the photographing lens overruns the in-focus position, the pursuit operation is not performed, and in the next drive operation, the photographing lens can reach the in-focus position.

In step #480, the present pursuit defocus amount (PRED) is calculated as a sum of the present defocus amount (DEF) and the immediately preceding pursuit correction amount (COMP).

In step #485, it is tested if the sign of the present defocus amount (PRED) is the same as that of the immediately preceding pursuit defocus amount (PLST). If NO in step #485, the flow jumps to step #545 without performing the pursuit operation.

When the pursuit direction is reversed, the pursuit operation is temporarily disabled, and a normal drive operation is performed, thus preventing an unstable operation (hunting, overrunning, and the like) when the movement of the object is reversed.

If YES in step #485, the flow advances to step #490 to test if the absolute value (|PRED+PLST|) of the sum of the present pursuit defocus amount (PRED) and the immediately preceding pursuit defocus amount (PLST) is equal to or larger than a predetermined value δ (e.g., 200 μm).

If NO in step #490, the flow jumps to step #545 without performing the pursuit operation.

Since the pursuit defocus amount becomes almost equal to an error amount included therein near the in-focus position, if the pursuit operation is performed using this amount, an unstable operation (hunting, overrunning, and the like) is caused around the in-focus position. The processing in step #490 aims at preventing the unstable operation. The predetermined value δ may be experimentally determined to be a given value or may be varied according to various conditions (lens focal length, information indicating whether or not the pursuit operation is performed, reliability of the defocus amount, and the like).

In particular, in order to guarantee stability, a hysteresis may be advantageously provided such that a predetermined value δ1 is used in the pursuit operation, and a predetermined value δ2 (>δ1) is used in an operation other than the pursuit operation.

In place of step #490, whether or not the pursuit operation is permitted can be discriminated on the basis of only the absolute value of the present pursuit defocus amount (PRED). However, as in step #490, the sum of the present pursuit defocus amount and the immediately preceding pursuit defocus amount (PLST) is calculated, so that the influence of an error included in the pursuit defocus amount can be eliminated, and a more stable pursuit operation can be assured.

If it is determined in step #490 that the absolute value is equal to or larger than the predetermined value δ, the flow advances to step #495. In the processing in steps #495 to #515, whether or not the pursuit operation is permitted is discriminated in accordance with a ratio of the present pursuit defocus amount (PRED) to the immediately preceding pursuit defocus amount (PLST).

As described above, during the pursuit operation, the defocus amount (DEF) becomes almost 0, and the pursuit correction amount COMP becomes substantially constant.

Therefore, the ratio of the present pursuit defocus amount (PRED) to the immediately preceding pursuit defocus amount (PLST) is ideally about 1.

Pursuit correction is performed under the assumption that an object is moved at substantially the constant speed. When the speed of the object is immediately changed, if the pursuit operation is performed, an unstable operation (hunting, overrunning, and the like) tends to occur.

When the speed of the object is changed, the defocus amount is changed accordingly. Therefore, the ratio of the present pursuit defocus amount to the immediately preceding defocus amount varies with respect to 1.

Thus, in the processing in steps #495 to #515, the pursuit operation is performed only when the ratio falls in a predetermined range including 1, thus preventing an unstable operation caused by an immediate change in object speed.

In steps #495 to #505, an upper limit (r) is changed in accordance with the content of the shot counter (PCOUNT).

The reason for this will be described below with reference to FIG. 20.

Figure 20:
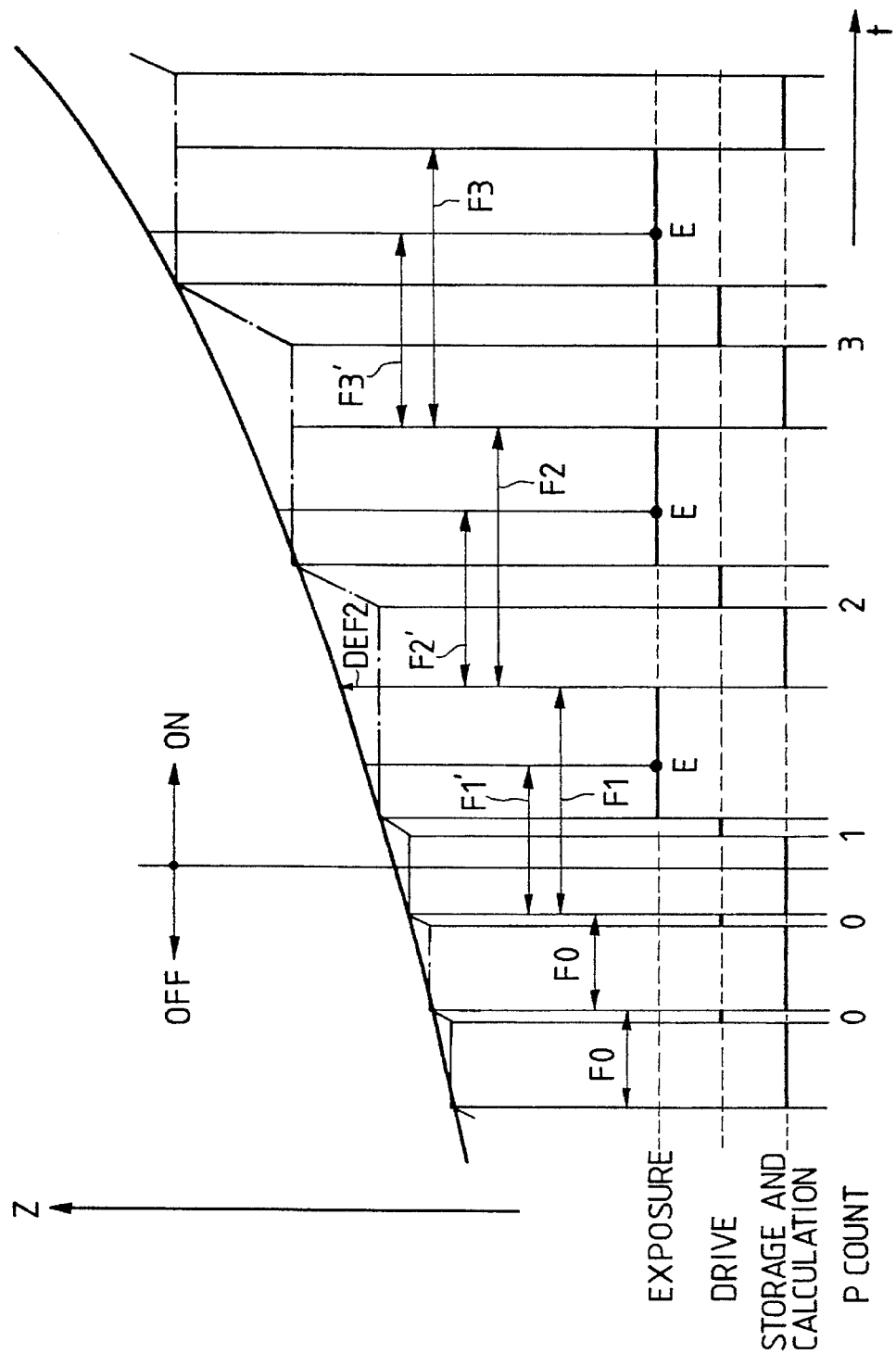

In FIG. 20, a solid curve is a path of movement of the photographing lens necessary for causing an object image to coincide with the film surface for a moving object, and an alternate long and short dashed curve is a path of actual movement of the photographing lens in the pursuit operation.

Before the release button is fully depressed, the AF CPU repetitively performs the CCD storage operation, the AF calculation, and the AF motor drive operation. This period is almost constant, i.e., F0, and the content of the shot counter (PCOUNT) is 0.

After the release button is fully depressed, the content of the shot counter (PCOUNT) becomes 1, and the exposure is performed after the drive operation.

Before the exposure is performed, the CCD storage operation is performed after the drive operation, while after the release button is fully depressed, the CCD storage operation is performed after the exposure. Therefore, the defocus amount before full-depression is almost 0, and a first defocus amount (DEF2) after full-depression becomes a large value.

In the processing of the pursuit algorithm module ⑦ performed after the first exposure, i.e., when the shot count is 2 (PCOUNT=2), the present pursuit defocus amount (PRED) is larger than the immediately preceding pursuit defocus amount (PLST). Therefore, unless the upper limit of the ratio (r) must be increased, the pursuit operation is undesirably inaccurate.

Therefore, only when the content of the shot counter is 2 (PCOUNT=2), the upper limit(r) of the ratio is set to be a value (RL, RL>RS) larger than a normal value (RS).

The content of the processing in steps #495 to #505 has been described. In step #495, it is tested if the first exposure (release) is completed. If NO in step #495 (PCOUNT≠2), the flow advances to step #505, and the upper limit (r) of the ratio is set to be the predetermined value RS (e.g., 3). The flow then advances to step #510. If YES in step #495 (PCOUNT= 2), the flow advances to step #500, and the upper limit (r) of the ratio is set to be the predetermined value RL (e.g., 6). The flow then advances to step #510. In step #510, it is tested if the absolute value (|PRED|) of the present pursuit defocus amount is equal to or smaller than a value r times the absolute value (|PLST|) of the immediately preceding pursuit defocus amount. If NO in step #510, it is determined that the pursuit operation cannot be performed, and the flow jumps to step #545 without performing the pursuit operation. If YES in step #510, the flow advances to step #515 to test if the absolute value (|PRED|) of the present pursuit defocus amount is equal to or larger than a value obtained by multiplying the absolute value (|PLST|) of the immediately preceding pursuit defocus amount with a predetermined value k (e.g., ½).

If NO in step #515, it is determined that the pursuit operation cannot be performed, and the flow jumps to step #545 without performing the pursuit operation.

If YES in step #515, it is determined that the pursuit operation can be performed, and the flow advances to step #520.

The above description assumes that the comparison parameters δ, r, and k in the discrimination processing in steps #490, #510, and #515 are predetermined values. However, a hysteresis of a predetermined width may be provided to each parameter in accordance with whether or not the pursuit operation is performed.

The hysteresis is set so that the pursuit operation cannot be easily stopped during the pursuit operation, and the pursuit operation cannot be easily started in an operation other than the pursuit operation.

For example, the value δ is set to be δ1 during the pursuit operation, and otherwise, is set to be δ2 (>δ1); the value r is set to be RL1 or RS1 during the pursuit operation, and otherwise, is set to be RL2 (<RL1) or RS2 (<RS1); and the value k is set to be k1 during the pursuit operation and otherwise, is set to be k2 (>k1).

In this manner, when the hysteresis is provided, transition between adjacent pursuit operations can be stably performed.

In steps #520 to #540, calculation processing for the pursuit operation is performed. In step #520, a coefficient α used when the pursuit correction amount (COMP) is calculated by multiplying the coefficient α with the present pursuit defocus amount (PRED) is determined.

The content of the processing in step #520 will be described below with reference to FIG. 20.

In FIG. 20, before the release button is fully depressed, in a period consisting of the CCD storage, the AF calculation, and the AF motor drive operation, since F0 is almost constant, the coefficient α is appropriately set to be almost 1.

After the release button is fully depressed, the period includes the exposure. Therefore, the period is prolonged to F1, F2, and F3 as compared to the period F0 before full-depression.

Before the release button is fully depressed, the coefficient α is determined so that the solid curve intersects with the alternate long and short dashed curve at an intermediate point in the CCD storage time. After the release button is fully depressed, the coefficient α is determined so that the solid curve intersects with the alternate long and short dashed curve at an intermediate point in an exposure time upon an exposure. In FIG. 20, periods from the beginning of the CCD storage operation to the intermediate point of the exposure are indicated by F1', F2', and F3'. The coefficient α is almost proportional to the ratio of an immediately preceding period to a period to the intermediate point of present exposure. When the content of the shot counter is 0 (PCOUNT=0), the coefficient α is preferably set to be F0/F0≈1; when it is 1 (PCOUNT=1), F1'/F0=1.5; when it is 2 (PCOUNT=2), F2'/F1=0.9 to 1; when it is 3 (PCOUNT= 3), F3'/F2=0.8 to 1.

The coefficient α is preferably changed in accordance with the moving direction of the object and the focal length of a lens.

The reason for this will be described below with reference to FIGS. 21A and 21B.

Figure 21A:
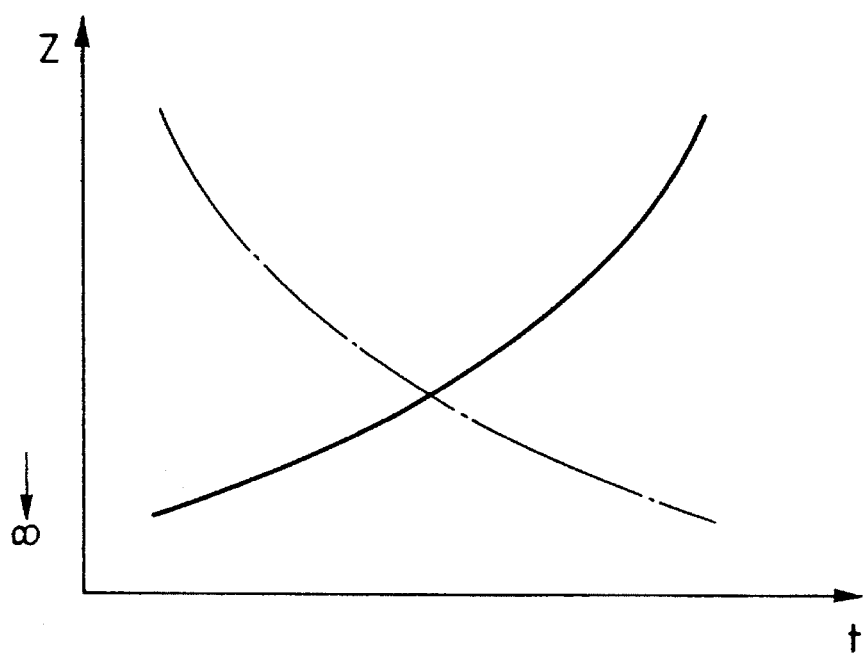

In FIG. 21A, a solid curve represents a path of movement of the photographing lens for causing an object image to always coincide with the film surface when an object is coming closer from ∞ to a closest focusing position, and an alternate long and short dashed curve represents a path of movement of the photographing lens when an object is going away from the closest focusing position toward ∞.

When the object is coming closer, the movement of the photographing lens becomes larger as the object comes closer to the closest focusing position. On the contrary, when the object is going away, the movement of the photographing lens becomes smaller as the object goes away toward ∞.

Therefore, when the object is going away, the coefficient α for determining the pursuit correction amount is preferably set to be smaller than that used when the object is coming closer.

Figure 21B:
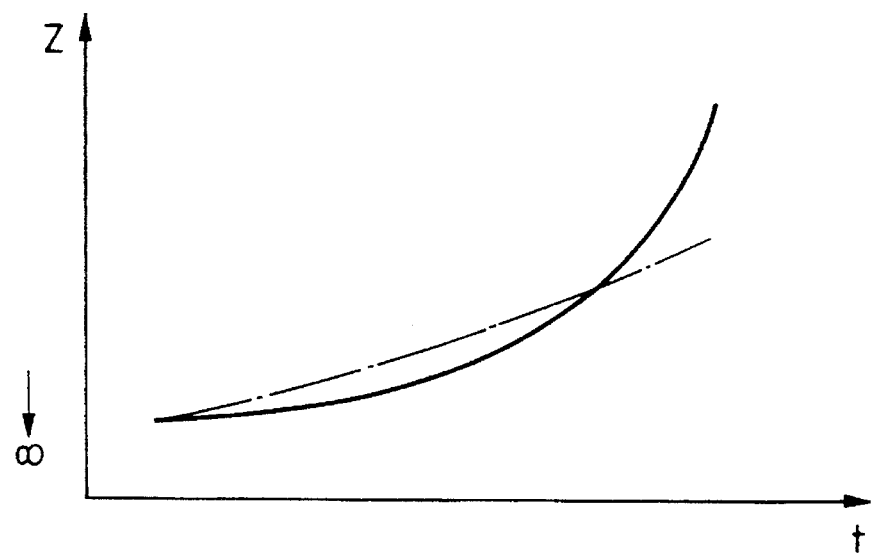

FIG. 21B shows paths of the photographing lens with respect to an object which is coming closer. In FIG. 21B, a solid curve represents a path of movement of a photographing lens having a small focal length, and an alternate long and short dashed curve represents a path of movement of a photographing lens having a large focal length.

When the focal length is large, the movement of the photographing lens from the infinity ∞ to the closest focusing position is constant. Contrary to this, when the focal length is small, the inclination of the path of movement of the photographing lens is abruptly increased as the object comes closer to the closest focusing position.

Therefore, when a lens has a large focal length, the coefficient α is preferably set to be smaller than that used for a lens having a small focal length.

For the above-mentioned reasons, in step #520, the coefficient α is determined with reference to a table in the internal memory, as shown in Table A below, in accordance with three parameters, i.e., the shot count (PCOUNT), information indicating whether or not the lens focal length (FL) is larger than the predetermined value (FX), and the moving direction of the object (sign of the pursuit defocus amount).

TABLE A

|  | FL < FX | | FL > FX | |
| --- | --- | --- | --- | --- |
| PCOUNT | COMING CLOSER | GOING AWAY | COMING CLOSER | GOING AWAY |
| 0 | 1.0 | .85 | .85 | .85 |
| 1 | 1.0 | .85 | .85 | .85 |
| 2 | 1.0 | .7 | .85 | .7 |
| 3 | .9 | .6 | .75 | .6 |

In step #525, the coefficient δ determined in step #520 is multiplied with the present pursuit defocus amount (PRED) to calculate a pursuit correction amount (COMP).

The way in which acceleration varies as indicated by the solid curve in FIG. 21B depends on whether the object is near the infinity ∞ or the closest focusing position even if the focal length of the lens is kept unchanged.

Therefore, in order to strictly process the coefficient α, the value α is preferably determined taking the focal length information of the lens into consideration. For example, when an object comes closer, the value α is preferably increased as the object is closer to the closest focusing position to increase the correction amount.

A method of obtaining the value α using neither focal length information of a lens nor distance information will be described below. For this purpose, a value of PRED/PLST=β is calculated using PLST and PRED described above. When the image surface is moved at a constant speed, β=1, when its speed is accelerated, β>1, and when its speed is decelerated, β<1. Therefore, the value α can be determined using β. In this case, the value α is determined on the basis of the value β using the following table.

| β | β > 1.2 | 1.2 ≧ β > 1.1 | 1.1 ≧ β > 1.0 | 1.0 ≧ β > 0.9 | 0.9 ≧ β > 0.8 | 0.8 ≧ β ≧ 0.7 | β < 0.7 |
| --- | --- | --- | --- | --- | --- | --- | --- |
| α | 1.1 | 1.0 | 0.9 | 0.8 | 0.7 | 0.6 | 0.5 |

Although the value α becomes slightly smaller than the value β, it depends on a time interval between exposure and a storage time, and is given by:

$$\alpha \approx \beta \times 1 - \left\{ \frac{\text{time interval between exposure and storage}}{\text{cycle time}} \right\}$$

In step #530, the pursuit correction amount (COMP) calculated in step #525 is added to the present defocus amount (DEF) to determine the present pursuit drive amount (DRIV) in order to perform the pursuit operation.

In step #535, the immediately preceding (final) pursuit defocus amount (PLST) is replaced with the present pursuit defocus amount (PRED) to prepare for the next pursuit processing/discrimination.

In step #540, the flag indicating that the pursuit operation is being performed is set (PRSFLG is ON), and the flow advances to the in-focus discrimination/display module ⑧.

The above processing operations are executed when the pursuit operation is performed.

Steps #545 and #550 are executed when it is determined that the pursuit operation cannot be performed.

In step #545, the present defocus amount (DEF) is employed as the immediately preceding (final) defocus amount (PLST) to prepare for the next pursuit processing/discrimination, In step #550, since the pursuit operation is not performed, the pursuit operation flag is reset (PRSFLG is OFF), and the flow advances to the in-focus discrimination/display module ⑧.

Figure 22:
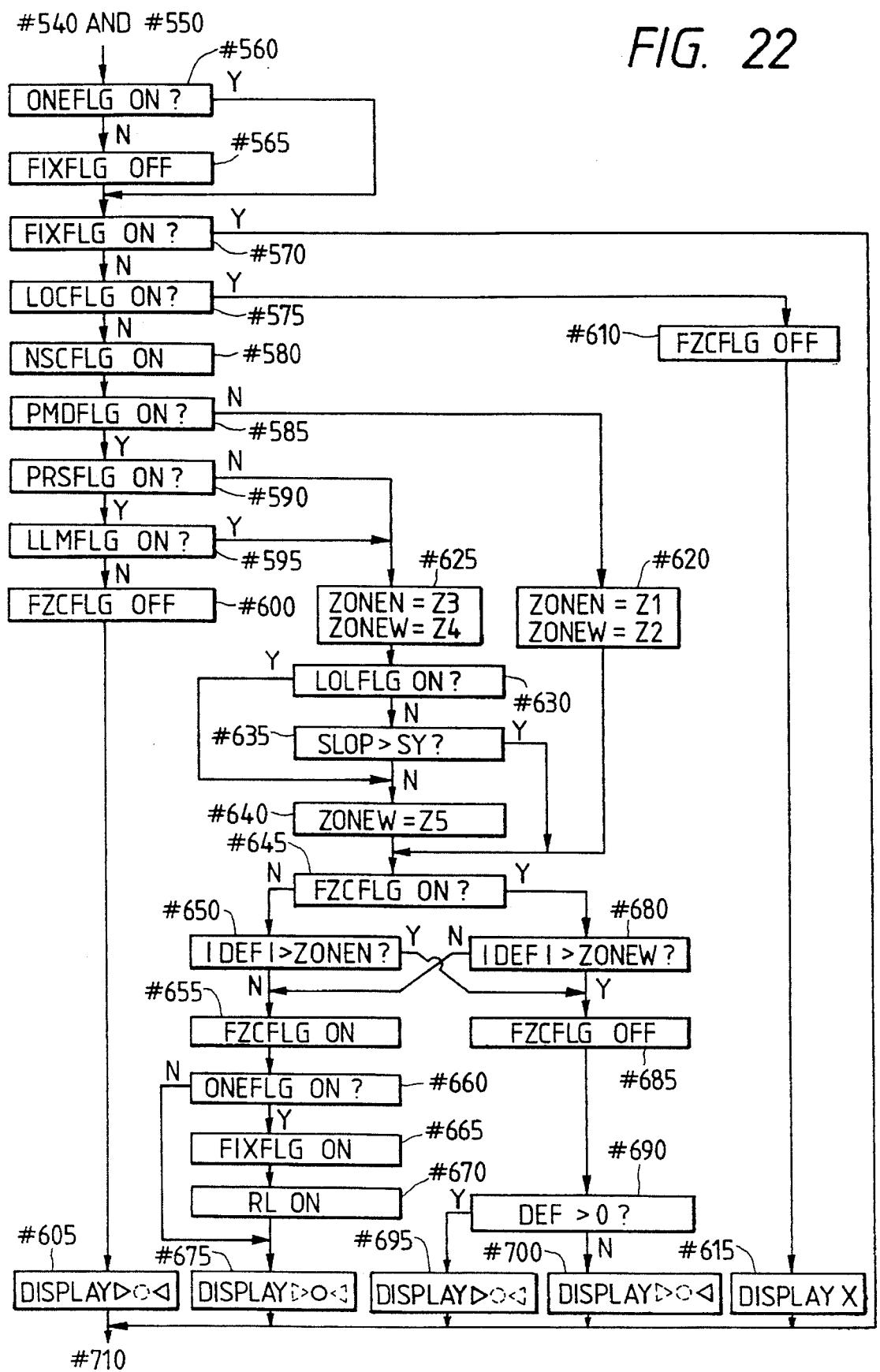

FIG. 22 is a flow chart of the in-focus discrimination/display module 8.

In step #560, it is tested if the focus mode is the one-shot mode (ONEFLG is ON). If YES in step #560, the flow skips step #565, and advances to step #570. If NO in step #560, i.e., if the focus mode is the continuous AF mode or the manual mode, a fix flag is reset (FIXFLG is OFF) in step #565, so that the drive display is not fixed after an in-focus state is obtained.

It is checked in step #570 if the drive display is fixed (FIXFLG is ON). If YES in step #570, the subsequent processing is not executed, and the flow advances to the AF permission waiting module ⑨.

If YES in step #570, the flow advances to step #575 to test if the AF operation can be performed (LOCFLG is ON). If YES in step #575, the flow advances to step #610, and an out-of-focus state is discriminated (FZCFLG is OFF). In step #615, the indicator 44 (X) of the AF display means 40 is activated to perform a display.

If NO in step #575, a scan inhibition flag is set (NSCFLG is ON) to inhibit the following scan operation. It is then tested in step #585 if the pursuit mode is set (PMDFLG is ON).

If YES in step #585, the flow advances to step #590 to test if the pursuit operation is being performed (PRSFLG is ON).

If YES in step #590, it is tested in step #595 if a lens end is reached (LLMFLG is ON). If YES in step #595, an out-of-focus state is determined in step #600 to reset an in-focus flag (FZCFLG is ON) (so that a drive operation can always be performed in the drive control module ⑩). In step #605, both the indicators 41 and 43 are activated to display that the pursuit operation is being performed in a display mode different from other display states (in-focus and out-of-focus states). The flow then advances to the next AF permission waiting module ⑨.

The processing in steps #620 to #640 is executed to determine an in-focus zone for AF discrimination. If NO in step #585, a narrow zone (ZONEN) used when the photographing lens enters the in-focus state from the out-of-focus state is set to be Z1 (e.g., 50 μm), and a wide zone (ZONEW) used when the photographing lens goes out of the in-focus state to the out-of-focus state is set to be Z2 (e.g., 150 μm). The flow then advances to discrimination processing in step #645 and subsequent steps.

If NO in step #590 and if YES in step #595, the flow advances to step #625, and the narrow zone (ZONEN) is set to be Z3 (e.g., 50 μm), and the wide zone (ZONEW) is set to be Z4 (e.g., 100 μm). Since the zone Z4 is set to be smaller than the zone Z2, a response time of the drive operation in the pursuit mode can be shortened.

It is tested in step #630 if a luminance is low (LOLFLG is ON). If YES in step #630, the flow advances to step #640. If NO in step #630, it is tested in step #635 if reliability is high (SLOP is larger than a predetermined value SY). If YES in step #635, the flow jumps to step #645. In step #635, the reliability is discriminated using the parameter SLOP. However, the contrast parameter CONT calculated using equation (7) may be used.

If NO in step #635 and if YES in step #630, the wide zone (ZONEW) is changed to be Z5 (e.g., 200 μm) larger than Z4, and the flow advances to step #645.

The processing in steps #630 to #640 is made to set an in-focus zone to have a primary importance based on safety rather than a response time when the luminance and reliability are low in the pursuit mode.

It is tested in step #645 if the in-focus state is obtained in the immediately preceding exposure (FZCFLG is ON). If NO in step #645, the flow advances to step #650, and the absolute value (|DEF|) of the present defocus amount is compared with the narrow zone (ZONEN).

If YES in step #645, the absolute value (|DEF|) of the present defocus amount is compared with the wide zone (ZONEW).

If NO in step #650 or #680, the flow advances to step #685, and the out-of-focus state is determined (FZCFLG is OFF). In step #690, the sign of the present defocus amount (DEF) is checked.

If the sign is positive (near-focus), the flow advances to step #695, and the triangular mark of the indicator 41 is activated to display a near-focus state. The flow then advances to the next module.

If the sign is negative (far-focus), the triangular mark of the indicator 43 is activated to display a far-focus state, and the flow then advances to the next module.

If YES in step #650 or #680, the in-focus flag is set (FZCFLG is ON) in step #655. It is tested in step #660 if the focus mode is the one-shot mode (ONEFLG is ON). If NO in step #660, the flow jumps to step #675.

If YES in step #660, the fix flag is set (FIXFLG is ON) in step #665 to fix the following drive and display operations.

In step #670, the release permission signal (RL) is ON (permission) to inform in-focus release permission to the main CPU. The flow then advances to step #675.

In step #675, the in-focus mark of the indicator 42 is activated to display an in-focus state, and the flow advances to the next AF permission waiting module ⑨.

Figure 23:
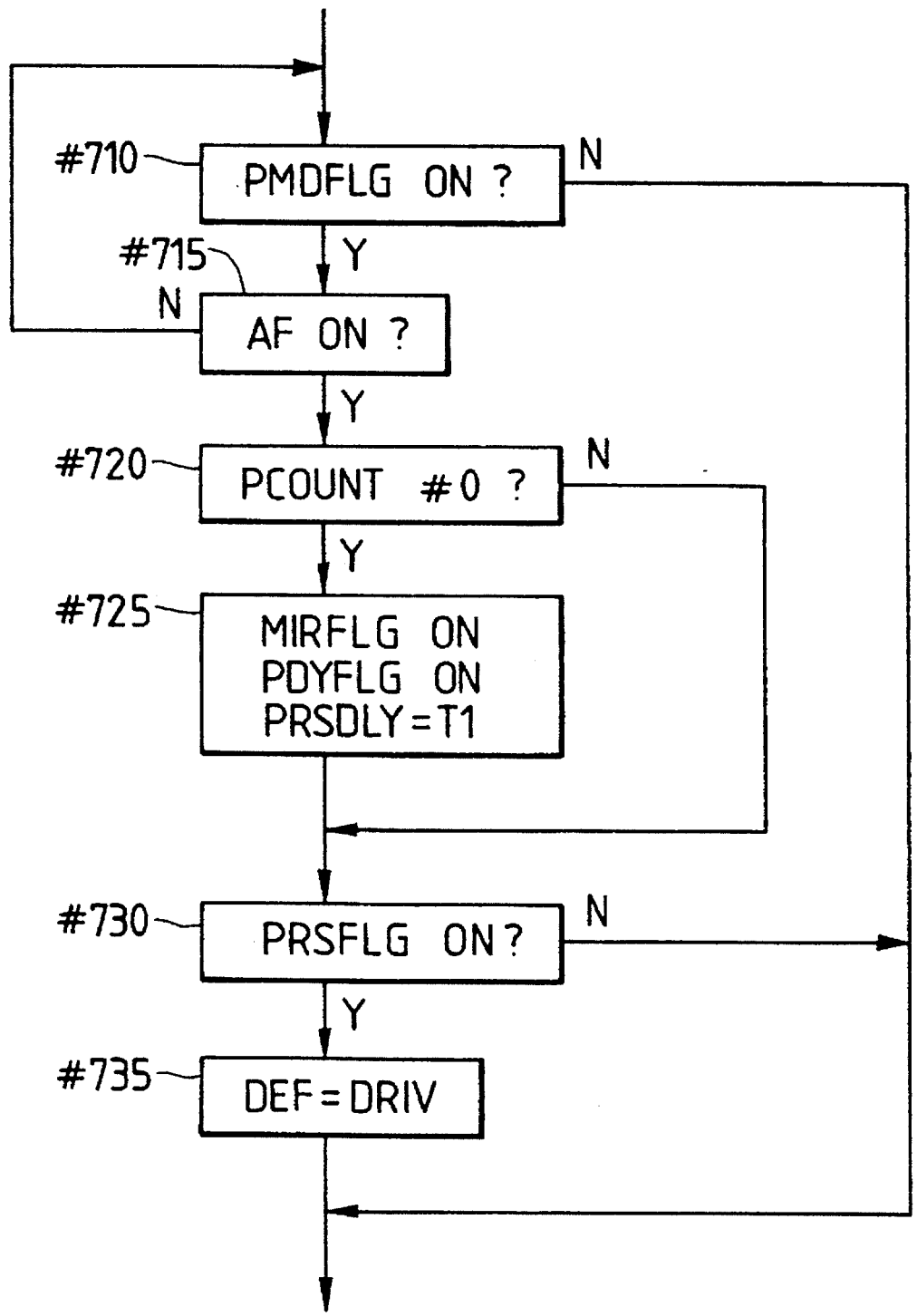

FIG. 23 is a flow chart of the AF permission waiting module ⑨.

In step #710, it is tested if the pursuit mode is set (PMDFLG is ON). If NO in step #710, no processing is made and the flow advances to the next drive control module ⑩. If YES in step #710, it is waited in step #715 until the AF permission signal (AF) is ON (permission). If NO in step #715, steps #710 and #715 are repeated.

If YES in step #715, the flow advances to step #720 to test if the release operation is being performed (PCOUNT≠0). If YES in step #720, the mirror flag (MIRFLG) is set (ON) to set a pre-mirror up state, a pursuit delay state from the beginning of the drive operation by the drive control module ⑩ until the release permission signal (RL) is ON (permission) is set (PDYFLG is ON), and at the same time, a pursuit delay time (PRSDLY) is set to be T1 in step #725. The flow then advances to step #730.

If NO in step #720, the flow advances to step #730 without executing step #725. It is tested in step #730 if the pursuit operation is being performed (PRSFLG is ON). If YES in step #730, the present defocus amount (DEF) is replaced with the-pursuit drive amount (DRIV) in step #735, so that the drive operation can be performed using the pursuit drive amount in place of the defocus amount in the drive control module ⑩. If NO in step #730, the flow directly advances to the drive control module ⑩.

Figure 24A:
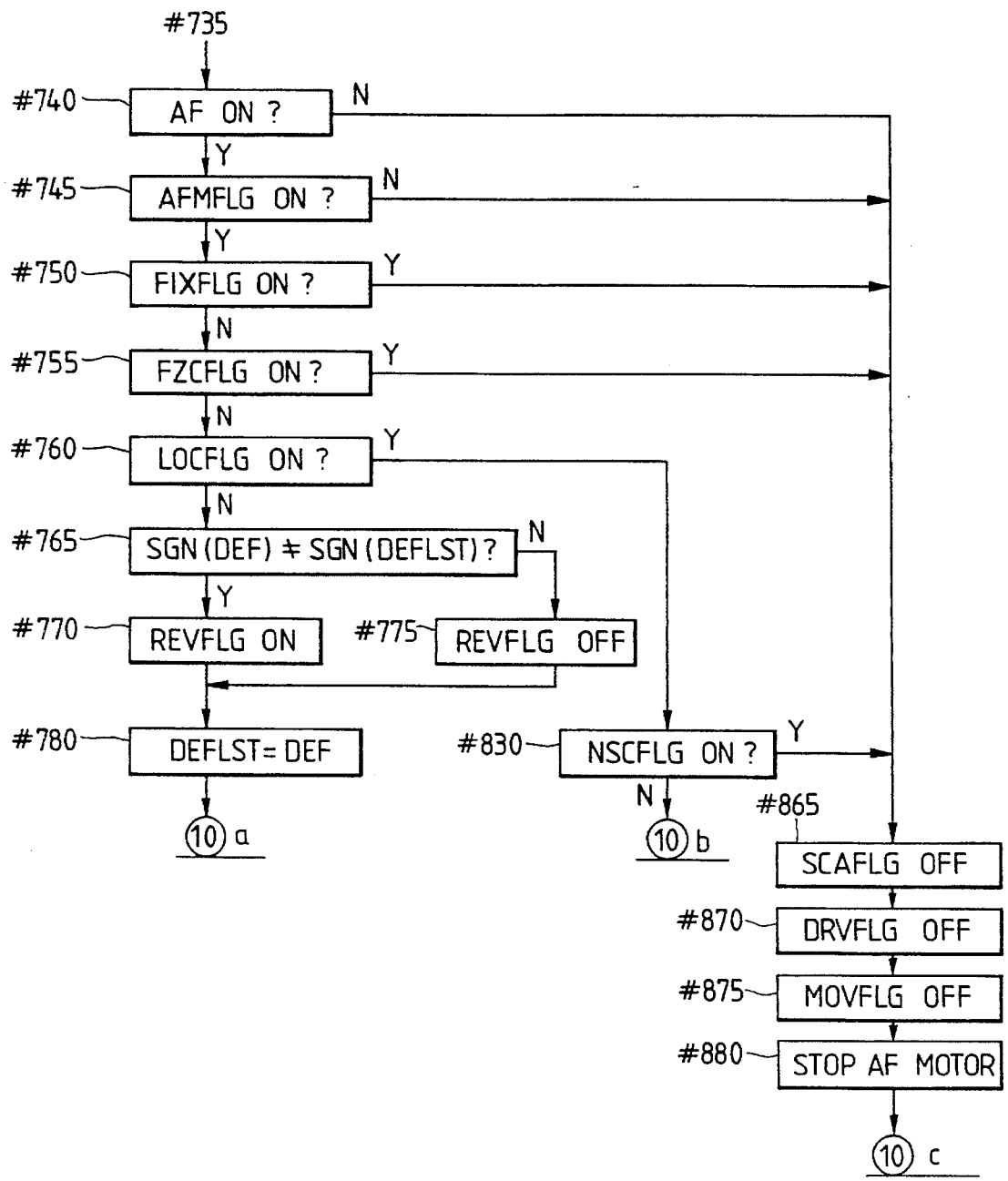
Figure 24B:
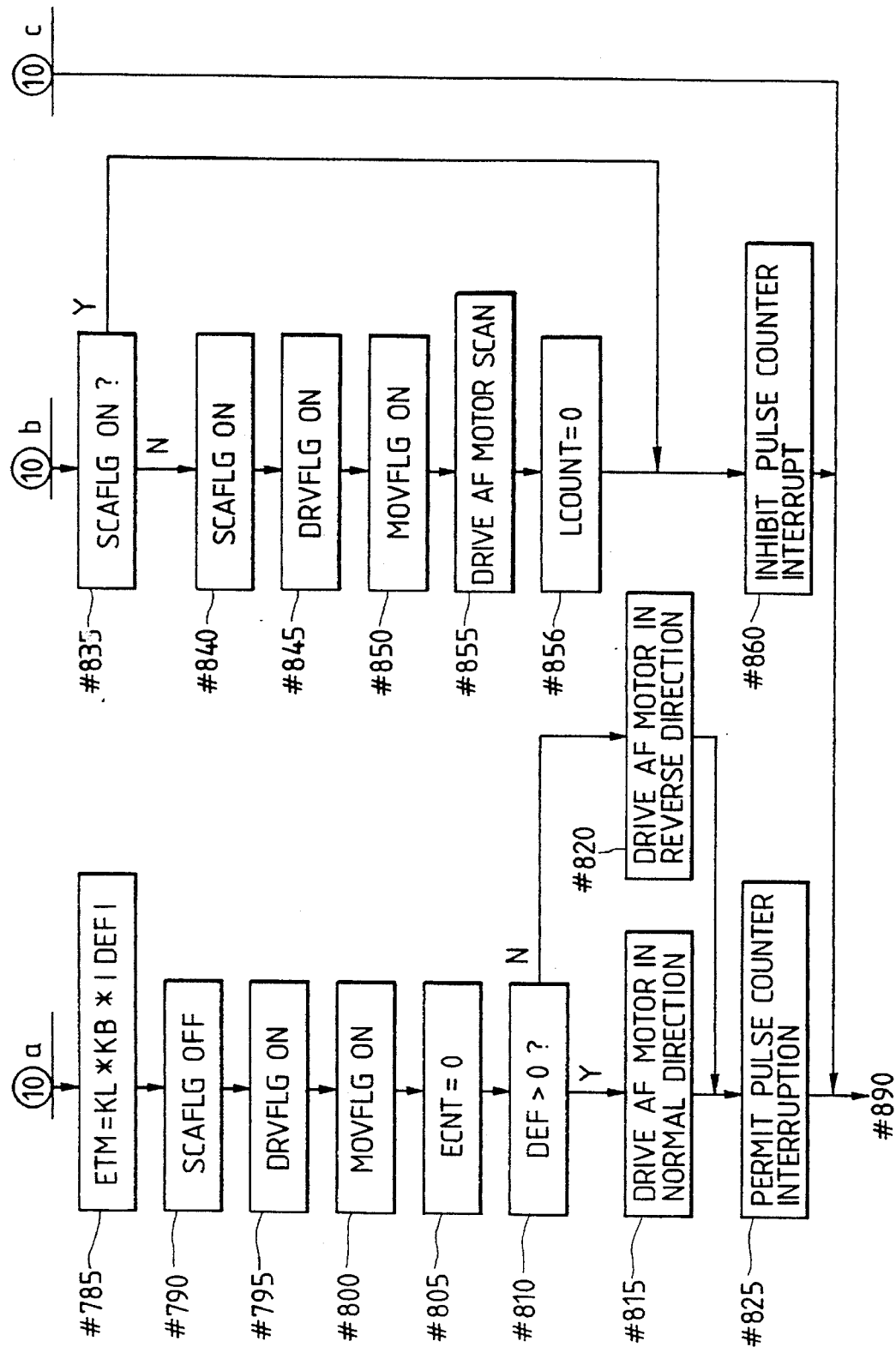

FIGS. 24A and 24B are flow charts of the drive control module ⑩. In step #740, it is tested if/the AF permission signal (AF) is ON (permission). If NO in step #740, the flow jumps to non-drive processing in steps #865 to #880. If YES in step #740, the flow advances to step #745 to test if the AF mode is set (AFMFLG is ON). An AF mode flag (AFMFLG) is set when a mounted lens is an AF compatible lens, and the focus mode is not a manual mode. If NO in step #745, the flow jumps to the non-drive processing in step #865 and subsequent steps. If YES in step #745, it is tested in step #750 if the drive operation is fixed (FIXFLG is ON).

If YES in step #750, the flow jumps to the non-drive processing in step #865 and subsequent steps. If NO in step #750, the flow advances to step #755 to test if an in-focus state is obtained (FZCFLG is ON).

If YES in step #755, the flow jumps to the non-drive processing in step #865 and subsequent steps. If NO in step #755, the flow advances to step #760 to test if the AF operation cannot be performed (LOCFLG is ON). If YES in step #760, the flow jumps to scan drive processing in step #830 and subsequent steps. If NO in step #760, the flow advances to drive processing in step #765 and subsequent steps.

In steps #765 to #775, reversal of the drive direction of the photographing lens is discriminated. In step #765, the sign of the present defocus amount (DEF) is compared with a,last defocus amount (DEFLST). If YES in step #765, a drive reversal flag is set (REVFLG is ON) in step #770, and the flow advances to step #780. If NO in step #765, the drive reversal flag is reset (REVFLG is OFF) in step #775, and the flow advances to step #780.

In step #780, the last defocus amount (DEFLST) is updated with the present defocus amount (DEF).

In step #785, the drive amount of the AF motor, i.e., an estimated pulse count (ETM) fed back from the encoder 52 according to the present defocus amount (DEF) is calculated using the following equation.

$$ETM = KL \times KB \cdot |DEF| \tag{8}$$

In equation (8), the coefficient KL represents a rotational speed of the lens coupling 14 per unit defocus amount of the image surface of the photographing lens, and the coefficient KB represents the pulse count generated by the encoder 52 per revolution of the body coupling 53.

Therefore, according to equation (8), the pulse count to be generated by the encoder 52 When the image surface of the photographing lens is moved by the present defocus amount (DEF) can be calculated.

The calculated estimated pulse count is set in the comparison register as a set value of pulse counter interruption (to be described later).

In step #790, the scan flag is reset (SCAFLG is OFF), and in step #795, the present drive operation is performed (DRVFLG is ON). In step #800, the drive state flag is set (MOVFLG is ON).

In step #805, the pulse counter is cleared (ECNT=0) before the drive operation is started.

In steps #810 to #820, the drive direction is determined in accordance with the sign of the present defocus amount (DEF) to start the drive operation. In step #810, the sign of the present defocus amount (DEF) is checked. If the near-focus state is detected (the sign is positive), the AF motor is rotated in the forward direction in step #815.

If the far-focus state is detected (the sign is negative), the flow advances to step #820, and the AF motor is reversed.

At the end of the drive processing, the pulse counter interruption is permitted in step #825, and the flow then advances to the next AGC calculation module ⑪.

If YES in step #760, the flow advances to step #830 to test if the scan drive operation is being inhibited (NSCFLG is ON).

If YES in step #830, the flow advances to the non-drive processing in step #865 and subsequent steps without executing the scan drive operation.

If NO in step #830, it is tested in step #835 if the scan operation is being performed (SCAFLG is ON). If YES in step #835, the flow jumps to step #860 without executing scan drive start processing. If NO in step #835, the scan drive start processing in steps #840 to #855 is executed. In step #840, the flag indicating the scan state is set (SCAFLG is ON), and in step #845, the present drive operation is performed (DRVFLG is ON). In step #850, the flag indicating that the drive operation is being performed is set (MOVFLG is ON).

In step #855, the drive operation of the AF motor is started in the predetermined direction to start the scan operation, and in step #856, a lens end counter is cleared (LCOUNT= 0). The flow then advances to step #860.

In step #860, the pulse counter interruption is inhibited, and the flow advances to the AGC calculation module ⑪.

When the flow advances from step #740, #745, #750, #755, or #830 to step #865, the scan flag is reset (SCAFLG is OFF), and the flag indicating the drive state is reset (MOVFLG is OFF) in step #875. At the end of the non-drive processing, the AF motor is stopped in step #880, and the flow advances to the next module.

Figure 25:
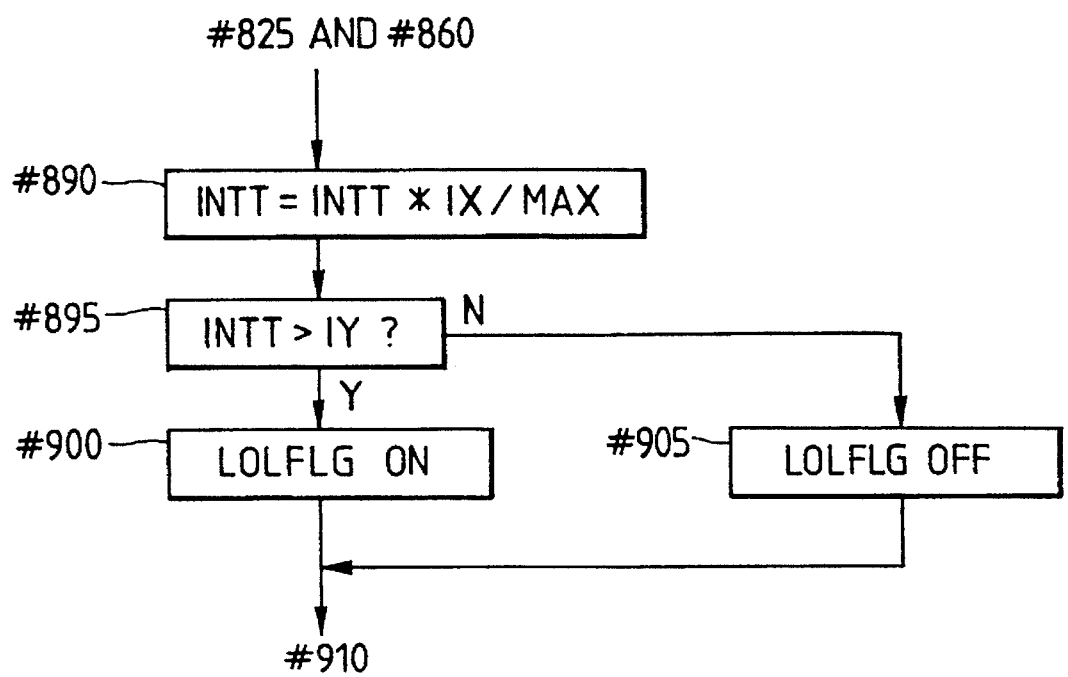

FIG. 25 is a flow chart of the AGC calculation module ⑪.

In step #890, the next CCD storage time (INTT) is calculated using equation (9).

$$INTT = INTT \times IX / MAX \tag{9}$$

In equation (9), INTT in the right-hand side is the present storage time, IX is the target value of the maximum value of CCD data, and MAX is the maximum value of the present CCD data.

According to equation (9), the next storage time (INTT in the left-hand side) is set so that the maximum value of the next CCD data is set to be the target value IX.

In step #895, it is tested if the next storage time is larger than a predetermined value IY, i.e., a luminance is low. If YES in step #895, the flow advances to step #900, and the low luminance flag is set (LOLFLG is ON), and the flow returns to the storage preparation module ②. If NO in step #895, the flow advances to step #905, and the low luminance flag is reset (LOLFLG is OFF). The flow then returns to the storage preparation module ②. In the above processing, whether or not the luminance is low is determined on the basis of the CCD storage time. The AF CPU may communicate with the main CPU to acquire AE information (photometric information) stored in the main CPU, and can determine on the basis of the acquired information whether or not the luminance is low.

IY is set to be a predetermined value. However, a predetermined hysteresis may be provided. One cycle of the storage calculation and the drive operation of the main program has been described. This processing is repetitively executed.

FIGS. 26A and 26B are flow charts of the timer interruption program. The timer interruption program is started every predetermined period of time during execution of the main program to execute corresponding processing.

Processing in steps #910 to #925 is performed to update the AF mode flag (AFMFLG).

In step #910, it is tested if a mounted lens is an AF lens (AFLFLG is ON). If YES in step #910, the flow advances to step #915 to test if the focus mode signal (FM) indicates the one-shot AF mode or the continuous AF mode (C or 0). If YES in step #915, the flow advances to step #920, and the AF mode flag (AFMFLG) is set (ON). The flow then advances to step #930. If NO in step #910 or if NO in step #915, the flow advances to step #925, and the AF mode flag (AFMFLG) is reset (OFF). The flow advances to step #930.

Processing in steps #930 to #940 is performed to update the one-shot flag. In step #930, it is tested if the focus mode signal (FM) indicates the one-shot AF mode.

If YES in step #930, the one-shot flag is set (ONEFLG is ON), and the flow advances to step #945.

If NO in step #930, the one-shot flag is reset (ONEFLG is OFF), and the flow advances to step #945.

In steps #945 to #1005, full-depression, pursuit delay, and mirror-up processing operations in the pursuit mode are executed.

In steps #945 to #965, it is checked whether or not the pursuit mode is set. In step #945, it is tested if the frame speed mode signal (DM) indicates the normal continuous photographing mode (C2). If NO in step #945, the flow advances to step #965.

If YES in step #945, the flow advances to step #950 to test if the AF mode is set (AFMFLG is ON).

If NO in step #950, a non-pursuit mode is determined, and the flow advances to step #965.

If YES in step #950, the flow advances to step #955 to test if the one-shot mode is set (ONEFLG is ON).

If YES in step #955, the non-pursuit mode is determined, and the flow advances to step #965.

If NO in step #955, the pursuit mode is determined, and the flow advances to step #960.

When the focus mode is the continuous AF mode, the frame speed mode is the mode C2, and the mounted lens is the AF lens, the flow advances to step #960, and the pursuit mode is set (PMDFLG is ON). Thereafter, the processing in the pursuit mode is executed.

On the other hand, in another combination of the modes, the non-pursuit mode and the pursuit mode are reset (PMDFLG is OFF), and the flow advances to mirror-up processing in step #1010 without executing the processing in the pursuit mode.

If the pursuit mode is set in step #960, it is tested in step #970 if the release button signal (RB) is ON (full-depression). If YES in step #970, the flow jumps to step #980 without going through the full-depression processing in the pursuit mode in step #975.

If NO in step #970, the pursuit delay flag is reset (PDYFLG is OFF) in step #975, the mirror flag is reset (MIRFLG is OFF), and the release permission signal (RL) is OFF (inhibition) to reset the operation in the full-depression state in the pursuit mode.

In steps #980 to #995, the pursuit delay time is counted in the pursuit mode, and the release operation is permitted after the lapse of the pursuit delay time.

It is tested in-step #980 if the pursuit delay operation is being performed (PDYFLG is ON). If NO in step #980, the flow advances to step #1000 without executing processing in step #985 and subsequent steps. If YES in step #980, the pursuit delay time is decremented by one (PRSDLY=PRSDLY−1) in step #985. For example, when the timer interruption is made every 1 ms and the pursuit delay time is 45 ms, PRSDLY=45 is set in the AF permission waiting module ⑨, and is decremented by one every timer interruption. Therefore, the pursuit delay time becomes 0 after the lapse of 45 ms.

In step #990, it is tested if the pursuit delay time is ended (PRSDLY=0). If NO in step #990, the flow jumps to step #1000.

If YES in step #990, delay end processing is performed, the pursuit delay flag is reset (PDYFLG=OFF), and the release permission signal (RL) is set to be ON (permission). A release permission signal is supplied to the main CPU, and the flow advances to step #1000.

In steps #1000 and #1005, mirror-up processing in the pursuit mode is executed. In step #1000, it is tested if the mirror-up signal (MR) indicates a mirror-up operation (ON). If NO in step #1000, the flow jumps to step #1010.

If YES in-step #1000, the mirror flag is reset (MIRFLG is OFF) in step #1005 to allow the flow to advance to the processing after the mirror-up processing in the storage preparation module ②. In addition, in order to inhibit the subsequent release operation, the release permission signal (RL) is OFF (inhibition), and the flow advances to step #1010.

Steps #1010 to #1050 correspond to mirror-up processing blocks. In step #1010, it is tested if the mirror-up signal (MR) is ON (up). If NO in step #1010, the mirror-up flag is reset (RLSFLG is OFF) to set a mirror-down state. The flow then jumps to step #1060. If YES in step #1010, the fix flag is reset (FIXFLG is OFF) and the release permission signal (RL) is OFF (inhibition) so that fixing of the display drive and release permission in the in-focus state of the one-shot mode are canceled after the single exposure (mirror-up operation).

It is tested in step #1020 if the mirror-up operation is performed during the immediately preceding timer interruption (RLSFLG is ON). If YES in step #1020, the flow jumps to step #1060.

If NO in step #1020, since the mirror is started to move upward from the mirror-down state between the immediately preceding and present timer interruption periods, the drive delay operation is started in synchronism with this, as shown in FIG. 4.

In step #1025, the mirror-up flag is set (RLSFLG is ON) to set a mirror-up state. It is tested in step #1030 if the drive operation is being performed (MOVFLG is ON). If NO in step #1030, since the drive delay operation need not be performed, the flow jumps to step #1060. If YES in step #1030, the delay flag is set (DLYFLG is ON) in step #1035 to enter the drive delay state. In step #1040, it is tested if the pursuit mode is set (PMDFLG is ON).

If YES in step #1040, the delay time is set to be the predetermined value T2 (DLY=T2) so that the mirror-up operation by the main CPU is completed and exposure is started just upon completion of the drive operation. The flow then advances to step #1060.

If NO in step #1040, the delay time is set to be the predetermined value T0 (DLY=T0, T0<T2) so that the drive operation is completed before completion of the mirror-up operation by the main CPU, and the flow advances to step #1060.

In steps #1060 to #1070, motor stop processing when the AF permission signal is OFF is executed.

In step #1060, it is tested if the AF permission signal (AF) is ON (permission). If YES in step #1060, the flow jumps to step #1075 without executing the stop processing.

If NO in step #1060, it is tested in step #1065 if the AF motor is being driven. If NO in step #1065, the flow jumps to step #1075 without executing the stop processing.

If YES in step #1060, the drive operation of the AF motor is stopped, and the drive state flag is reset (MOVFLG is OFF) in step #1070. The flow then advances to step #1075. Steps #1075 to #1090 correspond to blocks of drive delay time counting and delay end processing operations.

In step #1075, it is tested if the drive delay operation is being performed (DLYFLG is ON). If NO in step #1075, the flow jumps to step #1095. If YES, in step #1075, the drive delay time is decremented by one (DLY=DLY−1) in step #1080. When the timer interruption is performed every 1 ms and the delay time is 55 ms, DLY=55 is set in step #1045, and is decremented by one every timer interruption. Therefore, the delay time becomes 0 after the lapse of 55 ms. In step #1085, it is tested if the drive delay operation is ended (DLY32 0). If NO in step #1085, the flow jumps to step #1095. If YES in step #1085, the drive operation of the AF motor is stopped, the drive delay flag is reset (DLYFLG is OFF), and the drive state flag is reset (MOVFLG is OFF) in step #1090. The flow then advances to step #1095.

Steps #1095 to #1125 are blocks of lens end processing. In a normal drive operation, the motor is stopped at the lens end, and in the scan drive operation, the motor is reversed at the lens end.

It is tested in step #1095 if the lens end is reached (ECNT=ELST).

Since the timer interruption is performed every predetermined period of time, when no pulse is generated at the lens end, the content of the pulse counter is not increased, and the content (ELST) of the pulse counter in the immediately preceding timer interruption coincides with the content (ECNT) of the pulse counter in the present timer interruption.

Therefore, whether or not the lens end is reached can be discriminated on the basis of the coincidence/noncoincidence of the content of the pulse counter. If NO in step #1095, the flow jumps to step #1115. If YES in step #1095, it is tested in step #1100 if the scan operation is being performed (SCAFLG is ON). If NO in step #1100, the flow advances to the stop processing in step #1125. If YES in step #1100, it is tested in step #1105 if the number of times of arrival at the lens end is a predetermined value LX (e.g., 2) (LCOUNT=LX). If YES in step #1105, it is determined that the scan operation is completed, and the flow advances to step #1120. In step #1120, the scan flag is reset (SCAFLG is OFF), and the scan inhibition flag (NSCFLG is ON) to perform scan end processing. The flow then advances to step #1125.

In step #1125, the drive operation of the AF motor executed at the lens end in the normal drive state and upon completion of the scan operation is stopped, and the drive state flag is reset (MOVFLG is OFF). The flow then advances to step #1130 to return to the main program. On the other hand, if NO in step #1105, the flow advances to step #1110 to reverse the drive direction of the scan operation, and the content of the lens end counter is incremented by one (LCOUNT=LCOUNT+ 1), thereby reversing the drive direction of the AF motor. The flow advances to step #1115.

In step #1115, the content of the last pulse counter is updated (ELST=ECNT), and the flow returns to the main program in step #1130.

FIG. 27 is a flow chart of the pulse counter interruption program.

The pulse counter interruption is performed when an accumulated number (ECNT) of pulses generated by the encoder 52 coincides with an estimated pulse count (ETM) calculated by the drive control module ⑩, and AF motor drive stop processing after the photographing lens is moved to the in-focus position is performed.

In step #1140, the drive operation of the AF motor is stopped. In step #1145, the drive state flag is reset (MOVFLG is OFF). In step #1150, interruption is inhibited so that pulse counter interruption is no longer performed thereafter. The flow returns to the main program in step #1155.

The modules of the main programs and the interruption programs of the AF CPU have been described. The modules and the interruption programs control the AF operation and the AF motor drive operation in association with each other.

In the description of this embodiment, in the pursuit algorithm module ⑦ of the AF CPU, the absolute value (|PRED+PLST|) of the sum of the present pursuit defocus amount and the immediately preceding defocus amount is compared with the predetermined value δ to determine whether or not the pursuit operation is performed (branch at step #490).

As described above, the reason for discriminating whether or not an object is a moving object, and accordingly determining whether or not the pursuit operation is performed will be described in detail below.

In a conventional system, whether or not an object is moving is discriminated as follows. A present pursuit defocus amount is calculated as a defocus amount on the basis of the previous and present defocus amounts taking movement of an object during a focus detection cycle into consideration, and the present pursuit defocus amount is compared with a predetermined value.

For example, if the present pursuit defocus amount is represented by PRED(0) and the predetermined value is represented by δ, when |PRED(0)|≧δ, it is discriminated that the object is a moving object. When |PRED(0)|<δ, it is discriminated that the object is not a moving object.

A conventional pursuit operation and discrimination of a moving object will be described below with reference to FIG. 28.

Figure 28:
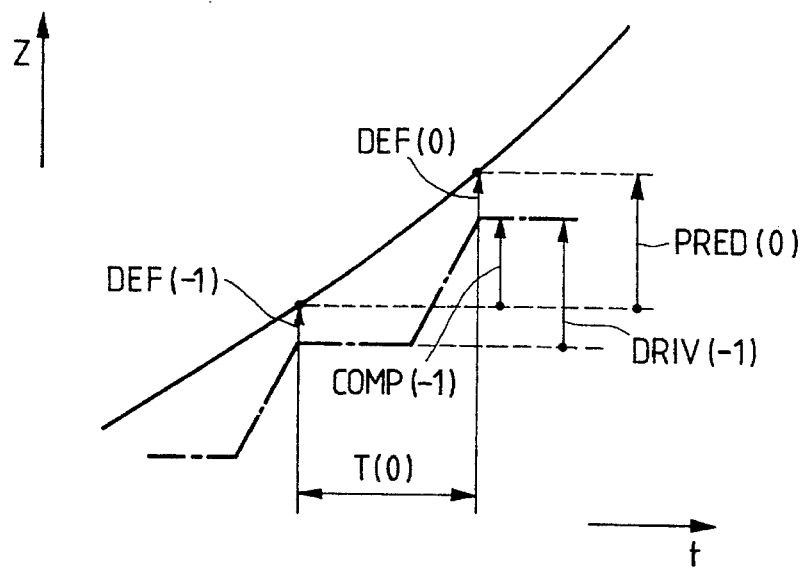
FIG. 28 is a chart for explaining a conventional pursuit operation.

In FIG. 28, a solid curve represents a path of movement of the photographing lens for causing an object image to always coincide with the film surface for a moving object, and an alternate long and short dashed curve represents a path of actual movement of the photographing lens. The charge storage of the sensor for AF and the AF calculation are performed after the photographing lens is stopped, and the charge storage of the sensor (in FIG. 28, storage time≈0) is performed immediately after the drive operation.

In the pursuit operation, the drive amount of the photographing lens is calculated by adding a pursuit correction amount to the defocus amount obtained by the AF operation. For example, in FIG. 28, in the first drive operation, its drive amount DRIV(−1) is calculated as a sum of an immediately preceding defocus amount DEF(−1) (corresponding to a difference between the solid curve and the alternate long and short dashed curve in FIG. 28) and an immediately preceding pursuit correction amount COMP(−1). A pursuit defocus amount PRED(0), a sum of a present defocus amount DEF(0) obtained upon completion of the drive operation and the immediately preceding pursuit correction amount COMP(−1), corresponds to a moving amount of the photographing lens, i.e., a moving amount of an object indicated by the solid curve in one AF cycle (a period starting from immediately preceding sensor storage to present sensor storage), as can be seen from FIG. 28. When the absolute value of the pursuit defocus amount PRED(0) is equal to or larger than a predetermined value, it is determined that the object is moving.

However, when only the present pursuit defocus amount is compared with the predetermined value to discriminate a moving object, erroneous discrimination tends to occur due to an error included in the defocus amount DEF(0). In particular, when the object moves slightly, a rate of an error occupied in the pursuit defocus amount PRED(0) becomes relatively high. Even if the object movement is uniform, the pursuit operation is repetitively enabled and disabled, resulting in unstable movement of the photographing lens.

As described above, when only the present pursuit defocus amount alone is compared with the predetermined value, a cycle for detecting a moving amount of the object is shortened by one cycle. Therefore, object movement is erroneously discriminated upon an influence of random-noise movement of the object, and slight movement of the object cannot be detected. Even if the AF cycle is changed, erroneous detection often occurs upon influence of the change.

In the above embodiment, in order to solve the conventional problems, not only the pursuit defocus amount is compared with the predetermined value. As described above, the present pursuit defocus amount and the immediately preceding pursuit defocus amount are added to each other, and the absolute value of the sum is compared with the predetermined value δ to discriminate the moving object. As a result, the influences of an error included in the pursuit defocus amount, random-noise movement of the object, a change in AF cycle, and the like can be statistically eliminated, and a stable operation is guaranteed.

In general, in place of the processing in step #490 in this embodiment, a result of statistical averaging processing of the pursuit defocus amount is compared with the predetermined value δ, thus allowing discrimination of the moving object.

For example, if the present pursuit defocus amount is represented by PRED(0) and a pursuit defocus amount n cycles before the present cycle is represented by PRED(n) (n is a positive integer), discrimination of statistical processing given by equation (10) can be performed in step #490.

$$|k(0) \times PRED(0) \times k(1) \times PRED(1) + \ldots + k(n) \times PRED(n) + \ldots + k(N) \times PRED(N)| \to \delta \quad (10)$$

where k(n) is the predetermined weighting coefficient, and N is an arbitrary integer. In this embodiment, N=1 and k(0)=k(1)=1 in equation (10).

In equation (10), when the arbitrary integer N is appropriately selected, a period (N×cycle time) for detecting the moving amount of an object can be selected.

The weighting coefficient k(n) can be set like equation (11) to weight by a latest pursuit defocus amount and to shorten a response time.

$$k(0) > k(1) > \ldots k(n) > \ldots > k(N) \quad (11)$$

The weighting coefficient k(n) can be set like equation (12) in proportion to the parameter SLOP(n) or constant value CONT(n) calculated in the defocus amount calculation when the pursuit defocus amount PRED(n) is calculated.

$$k(n) = k \times SLOP(n) \text{ or } k \times CONT(n) \quad (12)$$

where k is the predetermined constant. When the coefficient k(n) is set as in equation (12), the pursuit defocus amount is averaged by a weight proportional to reliability, thus allowing discrimination of the moving object with higher accuracy.

Each cycle time T(n) is measured to cancel a change in AF cycle time (corresponding to an interval from the end of a first drive operation to the end of a next drive operation) when the pursuit defocus amount PRED(n) is calculated, and the weighting coefficient k(n) can be determined using the measured cycle time as in equation (13).

$$k(n) = \frac{k}{T(n)} \quad (13)$$

where k is the predetermined constant.

When the coefficient k(n) is set as in equation (13) and statistical averaging processing of equation (10) is executed, a product of each weighting coefficient and the pursuit defocus amount corresponds to a pursuit defocus amount in unit time, and is free from a change in cycle time.

As described above, the pursuit defocus amount undergoes the statistical averaging processing, and whether or not an object is a moving object is discriminated according to the processing result. The influences of an error included in the pursuit defocus amount, random-noise movement of an object, and a change in AF cycle (in particular, the change occurs when the exposure interrupts the pursuit operation) can be eliminated, and a stable pursuit operation can be assured. In addition, since the influences of the error are eliminated, the predetermined value δ can be set to be small accordingly. Therefore, slight movement of the object can be discriminated, and a pursuit operation can be started, thus improving pursuit performance.

One characteristic feature of the present invention is a pursuit technique wherein after the release button is fully depressed, the mirror-up operation is started a first predetermined time period after the beginning of the lens drive operation, a cycle time, e.g., an exposure period, a storage period, and the like is kept constant regardless of a lens drive time, and a photograph in a just-in-focus state can be obtained at an instant of exposure. An additional description of this pursuit technique will be given below.

The pursuit operation in a continuous photographing mode has the following sequence. More specifically, the mirror-up operation, exposure, mirror-down operation, charge storage, calculation, and lens drive operation are repeated. Of these operations, the mirror-up and mirror-down operation times of 50 to 100 ms are kept constant and left unchanged in an identical type of apparatus. An exposure time is almost constant during the continuous exposure, and is short, e.g., about 30 ms or less under a bright condition wherein the pursuit operation is enabled. Thus, the exposure time does not contribute to a variation. Although the storage time depends on the brightness of an object, it is almost constant in the continuous exposure, and is about 30 ms or less at a normal brightness. Therefore, the storage time contributes less to the variation. Although the calculation time varies depending on an AF system, it becomes a constant value between 20 ms to 100 ms, and its variation during the continuous exposure is small.

In contrast to this, the drive time of the lens varies within the range of 0 ms to 100 ms in accordance with the defocus amount for the pursuit drive operation.

If one cycle consists of the mirror-up operation, exposure, mirror-down operation, charge storage, calculation, and lens drive operation to constitute a sequence like in a conventional apparatus, the mirror-up operation associated with the next cycle is started after the immediately preceding lens drive operation. If one cycle time is about 300 ms (3 frames/sec), one cycle time may be varied between 250 ms to 350 ms depending on the drive time.

In the pursuit operation, the following method can be employed so that an in-focus state can be obtained at an instant of the next exposure.

A pursuit correction amount (COMP) is calculated by the following equation using a storage period of an immediately preceding cycle, an image surface moving amount (PRED) by object movement during the immediately preceding cycle, and a time from an intermediate point of the last storage time to an intermediate point of the next predicted exposure time.

$$COMP = PRED \times \alpha;$$

$$\alpha = \frac{\text{(time between last storage and next exposure)}}{\text{(immediately preceding cycle time)}}$$

The photographing lens is driven by a pursuit drive amount as a sum of the last defocus amount DEF and the pursuit correction amount COMP. If the mirror-up operation is performed in synchronism with the end of the drive operation, not only the denominator but also the numerator of the above equation cause a variation of about 100 ms. For example, the numerator varies within the range of 150 ms to 250 ms. Since the drive time cannot be estimated, variations in the denominator and numerator become large in the method of starting the mirror-up operation upon completion of the drive operation, and an appropriate $\alpha$ cannot be determined. Therefore, an effective pursuit operation cannot be performed.

In this invention, the mirror-up operation is started a first predetermined time period T1 after the beginning of the drive operation regardless of the drive time, i.e., whether the drive operation is being performed or not.

Thus, the denominator and the numerator of the above equation can be rendered almost constant, and the pursuit correction amount COMP is calculated using the value $\alpha$ determined in this manner. Thus, an in-focus state can be reliably realized at an instant of the next exposure.

When a power supply capacity for performing a film wind-up operation after the mirror-down operation is short, the film wind-up and lens drive operations cannot performed at the same time, and the lens drive operation is performed after the film wind-up operation is completed even if the calculation is ended, since the film wind-up time during the continuous exposure is almost constant. In this case, the cycle time is not changed, and no problem is posed.

The above technique will be summarized below in due order:

There are an AF means for repetitively calculating a defocus amount of a photographing lens; a pursuit correction amount calculating means for calculating a pursuit defocus amount as a defocus amount upon object movement during a defocus detection cycle on the basis of previous and present defocus amounts and calculating a pursuit correction amount (COMP) for a pursuit operation on the basis of the pursuit defocus amount; and a lens drive means for driving the lens on the basis of a pursuit drive amount (DRIV) obtained by adding the pursuit correction amount (COMP) to the present defocus amount (DEF).

If a means for controlling timings of mirror-up, storage, and drive operations is defined as a control means, the control means controls to perform the mirror-up operation after the lapse of a first predetermined time period T1 after the beginning of the lens drive operation in a cycle of the mirror-up, exposure, mirror-down, storage, calculation, and drive operations.

The control means limits a time interval capable of driving the lens to a predetermined maximum drive time period (T1+T2). Therefore, when the lens drive operation is not completed after the lapse of the time T2 from the mirror-up operation, the control means forcibly stops the lens.

The time T2 is almost equal to a time from the beginning of the mirror-up operation to the beginning of exposure, and preferably, almost equal to a time until the drive operation is almost stopped immediately before exposure.

The predetermined maximum drive time period (T1+T2) is preferably set to be a time wherein the lens can be completely driven by the defocus amount of 3 to 4 mm, e.g., about 100 ms. In this case, if the time T2 almost equal to the mirror-up operation is about 50 ms, the maximum drive time (T1+T2) falls within the range of T1 to 50 ms.

When the drive operation is not completed within the predetermined maximum time period and the lens is forcibly stopped, the remaining drive amount is checked. When the remaining drive amount exceeds a predetermined value, the next pursuit correction is preferably inhibited. Thus, overrunning caused by the pursuit operation can be prevented depending on the way of movement of a moving object, and if the lens overruns, it can be recovered within a short period of time.

In this invention, the cycle of the mirror-up operation during the continuous exposure must include a single AF operation. This is to facilitate estimation of a lens position upon the next exposure since the exposure and storage cycles are rendered constant.

Of course, a time after the exposure is ended until the storage operation is started is controlled to always be constant by the control means.

In this invention, the maximum drive time is determined, and if a necessary drive amount is attained within the determined time, an in-focus state can be achieved at an instant of exposure regardless of the drive time. Therefore, complicated time control and drive speed control are not necessary, and corresponding processing can be easily performed even if a load varies depending on the types of interchangeable lens and a drive speed largely varies.

TABLE 1

< A F C P U I O SIGNAL >

| IO SIGNAL | NAME | CONTENT | INITIAL VALUE |
|---|---|---|---|
| AF | AF PERMISSION SIGNAL | ON AF PERMISSION<br>OFF AF INHIBITION | OFF |
| MR | MIRROR-UP SIGNAL | ON MIRROR-UP<br>OFF MIRROR-DOWN | OFF |
| RL | RELEASE PERMISSION SIGNAL | ON RELEASE PERMISSION<br>OFF RELEASE INHIBITION | OFF |
| FM | FOCUS MODE SIGNAL | C, O, M | |
| DM | FRAME SPEED MODE SIGNAL | C1, C2, S | |
| RB | RELEASE BUTTON SIGNAL | ON FULL DEPRESSION<br>OFF NON-FULL DEPRESSION | OFF |

TABLE 2

FOCUS MODE AND FRAME SPEED MODE

| | | FM FOCUS MODE | | |
|---|---|---|---|---|
| DM | | C (CONTINUOUS AF) | O (ONE-SHOT AF) | M (MANUAL) |
| FRAME SPEED MODE | C1 HIGH-SPEED CONTINUOUS PHOTOGRAPHING | PURSUIT DISABLED | PURSUIT DISABLED | PURSUIT DISABLED |
| | C2 NORMAL CONTINUOUS PHOTOGRAPHING | PURSUIT ENABLED | PURSUIT DISABLED | PURSUIT DISABLED |
| | S SINGLE PHOTOGRAPHING | PURSUIT DISABLED | PURSUIT DISABLED | PURSUIT DISABLED |

TABLE 3

(FLAGS FOR AF CPU PROGRAM)

| FLAG | NAME | MEANING | INITIAL VALUE |
|---|---|---|---|
| RLSFLG | MIRROR-UP FLAG | 1 IN MIRROR-UP<br>0 NOT IN MIRROR-UP | 0 |
| LLMFLG | LENS END FLAG | 1 LENS END<br>0 NOT LENS END | 0 |
| LOCFLG | LOW-CONTRAST FLAG | 1 LOW CONTRAST<br>0 NOT LOW CONTRAST | 0 |
| AFMFLG | AF MODE FLAG | 1 IN AF MODE<br>0 NOT IN AF MODE | 0 |
| SCAFLG | SCAN FLAG | 1 IN SCAN<br>0 NOT IN SCAN | 0 |
| NSCFLG | SCAN INHIBITION FLAG | 1 SCAN INHIBITION<br>0 SCAN PERMISSION | 0 |
| DRVFLG | DRIVE FLAG | 1 DRIVEN<br>0 NOT DRIVEN | 0 |
| MOVFLG | DRIVE STATE FLAG | 1 IN DRIVE STATE<br>0 IN STILL STATE | 0 |
| DLYFLG | DELAY FLAG | 1 IN DELAY<br>0 NOT IN DELAY | 0 |
| AFLFLG | AF LENS FLAG | 1 AF LENS<br>0 NOT AF LENS | 0 |
| FZCFLG | IN-FOCUS FLAG | 1 IN-FOCUS STATE IN NORMAL MODE<br>0 OUT-OF-FOCUS STATE IN NORMAL MODE | 0 |
| FIXFLG | FIX FLAG | 1 FIX DISPLAY AND DRIVE<br>O NOT FIX DISPLAY AND DRIVE | 0 |
| LOLFLG | LOW-LUMINANCE FLAG | 1 LOW LUMINANCE<br>0 NOT LOW LUMINANCE | 0 |
| ONEFLG | ONE-SHOT FLAG | 1 IN ONE-SHOT MODE<br>O NOT IN ONE-SHOT MODE | 0 |
| PRSFLG | IN-PURSUIT FLAG | 1 IN PURSUIT<br>0 NOT IN PURSUIT | 0 |
| PDYFLG | PURSUIT DELAY FLAG | 1 IN PURSUIT DELAY<br>0 NOT IN PURSUIT DELAY | 0 |
| MIRFLG | MIRROR FLAG | 1 BEFORE MIRROR-UP<br>0 AFTER MIRROR-UP | 0 |
| PMDFLG | PURSUIT MODE FLAG | 1 IN PURSUIT MODE<br>0 NOT IN PURSUIT MODE | 0 |
| REVFLG | DRIVE REVERSE FLAG | 1 DRIVE IN REVERSE DIRECTION<br>0 DRIVE IN FORWARD DIRECTION | 0 |

TABLE 4

DATA AF CPU PROGRAM

| DATA | NAME | CONTENT | INITIAL VALUE |
|---|---|---|---|
| PCOUNT | SHOT COUNTER | 0 NO RELEASE<br>1 IMMEDIATELY BEFORE 1ST FRAME<br>2 BETWEEN 1ST AND 2ND FRAMES<br>3 BETWEEN 2ND AND 3RD FRAMES<br>4 AFTER 3RD FRAME | 0 |
| PRED | PURSUIT DEFOCUS AMOUNT | POSITIVE: NEAR-FOCUS<br>NEGATIVE: FAR-FOCUS | |
| PLST | LAST PURSUIT DEFOCUS AMOUNT | POSITIVE: NEAR-FOCUS<br>NEGATIVE: FAR-FOCUS | |
| COMP | PURSUIT CORRECTION AMOUNT | POSITIVE: NEAR-FOCUS<br>NEGATIVE: FAR-FOCUS | |
| DRIV | PURSUIT DRIVE AMOUNT | POSITIVE: NEAR-FOCUS<br>NEGATIVE: FAR-FOCUS | |
| PRSDLY | PURSUIT DELAY | RELEASE PERMISSION DELAY TIME | |
| DEF | DEFOCUS AMOUNT | POSITIVE: NEAR-FOCUS<br>NEGATIVE: FAR-FOCUS | |
| DEFLST | LAST DEFOCUS AMOUNT | POSITIVE: NEAR-FOCUS | 0 |

TABLE 4-continued

DATA AF CPU PROGRAM

| DATA | NAME | CONTENT | INITIAL VALUE |
|---|---|---|---|
| SLOP | RELIABILITY | NEGATIVE: FAR-FOCUS INCLINATION OF INTERPORATION LINE OF 3-POINT INTERPORATION | |
| SHIFT | SHIFT AMOUNT | POSITIVE: NEAR-FOCUS NEGATIVE: FAR-FOCUS | |
| LCOUNT | LENS END COUNTER | LENS END COUNT DURING SCAN | 0 |
| DLY | DRIVE DELAY | DRIVE END DELAY TIME | |
| ECNT | PULSE COUNTER | TOTAL ENCODER PULSE COUNT | |
| ELST | LAST PULSE COUNT | FINAL ENCODER PULSE COUNT | |
| ETM | ESTIMATED PULSE COUNT | ESTIMATED PULSE COUNT TO IN-FOCUS POINT | |
| INTT | STORAGE TIME | CCD STORAGE TIME | I Z |
| KX | DEFOCUS CONVERSION COEFFICIENT | DEF = KX*SHIFT | |
| KB | PULSE CONVERSION COEFFICIENT 1 | ETM = KL*KB*DEF | |
| KL | PULSE CONVERSION COEFFICIENT 2 | ETM = KL*KB*DEF | |
| FL | LENS FOCAL LENGTH | FOCAL LENGTH OF MOUNTED LENS | |

TABLE 5

(Conditions of performing pursuit Operation)

(1) A pursuit mode is set (2) A contrast is not low (3) Reliability is detected (4) A scan operation is not performed (5) An immediately preceding drive operation is performed (6) A drive direction is not reversed (7) The sign of a defocus amount is the same as that of a last pursuit defocus amount or defocus amount is small even if the signs are opposite.

(8) The sign of a pursuit defocus amount is the same as that of a last pursuit defocus amount (9) An absolute value of a sum of a pursuit defocus amount and a last pursuit defocus amount is equal to or larger than the predetermined value $\delta$

(10) A pursuit defocus amount is equal to or smaller than a product of a predetermined value r and a last pursuit defocus amount

(11) A pursuit defocus amount is equal to or larger than a product of a predetermined value k and a last pursuit defocus amount As described above, according to the first embodiment of the present invention, after the drive direction of the photographing lens is reversed, the pursuit drive operation is inhibited for a predetermined number of times of drive operation. An automatic focusing apparatus which can prevent hunting near an in-focus point caused by unnecessary pursuit drive operation, which has high stability, and which can accurately pursue an object is provided.

(Second Embodiment)

The second embodiment of the present invention has substantially the same arrangement as the first embodiment, and can more precisely obtain a pursuit correction amount of the first embodiment. The second embodiment will be described below with reference to FIGS. 17, 20, 29A and 29B.

Identification and correction before and after the release button is depressed and after the first mirror-up operation is performed will be summarized.

As shown in FIG. 17, a means for identifying timings of a drive operation before full-depression of a release button, a drive operation immediately after full-depression, a second drive operation after full-depression, third and subsequent drive operations after full-depression, and calculation of a pursuit correction amount prior to these operations is provided, and identification results are represented by PCOUNT=0, 1, 2, and 3 shown in FIG. 20.

Before full-depression (PCOUNT=0), the cycle time of storage, calculation, and drive operations is constant, i.e., F0. In order to calculate the pursuit correction amount (COMP) from the pursuit defocus amount (PRED), COMP=PRED×$\alpha$ and, e.g., $\alpha$=1.

That is, before full-depression, in order to obtain an in-focus state at an intermediate point of a storage time in every cycle, since a cycle time during an immediately preceding storage time is F0 and a time interval until the next estimated storage time is also F0, $\alpha$=F0/F0=1.

After full-depression, since exposure upon completion of the mirror-up operation is performed between the drive and storage operations, the cycle time of the storage operation is changed. After full-depression, an optimal timing of an in-focus state is changed from the intermediate point of the storage time to an intermediate point of exposure (intermediate point means an intermediate time). Therefore, in order to attain an in-focus state during exposure, the pursuit correction amount (COMP) is given by:

$$\text{COMP} = \text{PRED} \times \alpha$$

$$\alpha = \frac{\text{time between last storage and next exposure}}{\text{cycle time in last storage}}$$

Therefore, immediately after full-depression (PCOUNT=1), the pursuit correction amount is given by =F1'/F0.

At a calculation timing (PCOUNT=2) prior to the second drive operation after the mirror-up operation after full-depression, $\alpha$=F2'/F1. At a calculation timing (PCOUNT=3) prior to the third and subsequent drive operations, $\alpha$=F3'/F2.

In this manner, $\alpha$ is calculated on the basis of its formula, and the pursuit correction amount is calculated accordingly, thus allowing an accurate pursuit operation.

Since the time in the denominator is a previous amount, its value is definite. However, since the numerator is a future value, its value is not definite.

Of these values, the most indefinite value is a lens drive time. When an approximate drive amount (DRIV) is calculated while $\alpha=1$, it can be approximately determined. Therefore, when the drive time is determined to have a small margin, a time up to an instant of exposure can be determined, and hence, the "time between last storage and next exposure" can be determined.

In this case, the mirror-up operation can be started such that a mirror-up instruction is issued at an instant a mirror-up time before the instant of predicted exposure.

In practice, as described in the above embodiment, after the release operation, the maximum value of the lens drive time is determined constant, and the mirror-up operation can be started after the lapse of the predetermined time period (T1) from the beginning of the drive operation, so that processing can be preferably facilitated.

In this manner, $\alpha$ becomes an identical value after PCOUNT=3. When PCOUNT=2 and 3, $\alpha$ may or may not be an identical value. This is caused since the numerator is F2'=F3' but the denominator is F1=F2 or F1≠F2. When the lens drive operation is started immediately after storage and calculation operations, F1=F2. If the lens drive operation cannot be performed until the film wind-up operation is completed after the calculation is ended, F1≠F2.

In general, when PCOUNT=0, 1, and 2, an optimal $\alpha$ value varies, and its detailed value varies depending on design factors, e.g., a mirror-up time.

The optimal $\alpha$ value may be determined on the basis of the formula of $\alpha$ or may be experimentally determined. In this embodiment, PCOUNT=0, 1, 2, and 3 are identified using $\alpha$ determined in this manner, and an optimal value is determined with reference to the table (FIG. 17) of $\alpha$.

A problem caused by the fact that a moving speed of an image surface cannot be kept constant with respect to an object which is coming closer at a constant speed will be examined below.

Figure 29A:
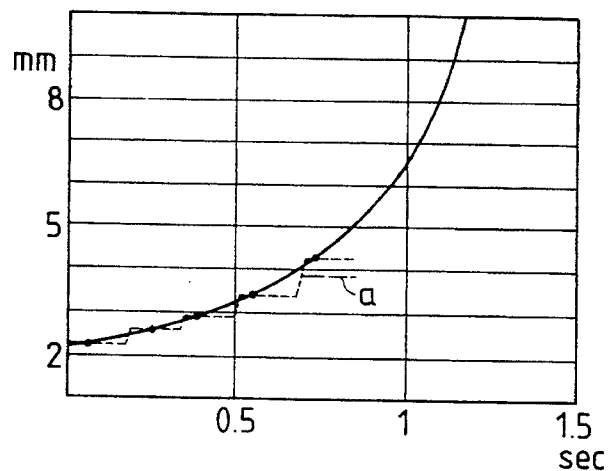
FIGS. 29A and 29B are graphs showing paths of a photographing lens when focal points of the photographing lens are different in a second embodiment of the present invention.
Figure 29B:
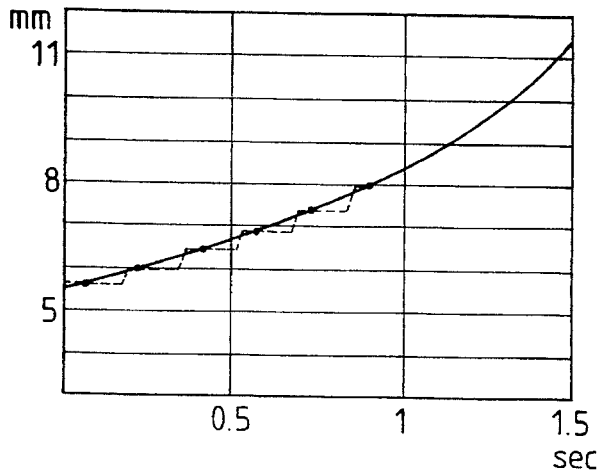

FIGS. 29A and 29B illustrate FIG. 21B in more detail. FIG. 29A shows a case of a photographing lens of f=180 mm, and FIG. 29B shows a case of a photographing lens of f=400 mm.

In either drawing, a solid curve illustrates a state of movement of an image surface when an object is coming closer at a speed of 10 m/s, while a value obtained by subtracting a given value from a distance between a lens and the image surface is plotted along the ordinate.

A dotted curve is drawn while a value obtained by subtracting the given value from a distance between the lens and a predetermined detection surface (conjugate with a film surface) is plotted along the ordinate when a pursuit operation is ideally performed. The dotted curve crosses the solid curve at an instant of storage (black dots), thus achieving an in-focus state.

As can be seen from FIGS. 29A and 29B, in the case of the large focal length lens in FIG. 29B, since a rate of change in image surface is almost constant, a moving amount PRED of the object image surface in an immediately preceding cycle (from storage to storage) can be used as a next estimated moving amount COMP, and hence, $\alpha=1$.

In contrast to this, in the case of a small focal length lens in FIG. 29A, if the value PRED in the immediately preceding cycle is used as the next estimated value COMP, a pursuit delay occurs, as indicated by a broken curve a. Therefore, $\alpha$ is preferably set to be larger than 1 in the following equation:

COMP=PRED×$\alpha$

To summarize the above conclusion, if a predetermined focal length is represented by FX and a focal length of a photographing lens is represented by FL, $\alpha$ is determined as in the following table.

|   | FL < FX | FL ≥ FX |
|---|---|---|
| $\alpha$ | 1.15 | 1.0 |

If the pursuit operation is slightly suppressed for the purpose of stability, $\alpha$ can be determined as in the following table like the above embodiment ($\alpha$ Table in FIG. 17).

|   | FL < FX | FL ≥ FX |
|---|---|---|
| $\alpha$ | 1.0 | 0.85 |

In this manner, the absolute value of the value $\alpha$ varies depending on a decision timing of an in-focus state or taking stability into consideration. In any case, the value $\alpha$ is changed depending on the focal length of a photographing lens, so that an optimal pursuit operation can be performed regardless of a focal length of the lens.

The effect of such correction is not conspicuous when the cycle time is short, e.g., 100 ms or more. However, the effect is conspicuous when the cycle time is 200 ms or more. In particular, when the mirror-up operation is started and the cycle time becomes 300 ms, the effect is greatly increased.

A case will be described wherein an object is going away. Whether the object is going away or coming closer can be easily determined on the basis of the sign of PRED.

When an object is going away, the moving speed of the lens is decelerated as indicated by an alternate long and short dashed curve in FIG. 21A. Therefore, if the pursuit drive operation is continued on the basis of a previous result, the lens tends to overrun. Therefore, the value $\alpha$ is preferably set to be smaller than that obtained in a case wherein the object is coming closer.

Such acceleration/deceleration is considerable for a lens having a small focal length. In this embodiment, when a focal length is small (FL<FX) with a large deceleration effect like in the $\alpha$ table A in FIG. 17B and when PCOUNT=2 and 3 while the cycle time is long and the deceleration effect is great although the focal length is large, the value $\alpha$ is decreased to be smaller than that obtained in a case wherein the object is coming closer.

Factors requiring a change in $\alpha$ include a focal length of the photographing lens, a moving direction of an object, a release timing, a cycle time, and the like. In practice, these factors are combined, and a mechanism depends on a time constant. Therefore, the $\alpha$ table classified as shown in FIG. 17 is stored, and a value $\alpha$ depending on a condition can be preferably used. An optimal value can be experimentally determined, and an optimal value of $\alpha$ changes if a body is changed and a time constant of a mechanism is changed. However, an appropriate optimal value of $\alpha$ falls within the range of $0.5 \leq \alpha \leq 1.5$.

(Third Embodiment)

The third embodiment of the present invention has substantially the same arrangement as the first embodiment, and can facilitate an in-focus display in the first embodiment. The third embodiment will be described hereinafter with reference to FIGS. 30 to 32.

In the in-focus discrimination/display module ⑧ in the AF CPU program shown in FIG. 7, when the pursuit operation is being performed and the lens end is not reached as shown in steps #590 to #605 in FIG. 22, both the indicators 41 and 43 of the AF display means 40 are activated to be set in a display mode different from the normal AF state display, thus causing a user to recognize that the pursuit operation is being performed.

The user can know with this display that an object is moving, and can set a photographing condition for a moving object, e.g., can select an aperture and a shutter speed.

An additional description of a display technique during a pursuit operation will be made with reference to another embodiment.

In step #605 in FIG. 22, a pursuit operation display is made by the AF display means 40. In another embodiment, the pursuit operation display can be displayed by a display means other than the AF display means 40.

Figure 30A:
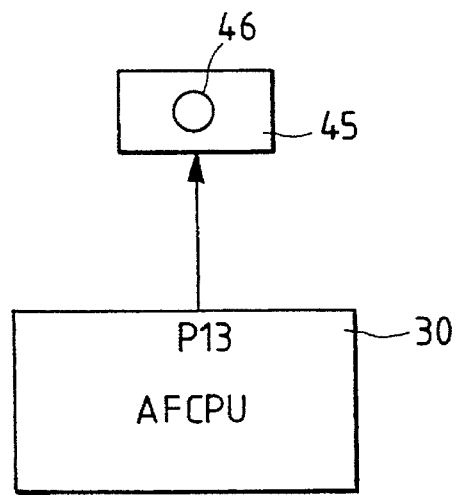

FIG. 30A shows an arrangement of the embodiment when a pursuit display means 45 is provided. In FIG. 30A, the pursuit display means 45 is controlled by a port P13 of the AF CPU 30 shown in FIG. 1. The pursuit display means 45 has a pursuit indicator 46, and the pursuit indicator 46 is activated while the pursuit operation is being performed, thus informing a user that the pursuit operation is being performed.

FIG. 31A shows part of a program of the AF CPU shown in FIG. 7 of this embodiment. Step #605 in FIG. 22 is replaced with step #2010 in FIG. 31A. Therefore, when the pursuit operation is being performed and the lens end is not reached, the indicator 46 of the pursuit display means 45 is activated in step #2010.

Although not shown in the flow chart, when the pursuit operation is not performed or the lens end is reached, the indicator 46 of the pursuit display 45 is inactivated to display that the pursuit operation is not performed.

After step #2010, an AF display by the AF display means 40 can be performed according to the present defocus amount DEF, as shown in FIG. 22 or all the indicators of the AF display means 40 can be inactivated.

Figure 30C:
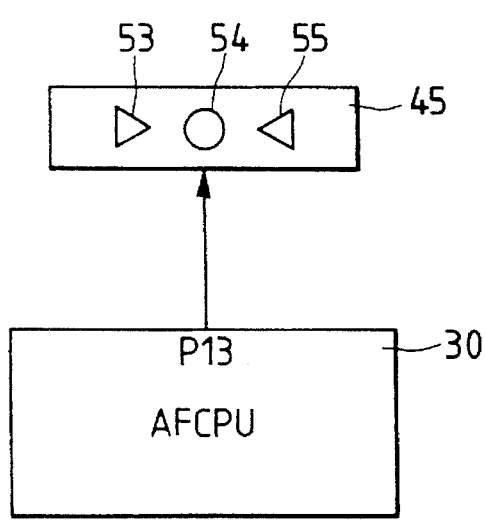
Figure 30B:
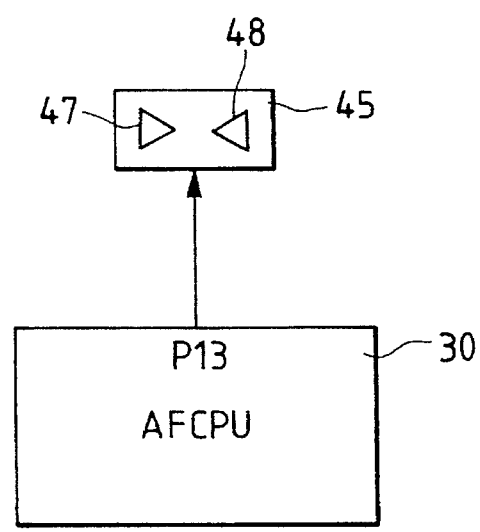

FIG. 30B shows an arrangement of an embodiment wherein the pursuit display means 45 displays that the pursuit operation is being performed, and a moving direction (coming closer or going away) of the object.

In FIG. 30B, the pursuit display means 45 has indicators 47 and 48, and is controlled by the AF CPU 30 through the port P13. When the indicator 47 is activated, this indicates that an object is going away, and when the indicator 48 is activated, this indicates that the object is coming closer. When either the indicator 47 or 48 is activated, this indicates that the pursuit operation is being performed.

FIG. 31B shows part of a program of the AF CPU of this embodiment. Step #605 in FIG. 22 is replaced with steps #2015 to #2025 in FIG. 31B.

When the pursuit operation is being performed and the lens end is not reached, the sign of the pursuit drive amount DRIV is tested in step #2015. If the sign is negative, the indicator 48 of the pursuit display means 45 is activated and the indicator 47 is inactivated to indicate that the pursuit operation is being performed and the object is coming closer in step #2020. If it is determined in step #2015 that the sign is positive, the flow advances to step #2025, and the indicator 47 is activated and the indicator 48 is inactivated to indicate that the pursuit operation is being performed and the object is going away.

Although not shown in the flow chart, in the above embodiment, when the pursuit operation is not performed or when the lens end is reached, both the indicators 47 and 48 of the pursuit display means 45 are turned off to indicate that the pursuit operation is not performed.

Processing after step #2020 or #2025 is the same as that in the above embodiments. In this embodiment, since a user can know a pursuit direction, a pursuit operation in a direction that the user does not intend to perform can be canceled by an operation of another means (e.g., half depression of the release button or a special-purpose button).

In FIG. 30B, the indicators 47 and 48 for indicating the moving directions of an object are represented by triangular indication marks but may be other marks. For example, marks "⦿" and "ⓧ" can be used for the indicators 47 and 48.

FIG. 30C shows an arrangement of an embodiment wherein the pursuit display means 45 displays an AF operation state during the pursuit operation. In FIG. 30C, the pursuit display means 45 has indicators 53, 54, and 55, which are controlled by the port P13 of the AF CPU 30. Active states of the indicators 53, 54, and 55 respectively indicate near-focus, in-focus, and far-focus states in the pursuit state.

FIG. 31C shows part of a program of the AF CPU of this embodiment. Step #605 in FIG. 22 is replaced with steps #2030 to #2085 in FIG. 31C.

When the pursuit operation is being performed and the lens end is not reached, it is tested in step #2030 if the first or subsequent release operation is finished. If NO in step #2030, processing in steps #2035 to #2055 is executed.

Figure 32A:
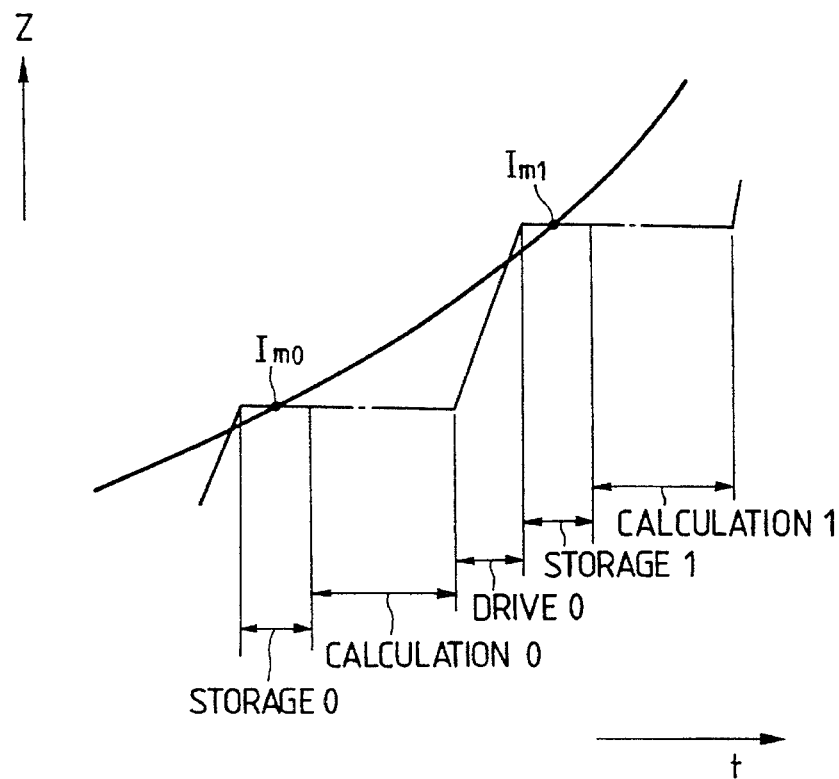
FIGS. 32A and 32B are charts showing paths of a photographing lens with respect to a moving object when a release operation is performed and when it is not performed.

FIG. 32A shows an ideal path (solid curve) and a drive path (alternate long and short dashed curve) of the photographing lens with respect to a moving object when no release operation is performed. The photographing lens is pursuit-driven to have a sequence of storage, calculation and drive operations as one cycle. When the pursuit drive operation of the photographing lens is ideally performed, the solid curve and the alternate long and short dashed line cross at an intermediate point Im of a storage time of the image sensor. In this case, the defocus amount DEF calculated from the storage time during the pursuit operation should be 0. In steps #2035 to #2055, the in-focus, near-focus, and far-focus states are discriminated in accordance with the defocus amount on the basis of the above-mentioned idea.

In step #2035, it is tested if the absolute value of the defocus amount is larger than a predetermined value ZONEF. In general, since a defocus amount calculated during the pursuit operation has poorer accuracy than that calculated in a still state, the predetermined value ZONEF is preferably set to be larger than predetermined values Z1, Z2, Z3, Z4, and Z5 used for AF discrimination shown in FIG. 22 to stabilize display.

If NO in step #2035, the indicator 54 is activated in step #2040 to indicate an in-focus state in the pursuit operation.

If YES in step #2035, the flow advances to step #2045, and the sign of the defocus amount DEF is tested. If the sign is positive, the indicator 53 is activated to indicate a near-focus state in the pursuit operation.

If it is determined in step #2045 that the sign is negative, the indicator 55 is activated to indicate a far-focus state in the pursuit operation.

On the other hand, if it is determined in step #2030 that the first or subsequent release operation is finished, processing in steps #2060 to #2085 is executed.

Figure 32B:
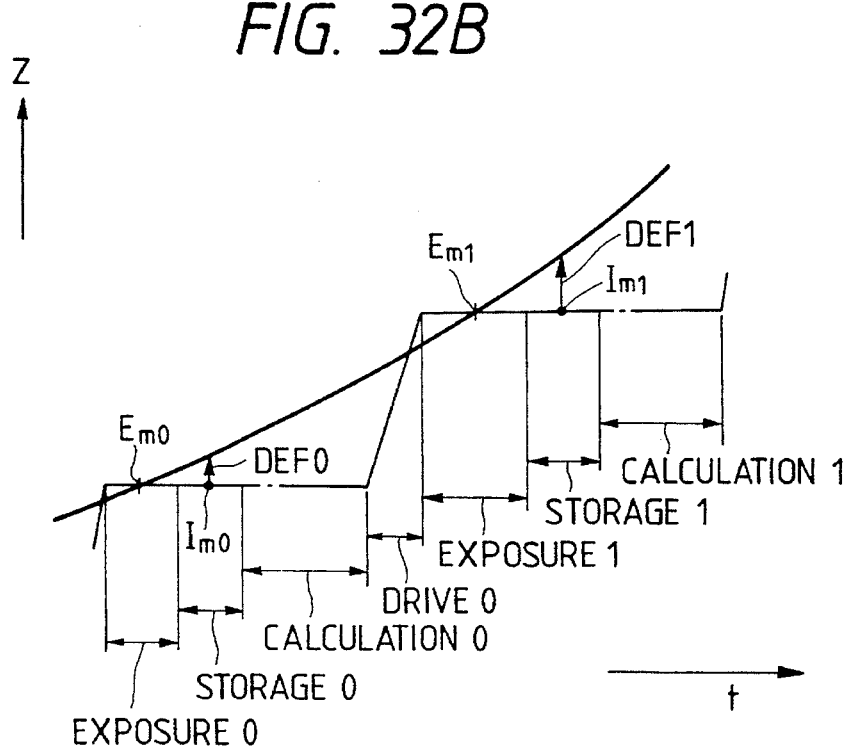

FIG. 32B shows an ideal path (solid curve) and a drive path (alternate long and short dashed curve) of the photographing lens with respect to a moving object when a release operation is performed. The photographing lens is pursuit-driven to have a sequence of storage, calculation and drive operations as one cycle. When the pursuit drive operation of the photographing lens is ideally performed, the solid curve and the alternate long and short dashed line cross at an intermediate point of an exposure (exposure). In this case, a defocus amount calculated from the storage time during the pursuit operation, i.e., an amount corresponding to a difference between the solid curve and an alternate long and short dashed curve at an intermediate point Im of the storage time in FIG. 32B does not become 0, and ideally becomes a moving amount HX of the photographing lens along the ideal path (solid curve) during a time interval between an intermediate point Em of the exposure and the intermediate point Im of the storage time.

If an actual moving amount of the photographing lens between the intermediate point (e.g., Im1) of the present storage time and an intermediate point (e.g., Im0) of the immediately preceding storage time is represented by DLST (corresponding to the immediately preceding drive amount), a time interval between the intermediate point (Im1) of the present storage time and the intermediate point (Im0) of the immediately preceding storage time is represented by TE, and a time interval between the intermediate point (Im1) of the present storage time and an intermediate point (Em1) of the present exposure is represented by TD, the amount HX is given by:

$$HX = DLST \times TD/TE \tag{14}$$

The amount DLST can be obtained by storing the immediately preceding drive amount, and the time intervals TD and TE can be obtained by measuring a time by a timer or the like incorporated in the AF CPU.

Therefore, in steps #2060 to #2085, in-focus, near-focus, and far-focus states are discriminated in accordance with a value obtained by subtracting the predetermined value HX from the defocus amount on the basis of the above-mentioned concept.

In step #2060, the amount HX is calculated according to equation (14). In step #2065, it is tested if the absolute value of a value obtained by subtracting the amount HX from the present defocus amount is larger than a predetermined value ZONER. The predetermined value ZONER is set to be equal to or slightly larger than the predetermined value ZONEF.

If NO in step #2065, the flow advances to step #2070, and the indicator 54 is activated to indicate an in-focus state in the pursuit operation.

If YES in step #2065, the sign of the value obtained by subtracting the amount HX from the defocus amount is tested. If the sign is positive, the indicator 53 is activated in step #2080 to indicate a near-focus state in the pursuit operation.

If it is determined in step #2075 that the sign is negative, the flow advances to step #2085, and the indicator 55 is activated to indicate a far-focus state in the pursuit operation. Processing after step #2040, #2050, #2055, #2070, #2080, or #2085 is the same as that in the above embodiments. In this case, all the indicators of the AF display means 40 are preferably kept off.

Although not shown in the flow chart, in the above embodiment, when the pursuit operation is not performed or the lens end is reached, all the indicators 53, 54, and 55 of the pursuit display means 45 are turned off to indicate that no pursuit operation is performed.

In the above embodiments, in-focus discrimination is performed upon comparison with the predetermined value ZONEF or ZONER in step #2035 or #2065. In general, as shown in FIG. 21, an ideal lens speed is decreased for an object which is going away at a constant speed as the time elapses, and ideal lens speed is increased for an object which is coming closer at a constant speed as the time elapses. Thus, when an in-focus discrimination zone of the sign "−" (near-focus state; object is coming closer) is set to be larger than that of the sign "+" (far-focus; object is going away), a display can be more stabilized.

In this embodiment, a user can confirm whether or not a pursuit operation is being performed, and can know an AF state in the pursuit operation. Therefore, he or she need only perform a release operation according to the AF state. For example, when the in-focus state is obtained during the pursuit operation, he can perform the release operation.

In the above embodiments, the pursuit display means 45 is provided in addition to the AF display means 40. If information indicating whether or not the pursuit operation is being performed is unnecessary, the AF display means 40 can also serve as the pursuit display means 45.

In this case, since the AF state display can be performed in the same manner as in a normal state (wherein no pursuit operation is performed), a user does not feel uneasy, and a display during the pursuit operation can be stabilized.

Note that in expression of the indicators in FIGS. 22, 31A, 31B, and 31C, a solid line indicates an active state, and a broken line indicates an inactive state.

In the embodiments shown in FIGS. 30A, 30B, and 30C and FIGS. 31A, 31B, and 31C, the display means 45 displays whether or not the pursuit operation is being performed. However, the present invention is not limited to this. For example, a user can know the pursuit operation by a sound or the like.

Not only a display indicating that the pursuit operation is being performed is performed but also Automatic control of particular operation means of the camera can be performed when the pursuit operation is being performed and displayed. For example, when the pursuit operation is being performed, a high shutter speed, a smaller aperture, or the like can be automatically set.

As described above, according to the third embodiment of the present invention, since the presence/absence of movement of an object is displayed, a user can recognize the movement of the object, and can take a corresponding reaction for the moving object. In addition, a conventional problem caused when only an AF state of a photographing lens is displayed for a moving object and a user cannot distinguish a still object from a moving object, e.g., an out-of-focus photograph caused by misjudgement of accuracy, can be prevented.

If a member for displaying an AF state of the photographing lens is also used as a member for displaying a moving state of an object, cost is not increased, and user confusion can be avoided.

The principle of a fourth embodiment of the present invention will now be described.

Figure 33:
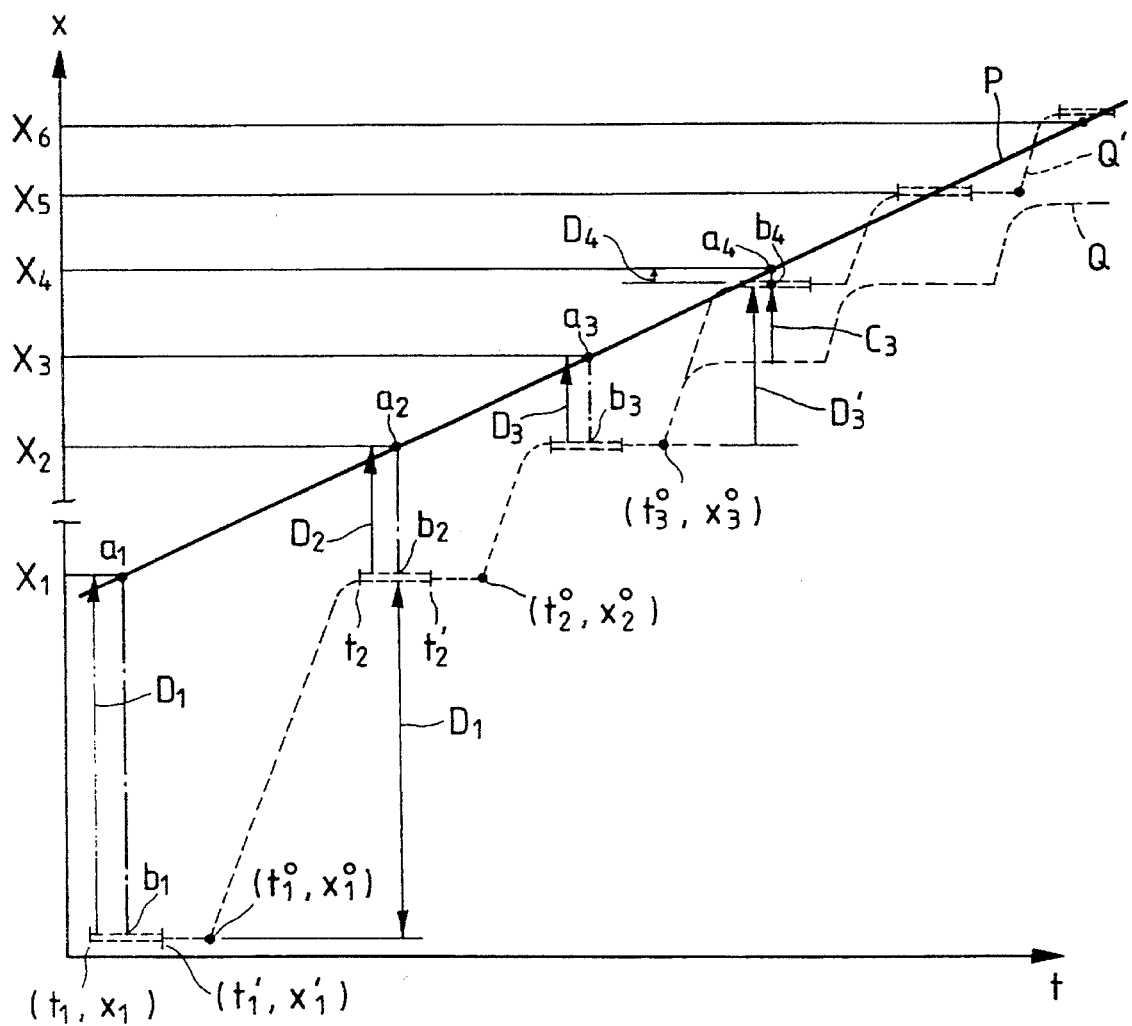
FIG. 33 is a chart for explaining the principle of a fourth embodiment of the present invention.

FIG. 33 shows a pursuit state, and illustrates a path (solid curve P) of an image forming surface of a moving object and a path (dotted curve Q) of a predetermined image forming surface conjugate with a film surface. In FIG. 33, a time t is plotted along the abscissa, and a distance between the image forming surface and a virtual single lens along an optical axis is plotted along the ordinate. In FIG. 33, coordinates $(t_n, x_n)$ represent charge storage start time $t_n$ and a position $x_n$ of the predetermined image forming surface at that time, coordinates $(t_n', x_n')$ represent charge end time $t_n'$ and a position $x_n'$ of the predetermined image forming surface at that time, and coordinates $(t_n^0, x_n^0)$ represent AF calculation end time $t_n^0$ and a position $x_n^0$ of the predetermined image forming surface at that time. The curve Q represents a drive state without a pursuit operation, and follows the path P of an object image. A curve Q' represents a pursuit drive state. The pursuit operation is performed along the path P, and an approximate in-focus state is always maintained. A difference between Q' and Q corresponds to a pursuit correction amount $C_n$ calculated by a correction section 100.

During the storage/calculation time interval ($t_1$ to $t_1^0$), the lens is not moved, $x_1=x_1'=x_1^0$. An out-of-focus amount $D_1$ at time $(t_1+t_1')/2$ becomes a difference $(X_1-x_1^0)$ in distance between points $a_1$ and $b_1$, and a defocus amount calculated by an AF section 101 at the calculation end time $t_1^0$ is equal to this value $D_1$ if there is no detection error. Thereafter, an nth defocus amount calculated by the AF section 101 is represented by $D_n$ hereinafter.

A drive operation is performed until the image surface moving amount becomes equal to the defocus amount $D_1$ while counting feedback pulses using the defocus amount $D_1$ calculated at the time $t_1^0$. As described above, an image surface moving amount a $\Delta$Bf per unit moving amount of the photographing lens varies depending on photographing lenses, and a feedback pulse count $\Delta$n giving a lens moving amount also tends to vary depending on photographing lenses. A conversion coefficient $K_B$ for converting the image surface moving amount $\Delta$Bf into the feedback pulse count $\Delta$n according to the relationship $\Delta n = K_B \times \Delta Bf$ is stored, and actual drive control is performed using this coefficient.

The storage operation is restarted at time $t_2$ at which the lens drive operation is almost converged. A second defocus amount $D_2$ is calculated at time $t_2^0$ and is equal to a value $(X_2-x_2^0)$ corresponding to a difference between points $a_2$ and $b_2$ as an out-of-focus amount at an intermediate point of the storage time ($t_2$ to $t_2'$) if there is no error. If an object stands still and a detection error is sufficiently small, the defocus amount $D_2$ becomes much smaller than the amount $D_1$. In principle, the presence/absence of movement of an object can be discriminated on the basis of the ratio of these values.

When an image surface is moved at a constant speed, in a follow-up state without pursuit correction drive operation, each calculated defocus amount $D_n$ is never converged to zero and becomes an almost constant value, thus yielding $D_n/D_{n-1} \approx 1$. If this value is monitored, the presence/absence of movement of an object can be discriminated. However, when a photographing lens is driven by an additional correction drive operation in addition to a drive operation on the basis of a normal defocus amount like a characteristic curve Q' in FIG. 9, it is difficult to discriminate the presence/absence of movement of an object using the calculated defocus amounts $D_n$ and $D_{n-1}$.

An amount $P_n$ given by equation (15) is calculated as a pursuit defocus amount, and is used as a reference value.

$$P_n = D_n + \text{(immediately preceding drive amount)} - D_{n-1} \quad (15)$$

Equation (15) is one at time $t_n^0$ at which an nth defocus amount $D_n$ is calculated. In equation (15), $D_n$ is the presently calculated defocus amount, and $D_{n-1}$ is the immediately preceding defocus amount, i.e., the previous defocus amount. The (immediately preceding drive amount) is the value X(n-1) actually driven by the drive operation of the photographing lens between times $t^0_{n-1}$ to $t_n$ or a calculated value $D_{n-1}'$ as a reference value for driving the lens by the amount X(n-1). Of course, if there is no error, these values are equal to each other ($D_n'=X(n)$).

If the correction amount for the pursuit operation is represented by $C_n$, the drive amount $D_n'$ is given by:

$$D_n' = D_n + C_n \quad (16)$$

Using this equation, equation (15) can be rewritten as:

$$P_n = D_n + C_{n-1} \quad (15)$$

As can been seen from FIG. 33 according to the definition of equation (15), if $n \geq 3$, the pursuit defocus amount $P_n$ is a difference in distance between points $a_n$ and $a_{n-1}$ (e.g., $P_4=D_4+C_3$), i.e., a drive amount of an object image.

Whether or not an object is moving is discriminated by comparing $P_n/P_{n-1}$ and a predetermined constant (threshold value) k. In consideration of the influence of various errors, a practical range of the constant k is:

$$0.3 \leq k \leq 0.8$$

An optimal range is $0.4 \leq k \leq 0.6$. When $P_n/P_{n-1} \geq k$, it is determined that the object is moving. An image surface moving amount corresponding to movement of an object in one cycle at this time is given by almost $P_n$.

The pursuit correction amount $C_n$ for a pursuit operation is calculated. More specifically, when an object movement discrimination section 100b determines that an object is moving, $$C_n = P_n$$

When it determines that an object is not moved, $$C_n = 0$$

However, with this apperatus, an acceleration of movement of an image surface is not taken into consideration. For example, even when an object is coming closer at a constant speed, a moving speed of an image surface is abruptly increased in a small focal length lens as an object is coming closer, and a pursuit operation tends to be delayed. When an object is going away, the moving speed of the image surface is abruptly decreased, and a pursuit operation tends to overrun.

In the fourth embodiment of the present invention, when a moving object is pursued, a drive amount of the photographing lens is corrected taking an acceleration component of movement of an image surface into consideration.

As described above, the pursuit defocus amount $P_n$ corresponds to an image surface moving amount corresponding to object movement in one cycle of the sequential lens drive processing. Therefore, assuming that the image surface moving speed is almost constant, pursuit defocus amounts $P_n$ in respective cycles are almost equal to each other. Therefore, the pursuit defocus amount $P_n$ can be directly used as the pursuit correction amount $C_n$ as an estimated value of image surface movement and used in the next lens drive operation. This technique is a lens drive technique described in the prior art. However, if the image surface moving speed is not constant, the estimated value $P_n$ used in the immediately preceding lens drive operation cannot be directly used in a next lens drive operation. More specifically, when an image surface is accelerated, a value larger than the estimated value $P_n$ used in the immediately preceding cycle must be used. On the other hand, if the image surface is decelerated, a value smaller than the estimated value $P_n$ used in the immediately preceding cycle must be used.

In this embodiment, information associated with an acceleration of the image surface is calculated from two, i.e., new and old pursuit defocus amounts (estimated values) $P_n$ and $P_{n-1}$, and the latest pursuit defocus amount $P_n$ is corrected according to the calculated acceleration, thereby calculating the pursuit correction amount $C_n$ used in the next lens drive operation.

An image surface moving amount upon movement of an object is estimated on the basis of the present defocus amount $D_n$, present and previous pursuit defocus amounts $P_n$ and $P_{n-1}$, and the previous pursuit correction amount $C_{n-1}$ taking an image surface acceleration into consideration, thus calculating a new pursuit correction amount $C_n$. More specifically, the present pursuit defocus amount $P_n$ is calculated by:

$$P_n = D_n + C_{n-1} \tag{17}$$

A parameter $\beta$ representing an image surface acceleration (to be referred to as an image surface acceleration parameter hereinafter) is calculated by:

$$\beta = \frac{P_n}{P_{n-1}} \tag{18}$$

A new pursuit correction amount $C_n$ is calculated by:

$$C_n = \alpha \cdot P_n \tag{19}$$

In this embodiment, $\alpha = \beta$.

For this purpose, the pursuit defocus amount $P_n$ is calculated on the basis of equation (17), and it is checked if $|P_n| > k \times |P_{n-1}|$, thereby discriminating the presence/absence of movement of an object. Then, the image surface acceleration parameter $\beta$ is calculated on the basis of equation (18), and a correction term $\alpha$ is calculated from the acceleration parameter $\beta$. On the basis of equation (19), the pursuit correction amount $C_n$ is calculated.

Figure 34:
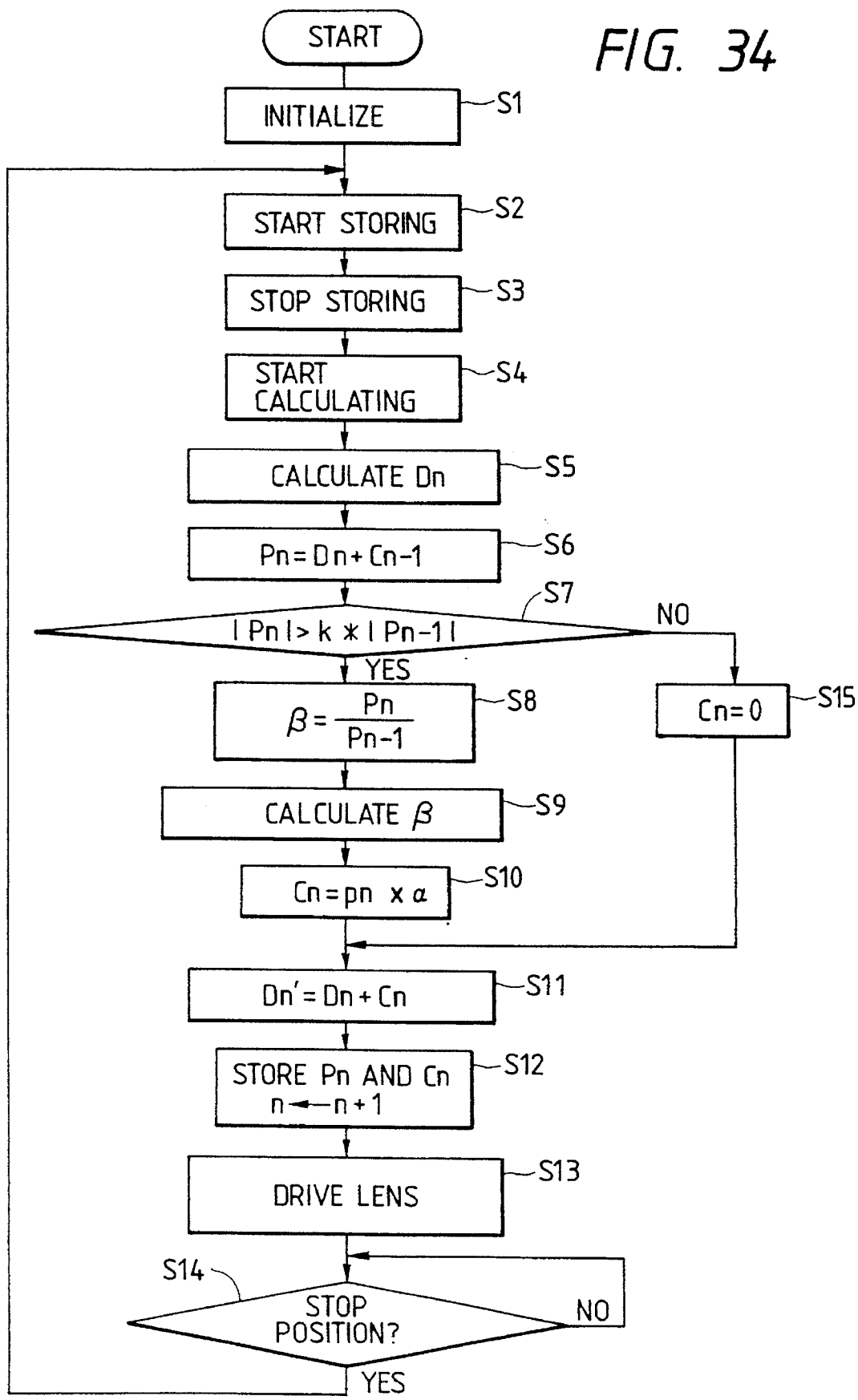
FIG. 34 is a flow chart showing the operation of the fourth embodiment.

The drive sequence of the photographing lens according to this embodiment will be described below with reference to FIG. 34.

Initialization is performed in step S1. A storage operation is started in step S2, and is ended in step S3. An AF calculation is started in step S4, and is ended in step S5, thus calculating the defocus amount $D_n$. When the AF section 101 outputs the defocus amount $D_n$, the lens drive operation is normally performed on the basis of this data. However, in this embodiment, the defocus amount $D_n$ undergoes processing for a pursuit drive operation.

In step S6, a pursuit defocus amount $P_n$ is calculated on the basis of equation (17). If $|P_n| > k \times |P_{n-1}|$ in step S7, it is determined that an object is moving. If it is determined in step S7 that the object is moving, the flow advances to step S8. In step S8, the image surface acceleration $\beta$ is calculated on the basis of equation (18). In step S9, the correction term $\alpha$ is calculated from the image surface acceleration $\beta$. In this embodiment, $\beta$ is directly used as $\beta$. In step S10, the pursuit correction amount $C_n$ is calculated on the basis of equation (19). If it is determined in step S7 that the object is not moved, 0 is substituted in C in step S15.

A drive amount $D_n'$ ($D_n + C_n$) is calculated in step S11, and values $P_n$ and $C_n$ necessary for the next calculation are stored in step S12. In step S13, a lens drive operation is started. Drive control is performed using the correspondence between the value $D_n'$ and the feedback pulse count in association with the stored conversion coefficient $K_B$. In step S11, the drive amount $D_n'$ is calculated as ($D_n + C_n$) to perform a lens drive operation. However, the present invention is not limited to this. For example, $C_n$ may be diffused and may be added to $D_n$ in one drive control cycle, so that a lens drive operation is continuously performed during the storage operation and AF calculation. If it is determined in step S14 that a drive stop condition is satisfied, the lens drive operation is stopped. The flow then returns to step S2, and the storage operation is restarted.

A path Q' of the AF surface (film conjugate surface) by the lens drive operation on the basis of the above processing sequence and a path P of the image surface will be described in detail below with reference to FIG. 35.

Figure 35:
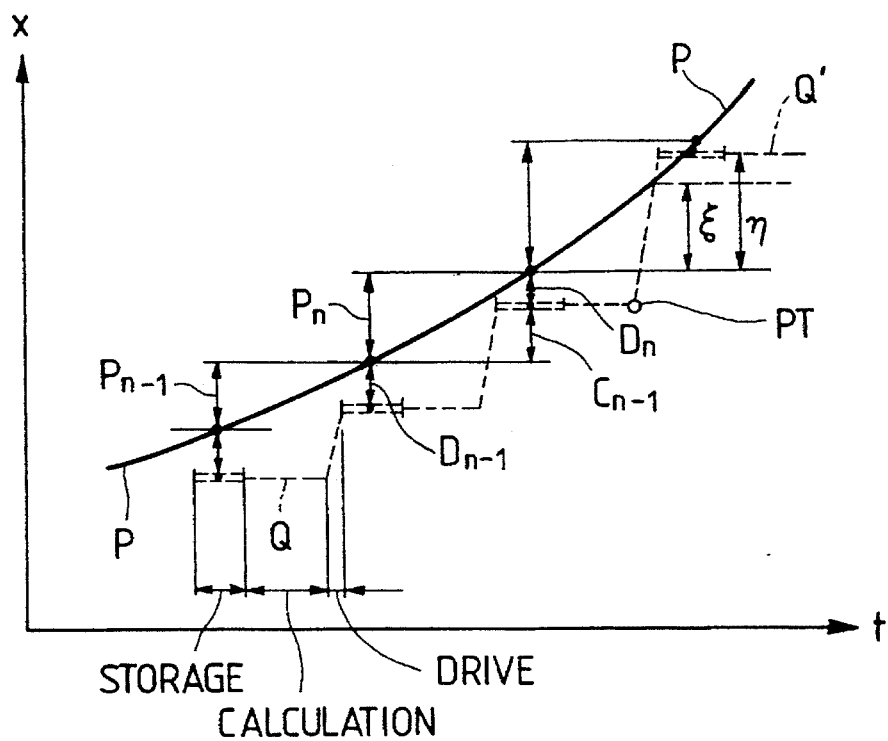
FIG. 35 is a graph showing a path of an image surface of an object and a path of an estimated focusing surface.

In FIG. 35, the image surface path represented by the solid curve P indicates a case wherein the image surface is accelerated, and the path of the AF surface following the image surface is represented by a broken curve Q'. The lens drive processing consists of a cycle of the charge storage operation to a CCD image sensor, a calculation of the defocus amount $D_n$ and the pursuit correction amount $C_n$, and the lens drive operation, and a difference between an image surface at an intermediate point of the storage time and the AF surface is subjected to the AF operation. If a circle PT is present time, the latest (present) defocus amount $D_n$ is known. An image surface moving amount in an immediately preceding cycle, i.e., the pursuit defocus amount $P_n$ can be calculated using equation (17) on the basis of $D_n$ and the pursuit correction amount $C_{n-1}$ used in the immediately preceding lens drive operation. Note that equation (17)' may be used in place of equation (17).

$P_n = D_n +$ (moving amount of AF surface upon lens drive operation between intermediate point of storage operation upon calculation of $D_{n-1}$ and intermediate point of storage operation upon calculation of $D_n) - D_{n-1}$ (17)'

The acceleration parameter $\beta$ is calculated from the pursuit defocus amount $P_{n-1}$ similarly calculated in the immediately preceding lens drive operation and the presently calculated pursuit defocus amount $P_n$. If the acceleration parameter $\beta$ is not taken into consideration in the next lens drive operation, the pursuit correction amount $C_n$ is equal to $P_n$, and becomes a value indicated by $\Xi$ in FIG. 35. For this reason, a pursuit operation cannot be satisfactorily performed, and a difference between the image surface and the AF surface upon exposure is large. When the acceleration parameter $\beta$ is taken into consideration in the next lens drive operation as in this embodiment, as described above, the pursuit correction amount $C_n$ is given by $\alpha \times P_n$, and becomes a value indicated by $\eta$ in FIG. 35. As a result, the difference between the image surface and the AF surface upon exposure is decreased, and a high-accuracy pursuit operation can be performed.

Figure 36:
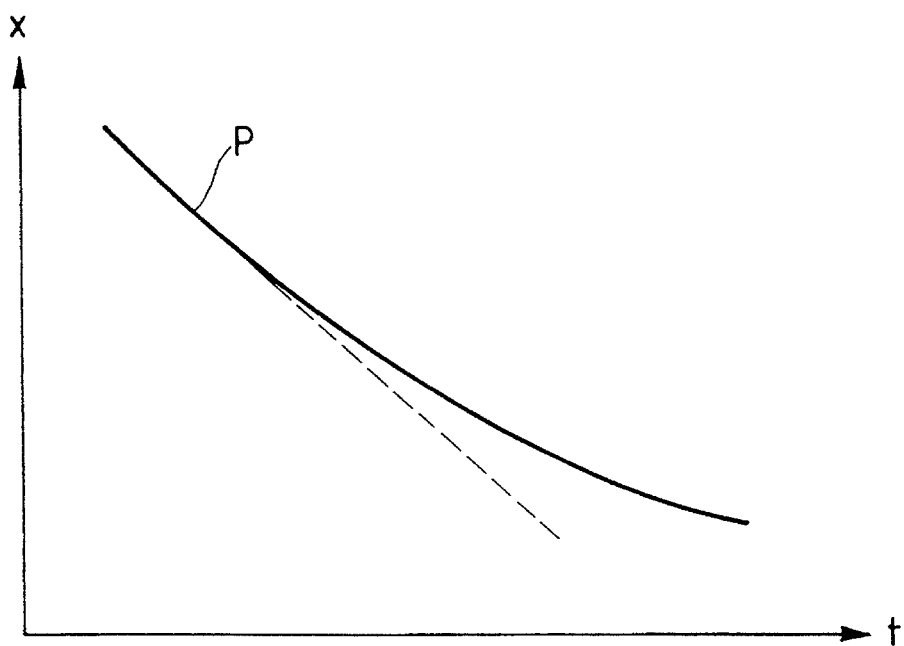
FIG. 36 is a graph showing an image surface path when an object is moving away.

FIG. 35 shows characteristic curves when an object is coming closer to the camera at a constant speed. As shown in FIG. 36, when an object is going away from the camera at a constant speed, the image surface speed is decreased as the time elapses. In this case, pursuit accuracy can be improved as in FIG. 35.

The acceleration parameter $\beta$ calculated from $P_n$ and $P_{n-1}$ is directly used as $\alpha$. However, when $\beta$ is considerably large, such an acceleration parameter calculation must not be performed, and may be a detection error. For example, if $\beta \gg 1.5$, $\alpha = 1.5$; when $1.5 > \beta > 0.5$, $\alpha = \beta$; and when $\beta < 0.5$, $\alpha = 0.5$. Note that the upper limit value of $\alpha$ is preferably about 1.3 to 2.

Alternatively, $\alpha$ can be obtained with reference to the following table in correspondence with $\beta$.

| $\beta$ | 1.5 or more | 1.5–1.4 | ... | 1.1–0.9 | ... | 0.8 or less |
|---|---|---|---|---|---|---|
| $\alpha$ | 1.3 | 1.2 | ... | 0.8 | ... | 0.5 |

According to such a correspondence, since the value $\alpha$ becomes smaller than the value $\beta$, an overrun tendency can be suppressed.

In the above embodiment, the image surface acceleration parameter $\beta$ is calculated from the ratio of the new and old pursuit defocus amounts $P_n$ and $P_{n-1}$. However, $$\gamma = P_n - P_{n-1}$$

may be calculated, and the correction term $\alpha$ may be calculated from this image acceleration parameter $\gamma$. In this case, $\gamma$ and $\alpha$ have the following correspondence.

(1) When $\alpha = \gamma$, or (2) when $|\gamma|$ is equal to or larger than a predetermined value, $\alpha$=predetermined value$\times\gamma/|\gamma|$.

Otherwise, $\alpha=\gamma$ may be set. In this case, since $\gamma$ is limited, an operation can be stabilized.

(3) $\alpha$ can be calculated by $\alpha=\gamma\times q$ (where q falls within the range of 0.5 to 1). In this case, an overrun tendency can be suppressed.

Figure 37:
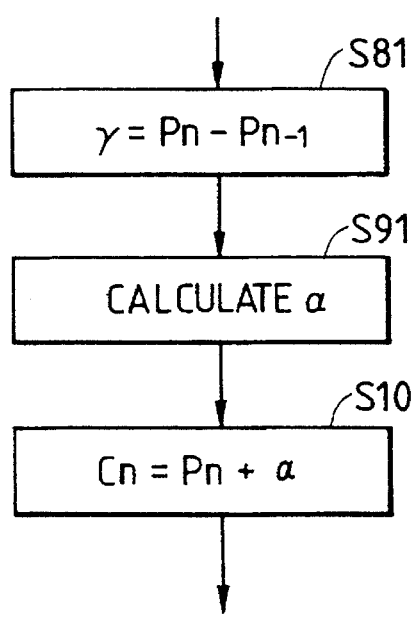
FIGS. 37 and 38 are flow charts showing a modification of the fourth embodiment for calculating an acceleration component.

FIG. 37 shows the sequence of this case. When the correction term $\alpha$ is used, the pursuit correction amount $C_n$ is calculated from $P_n+\alpha$, as in step S10' in FIG. 37.

Figure 38:
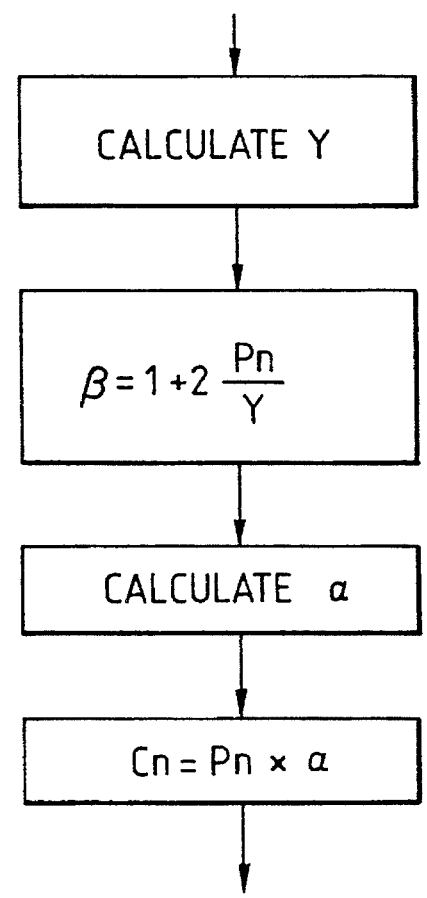

Another embodiment for calculating the correction term $\alpha$ will be described below with reference to FIG. 38. In this embodiment, the correction term $\alpha$ of the image surface acceleration is calculated on the basis of a separation Y of the object from infinity.

The separation Y from infinity means a value Y in a so-called Newton's formula defining the following relation:

$$A \times Y = f \times f$$

where A is the distance between an object-side focal point and an object, Y is the distance between an image-side focal point and an image surface, and f is the focal length. The separation Y can be calculated on the basis of an extension amount from infinity of a lens. When a photographing lens to be used is not a whole-group extension type, the moving amount of the lens does not directly correspond to Y. In this case, the relationship between the lenses and Y can be stored as equations or tables, thus allowing calculation of Y.

More specifically, the, separation Y can be calculated by the following methods.

(1) When a photographing lens comprises a distance encoder, an object distance A or magnification M is read from the output of the encoder, and at the same time, the focal length f is read from a lens ROM of the photographing lens. On the basis of these values, the separation Y is calculated:

Y=f$\times$f/A or

Y=f/M.

(2) When a photographing lens does not comprise the distance encoder, an accumulation value of a pulse count after the lens abuts against an infinity end is counted. This count value corresponds to the position of a distance ring. Thus, the separation Y is calculated on the basis of the accumulated value and the conversion coefficient $K_B$ read from lens information to convert the pulse count into a defocus amount.

When an object is moved at a constant speed, the image surface acceleration parameter $\beta$ can be calculated by:

$$\beta = 1 + 2 \times P_n/Y.$$

The pursuit correction amount $C_n$ is calculated using the image surface acceleration parameter $\beta$ in the same manner as described above, thus calculating the lens drive amount $D_n'$.

In the above description, a cycle of a storage operation of the CCD image sensor, which is started upon half depression of the release button, a calculation of a lens drive amount, and a lens drive operation is constant. A case will be described wherein the mirror-up operation is included in the cycle upon full-depression of the release button. When a mirror-up operation is permitted in response to full-depression of the release button, an actual mirror-up operation is performed after the lens drive operation or after the lapse of a predetermined period of time from the beginning of the lens drive operation.

FIG. 39 is a diagram showing a case wherein the half-depression state of the release button changes to the full-depression state. In FIG. 39, P is the path of the image forming surface, and Q' is the path of the AF surface as in FIG. 35.

In FIG. 39, before full depression, the storage, calculation, and the drive operations are performed in a period $F_0$. After full depression, various exposures including the mirror-up operation are performed between the storage/calculation operation and the drive operation. The image forming surface and the AF surface preferably coincide at the intermediate point (indicated by E in FIG. 39, and corresponding to a central timing during exposure time) of exposure during the exposure. The full-depression operation is detected, and the lens drive amount immediately before the mirror-up operation is increased as compared to that in the half-depression state. In the continuous photographing mode, a plurality of mirror-up operations are performed in response to the full-depression operation. In this case, since the period of one cycle upon the first mirror-up operation is different from that of a cycle upon a second or subsequent mirror-up operation, an identification section for identifying the present exposure state is provided, and its identification result PCOUNT is set to be 0 in a full-depression state; 1 in a first mirror-up state; 2, in a second mirror-up state; and 3, in a third mirror-up state.

A correction method of a lens drive amount upon variation in cycle when the image surface moving speed is constant will be described below.

The pursuit correction amount $C_n$ before full-depression is given by:

$$C_n = P_n \times \alpha \qquad (19)$$

for $\alpha=1$

Before full-depression, an in-focus state is obtained at every intermediate point of the storage operation. Therefore, a cycle time $F_0$ between adjacent storage operations is constant, and $\alpha=F_0/F_0=1$. However, after full-depression, an instant of an optimal in-focus state must correspond to an intermediate point of exposure. For this purpose, the correction term $\alpha$ is calculated as:

$\alpha$=(time from storage operation immediately before mirror-up to intermediate point of present exposure)/(time between adjacent storage operations immediately before mirror-up) (20)

Therefore, in the mirror-up operation after full-depression, i.e., when PCOUNT=1, $\alpha$ is calculated by:

$$\alpha = \frac{F_1'}{F_0}.$$

After the second mirror-up operation, i. e., when PCOUNT=2, $\alpha$ is calculated by:

$$\alpha = \frac{F_2'}{F_1}.$$

Furthermore, after the third mirror-up operation, i. e., when PCOUNT=3, $\alpha$ is calculated by:

$$\alpha = \frac{F_3'}{F_2}.$$

In this manner, the correction term $\alpha$ is calculated using equation (2) to calculate the pursuit correction amount $C_n$. Thus, high-accuracy pursuit operation can be performed while compensating for a variation in cycle time. Therefore, a more accurate pursuit operation can be performed taking a compensation upon variation in cycle time and correction using an image surface acceleration into consideration.

The pursuit correction amount is calculated as follows.

The correction term α corresponding to the identification result PCOUNT is obtained as in the table below, and the pursuit correction amount $C_n$ can be calculated from equation (19).

| P count = 0 | $\alpha = \beta$ |
|---|---|
| = 1 | $\alpha = F_1' \times \beta/F_0$ |
| = 2 | $\alpha = F_2' \times \beta/F_1$ |
| = 3 | $\alpha = F_3' \times \beta/F_2$ |

$F_1'/F_0$, $F_2'/F_1$, and $F_3'/F_2$, can be obtained by measuring a time from the storage operation to the beginning of the lens drive operation, and adding it to a time from the mirror-up to the intermediate point to exposure (by calculation). Alternatively, typical values can be prestored as numerical values, and used.

In the above description, the lens drive operation is intermittently performed together with the pursuit correction amount. The lens may be continuously driven to achieve the pursuit correction amount in the entire cycle.

What is claimed is:

1. A camera comprising:

focusing means for repetitively detecting a defocus amount of a photographing lens;

means for calculating a change in defocus amount caused by movement of an object on the basis of previous and present defocus amounts;

correcting means for correcting said defocus amount of the lens on the basis of the calculated change;

driving means having a normal mode and a pursuit mode, said driving means driving said photographing lens on the basis of an un-corrected defocus amount in said normal mode, and driving said photographing lens on the basis of a corrected defocus amount in said pursuit mode;

lens drive selecting means having a one shot mode and a continuous mode, said selecting means inhibiting the driving operation of said driving means after an in-focus state of said photographing lens in said one-shot mode, and permitting the driving operation of said driving means throughout a given period in said continuous mode; and continuous exposure means for performing an exposure operation repetitively at a first selected rate or a second selected rate lower than the first selected rate, wherein said driving means performs a driving operation in said pursuit mode when said continuous mode is selected and said continuous exposure means performs exposure operations at said second selected rate but not when said continuous exposure means performs exposure operations at said first selected rate.

2. A camera comprising:

a focusing device for repetitively detecting a defocus amount of a photographing lens;

a device for calculating a change in defocus amount caused by movement of an object on the basis of previous and present defocus amounts;

a correcting device for correcting said defocus amount of the lens on the basis of the calculated change;

a driving device having a normal mode and a pursuit mode, said driving device driving said photographing lens on the basis of an un-corrected defocus amount in said normal mode, and driving said photographing lens on the basis of a corrected defocus amount in said pursuit mode;

a lens drive selecting device having a one shot mode and a continuous mode, said selecting device inhibiting the driving operation of said driving device after an in-focus state of said photographing lens in said one-shot mode, and permitting the driving operation of said driving device throughout a given period in said continuous mode; and a continuous exposure device for performing an exposure operation repetitively at a first selected rate or a second selected rate lower than the first selected rate, wherein said driving device performs a driving operation in said pursuit mode when said continuous mode is selected and said continuous exposure device performs exposure operations at said second selected rate but not when said continuous exposure device performs exposure operations at said first selected rate.

3. An automatic focus adjustment apparatus comprising:

a focus detection circuit for repetitively detecting a focus adjustment state of an object image formed by an optical system, and for sequentially generating focus detection signals in accordance with the detected focus adjustment state;

a judgement circuit for judging whether an object is moving or not, on the basis of a plurality of the focus detection signals sequentially generated;

a mode setting circuit for setting a stationary mode in which a focus adjustment operation adapted to a still object is performed or a pursuit mode in which a focus adjustment operation adapted to a moving object is performed; and a drive circuit for driving the optical system on the basis of the focus detection signals when the mode setting circuit sets the stationary mode, and when the mode setting circuit sets the pursuit mode, for driving the optical system to pursue the moving object on the basis of the focus detection signals if the judgement circuit judges that the object is moving, but for driving the optical system on the basis of the focus detection signals if the judgement circuit judges that the object is still.

4. An automatic focus adjustment apparatus according to claim 3, wherein the mode setting circuit has a selector for switching between an S-AF mode for inhibiting a drive of the optical system after focusing once and a C-AF mode for continuously driving the optical system on the basis of the focus detection signals, said pursuit mode being set on the basis of the mode switch of the selector.

5. An automatic focus adjustment apparatus according to claim 4, wherein the mode setting circuit sets the pursuit mode on the basis of the mode switch of the selector to the C-AF mode.

6. An automatic focus adjustment apparatus according to claim 3, wherein said apparatus is used for a camera having a winding circuit for winding a film in intervals of photographs sequentially performed, said winding circuit having a high-speed winding mode and a normal winding mode, said pursuit mode being set in accordance with the winding mode set by the winding circuit.

7. An automatic focus adjustment apparatus according to claim 6, wherein the mode setting circuit sets the stationary mode when the high-speed winding mode is set by the winding circuit, and sets the pursuit mode when the normal winding mode is set.

8. An automatic focus adjustment apparatus according to claim 3, wherein said apparatus is used for a camera having a photographing mode selector for switching between a single shot mode for performing a single photograph and a sequential shot mode for sequentially performing a plurality of photographs, said pursuit mode being set in accordance with the switching of the photographing mode selector.

9. An automatic focus adjustment apparatus according to claim 8, wherein the mode setting circuit sets the stationary mode when the single shot mode is set by the photographing mode selector, and sets the pursuit mode when the sequential shot mode is set.

10. An automatic focus adjustment apparatus according to claim 3, wherein said apparatus is used for a camera having a winding circuit for winding a film in intervals of photographs sequentially performed, said winding circuit having a high-speed winding mode and a normal winding mode, and wherein the mode setting circuit has a selector for switching between an S-AF mode for inhibiting a drive of an optical system after focusing once and a C-AF mode for continuously driving the optical system on the basis of the focus detection signals, said pursuit mode being set on the basis of a combination of operations of the winding circuit and the selector.

11. An automatic focus adjustment apparatus according to claim 10, wherein the mode setting circuit sets the pursuit mode when the winding circuit sets the normal winding mode and the selector sets the C-AF mode.

12. An automatic focus adjustment apparatus according to claim 3, further comprising, a focusing range setting circuit for setting a focusing range including a focusing point, and a drive control circuit for inhibiting a drive of the driving circuit when the focus detection signal is within the focusing range, said focusing range setting circuit setting the focusing range on the pursuit mode set by the mode setting circuit so as to be narrower than that on the stationary mode set.

13. An automatic focus adjustment apparatus comprising:

a focus detection circuit for repetitively detecting a focus adjustment state of an object image formed by an optical system, and for sequentially generating focus detection signals in accordance with the detected focus adjustment state;

a pursuit drive circuit for driving the optical system so as to pursue movement of an object, on the basis of a plurality of the focus detection signals sequentially generated; and an inhibiting circuit having an external operation member, for forcibly inhibiting an operation of the pursuit drive circuit in response to the operation of the external operation member.

14. An automatic focus adjustment apparatus comprising:

a focus detection circuit for repetitively detecting a focus adjustment state of an object image formed by an optical system, and for sequentially generating focus detection signals in accordance with the detected focus adjustment state;

a judgement circuit for judging whether an object is moving or not, on the basis of a plurality of the focus detection signals sequentially generated;

an indicating circuit for indicating whether the object is moving or not;

a selecting circuit for selecting a manual mode in which a focus adjustment of the optical system is manually performed or an automatic mode in which the focus adjustment is automatically performed on the basis of the plurality of the focus detection signals; and a control circuit for controlling the indicating circuit in the automatic mode to indicate that the object is moving, when the judgement circuit judges that the object is moving, and for controlling the indicating circuit in the manual mode so as not to indicate.

15. An automatic focus adjustment apparatus comprising:

a focus detection circuit for repetitively detecting a focus adjustment state of an object image formed by an optical system, and for sequentially generating focus detection signals in accordance with the detected focus adjustment state;

a judgement circuit for judging whether an object is moving or not, on the basis of a plurality of the focus detection signals sequentially generated;

an indicating circuit for indicating whether the object is moving or not;

a selecting circuit for selecting a manual mode in which a focus adjustment of the optical system is manually performed or an automatic mode in which the focus adjustment is automatically performed on the basis of a plurality of the focus detection signals; and an inhibiting circuit for inhibiting the judgement of the judgement circuit when the manual mode is selected.

16. An automatic focusing apparatus comprising:

a focus detection circuit for repetitively detecting a focus state of an object image formed by an optical system, and for generating a plurality of focus detection signals corresponding to detected focus states;

an estimating circuit for estimating movement of the object image in the future based on said plurality of focus detection signals;

a mode setting circuit for setting a first mode or a second mode; and a drive circuit for driving the optical system to follow the estimated movement of the object image in the first mode, and for driving the optical system based on the latest focus detection signal in the second mode.

17. An automatic focusing apparatus comprising:

a focus detection circuit for repetitively detecting a focus state of an object image formed by an optical system, and for generating a plurality of focus detection signals corresponding to detected focus states;

an estimating circuit for estimating movement of the object image in the future based on said plurality of focus detection signals;

a mode setting circuit for setting a first mode or a second mode; and a control circuit for allowing said estimating circuit to operate in the first mode, and for inhibiting said estimating circuit from operating the second mode.

* * * * *